United States Patent
Migos et al.

(10) Patent No.: US 12,056,339 B2
(45) Date of Patent: Aug. 6, 2024

(54) DEVICE, METHOD, AND GRAPHICAL USER INTERFACE FOR PROVIDING AND INTERACTING WITH A VIRTUAL DRAWING AID

(71) Applicant: Apple Inc., Cupertino, CA (US)

(72) Inventors: Charles J. Migos, San Bruno, CA (US); William J. Thimbleby, Sunnyvale, CA (US); Gustaf Engström, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 109 days.

(21) Appl. No.: 16/988,502

(22) Filed: Aug. 7, 2020

(65) Prior Publication Data

US 2020/0371676 A1 Nov. 26, 2020

Related U.S. Application Data

(63) Continuation of application No. 14/871,738, filed on Sep. 30, 2015, now Pat. No. 10,795,558.
(Continued)

(51) Int. Cl.
*G06F 3/04845* (2022.01)
*G06F 3/0481* (2022.01)
(Continued)

(52) U.S. Cl.
CPC ........ *G06F 3/04845* (2013.01); *G06F 3/0481* (2013.01); *G06F 3/04812* (2013.01);
(Continued)

(58) Field of Classification Search
CPC ............... G06F 3/04845; G06F 3/0481; G06F 3/04812; G06F 3/04842; G06F 3/04847;
(Continued)

(56) References Cited

U.S. PATENT DOCUMENTS 5,287,417 A 2/1994 Eller et al.
6,097,392 A 8/2000 Leyerle
(Continued)

FOREIGN PATENT DOCUMENTS

CN 102016777 A 4/2011
CN 102177489 A 9/2011
(Continued)

OTHER PUBLICATIONS

Notice of Allowance, dated May 29, 2020, received in Chinese Patent Application No. 201680028077.7, which corresponds with U.S. Appl. No. 14/871,781, 2 pages.
(Continued)

*Primary Examiner* — Tamara T Kyle
*Assistant Examiner* — Conrad R Pack
(74) *Attorney, Agent, or Firm* — Morgan, Lewis & Bockius LLP

(57) ABSTRACT

A method includes displaying a drawing aid in a sketch area on a touch-sensitive display, and receiving one or more drawing inputs. In response to receiving the one or more drawing inputs, the device displays marks based on the drawing inputs that are constrained based on the drawing aid. While displaying the drawing aid in the sketch area, the device detects a touch gesture at a location corresponding to a location of the drawing aid. In response to detecting the touch gesture: if the touch gesture is a pinch gesture, the device ceases to display the drawing aid in the sketch area; and if the touch gesture is a rotational gesture, the device rotates the drawing aid relative to the sketch area in accordance with the movement of at least one contact in the touch gesture while maintaining display of the drawing aid in the sketch area.

23 Claims, 62 Drawing Sheets

Related U.S. Application Data

(60) Provisional application No. 62/172,207, filed on Jun. 7, 2015.

(51) Int. Cl.
| | |
|---|---|
| *G06F 3/04812* | (2022.01) |
| *G06F 3/04842* | (2022.01) |
| *G06F 3/04847* | (2022.01) |
| *G06F 3/04883* | (2022.01) |
| *G06F 3/04886* | (2022.01) |
| *G06T 3/40* | (2024.01) |
| *G06T 11/00* | (2006.01) |
| *G06T 11/20* | (2006.01) |
| *G06T 11/40* | (2006.01) |
| *G06T 11/60* | (2006.01) |

(52) U.S. Cl.
CPC ...... *G06F 3/04842* (2013.01); *G06F 3/04847* (2013.01); *G06F 3/04883* (2013.01); *G06F 3/04886* (2013.01); *G06T 3/40* (2013.01); *G06T 11/001* (2013.01); *G06T 11/203* (2013.01); *G06T 11/40* (2013.01); *G06T 11/60* (2013.01); *G06F 2203/04808* (2013.01); *G06T 2210/22* (2013.01)

(58) Field of Classification Search
CPC ............. G06F 3/04883; G06F 3/04886; G06F 2203/04808; G06T 3/40; G06T 11/001; G06T 11/203; G06T 11/40; G06T 11/60; G06T 2210/22
USPC .......................................................... 715/773
See application file for complete search history.

(56) References Cited

U.S. PATENT DOCUMENTS

| | | | | |
|---|---|---|---|---|
| 6,232,957 | B1 * | 5/2001 | Hinckley | G06F 3/03543 715/835 |
| 8,542,207 | B1 | 9/2013 | Truta et al. | |
| 8,896,621 | B1 * | 11/2014 | Sipher | G06F 3/04883 715/764 |
| 2004/0027371 | A1 * | 2/2004 | Jaeger | G06F 3/0481 715/716 |
| 2006/0008779 | A1 * | 1/2006 | Shand | G09B 19/00 434/90 |
| 2006/0132455 | A1 | 6/2006 | Rimas-Ribikauskas et al. | |
| 2008/0036743 | A1 | 2/2008 | Westerman et al. | |
| 2008/0168402 | A1 | 7/2008 | Blumenberg | |
| 2008/0168404 | A1 | 7/2008 | Ording | |
| 2008/0309676 | A1 | 12/2008 | Nehab et al. | |
| 2009/0225039 | A1 | 9/2009 | Williamson et al. | |
| 2009/0288306 | A1 * | 11/2009 | Nahum | G01B 3/04 33/784 |
| 2009/0303240 | A1 | 12/2009 | Yamauchi | |
| 2011/0074695 | A1 * | 3/2011 | Rapp | G06F 3/04845 345/173 |
| 2011/0169748 | A1 * | 7/2011 | Tse | G06F 3/0425 345/173 |
| 2011/0175821 | A1 | 7/2011 | King | |
| 2011/0185316 | A1 | 7/2011 | Reid et al. | |
| 2011/0185318 | A1 | 7/2011 | Hinckley et al. | |
| 2011/0304584 | A1 * | 12/2011 | Hwang | G06F 3/04847 345/173 |
| 2012/0023100 | A1 | 1/2012 | Kamimura | |
| 2012/0026100 | A1 | 2/2012 | Migos et al. | |
| 2012/0192056 | A1 | 7/2012 | Migos et al. | |
| 2013/0014041 | A1 | 1/2013 | Jaeger | |
| 2013/0127910 | A1 * | 5/2013 | Tijssen | G06T 11/203 345/642 |
| 2013/0201210 | A1 | 8/2013 | Vaddadi et al. | |
| 2013/0222313 | A1 * | 8/2013 | Nakamura | G06F 3/04883 345/173 |
| 2013/0321350 | A1 * | 12/2013 | Mesaros | G06F 3/04883 345/179 |
| 2014/0078082 | A1 * | 3/2014 | Wu | G06F 3/0484 345/173 |
| 2014/0088926 | A1 * | 3/2014 | Rhoades | G06T 11/20 703/1 |
| 2014/0104189 | A1 * | 4/2014 | Marshall | G06F 3/0416 345/173 |
| 2014/0168095 | A1 * | 6/2014 | Mesguich Havilio | G06F 3/04883 345/173 |
| 2014/0172379 | A1 | 6/2014 | Chang et al. | |
| 2014/0210748 | A1 * | 7/2014 | Narita | G06F 3/0354 345/173 |
| 2014/0229871 | A1 | 8/2014 | Tai et al. | |
| 2014/0267089 | A1 | 9/2014 | Smith | |
| 2014/0337783 | A1 * | 11/2014 | Allen | G06F 3/04845 715/771 |
| 2014/0350727 | A1 | 11/2014 | Desai et al. | |
| 2015/0009162 | A1 | 1/2015 | Jung et al. | |
| 2015/0029194 | A1 | 1/2015 | Ruble | |
| 2015/0062600 | A1 * | 3/2015 | Takeichi | G06K 15/027 358/1.9 |
| 2016/0054893 | A1 * | 2/2016 | Dowd | G06F 3/0481 715/788 |
| 2016/0092080 | A1 | 3/2016 | Swanson et al. | |
| 2016/0147408 | A1 | 5/2016 | Bevis et al. | |
| 2016/0357356 | A1 | 12/2016 | Migos et al. | |
| 2016/0357412 | A1 | 12/2016 | Thimbleby et al. | |
| 2016/0357430 | A1 | 12/2016 | Migos et al. | |
| 2017/0263034 | A1 | 9/2017 | Kenoff et al. | |
| 2017/0285919 | A1 | 10/2017 | Hatfield et al. | |
| 2017/0285920 | A1 | 10/2017 | Hatfield et al. | |

FOREIGN PATENT DOCUMENTS

| | | | | |
|---|---|---|---|---|
| CN | 102375689 A | 3/2012 | | |
| CN | 103473010 A | 12/2013 | | |
| CN | 103608754 A | 2/2014 | | |
| CN | 103677616 A | 3/2014 | | |
| CN | 104007894 A | 8/2014 | | |
| CN | 104487929 A | 4/2015 | | |
| EP | 2 669 783 A1 | 12/2013 | | |
| KR | 20100002245 A | * | 1/2010 | ............... B43L 7/00 |
| WO | WO 2011/023225 A1 | 3/2011 | | |

OTHER PUBLICATIONS

Patent, dated Aug. 11, 2020, received in Chinese Patent Application No. 201680028077.7, which corresponds with U.S. Appl. No. 14/871,781, 5 pages.

Decision to Grant, dated May 28, 2020, received in European Patent Application No. 16727898.5, which corresponds with U.S. Appl. No. 14/871,781, 2 pages.

Patent, dated Jun. 24, 2020, received in European Patent Application No. 16727898.5, which corresponds with U.S. Appl. No. 14/871,781, 5 pages.

Adobe, "Adobe Illustrator CC Help", https.adobe.com/archive/en/illustrator/cc/2014/illustrator_reference.pdf, Oct. 3, 2014, 531 pages.

ArtRage, "Series of ArtRage of iPad Video Tutorials", http://www.artrage.com/artrage-ipad-video-tutorials, Sep. 24, 2014, 5 pages.

Cnet, "The 5G Revolution is Coming", http://www.cnet.com/how-to-use-handwriting-to-input-text-on-android-with-myscript-stylus, Sep. 27, 2013, 4 pages.

Cohen, "Inline User Addressing in Chat Sessions", U.S. Appl. No. 2013/0262574, Oct. 3, 2013, 35 pages.

Cozma, "Use Handwriting to Input Text on Android with MyScript Stylus", http://www.cnet.com/how-to/use-handwriting-to-input-text-on-android-with-myscript-stylus, Sep. 27, 2013, 3 pages.

FiftyThree, Inc., "Paper by WeTransfer", http://support.fiftythree.com/customer/portal/questions/888025-selective-eraser-or-layers?b_id=167, Nov. 5, 2018, 2 pages.

Mattei, "Update on Handedness (Menu Location)", http:kristofmattei.be/2014/08/02/update-handedness-menu-location, Aug. 2, 2014, 2 pages.

(56) References Cited

OTHER PUBLICATIONS

Miller, "ArtRage 4", http://www.artrage.com/artrage-4/features, Feb. 2013, 3 pages.
Henry, "Five Best Tablet Drawing Apps", LifeHacker, https://lifehacker.com/5913489/five-best-tablet-drawing-apps, May 27, 2012, 7 pages.
Oana, "Precision Work in Blender", htttps://web.archive.org/web/20120824283658/http://blendermamna.com/precision-work-in-blender.html, Aug. 24, 2012, 12 pages.
Prokoudine, "Angled Guides and Snapping for Inkscape Beginners", http://libergraphicsworkd.org/blog/entry/angled-guides-and-snapping-for-inkscape-beginners, Jul. 29, 2012, 12 pages.
Sato, "Yammer", http://about.yammer.com/product/features, Aug. 13, 2015, 6 pages.
Office Action, dated Jun. 29, 2018, received in U.S. Appl. No. 14/871,738, 33 pages.
Final Office Action, dated Mar. 8, 2019, received in U.S. Appl. No. 14/871,738, 33 pages.
Office Action, dated Sep. 27, 2019, received in U.S. Appl. No. 14/871,738, 33 pages.
Final Office Action, dated Apr. 6, 2020, received in U.S. Appl. No. 14/871,738, 33 pages.
Notice of Allowance, dated May 5, 2020, received in U.S. Appl. No. 14/871,738, 11 pages.
Office Action, dated Jun. 28, 2018, received in U.S. Appl. No. 14/871,919, 31 pages.
Final Office Action, dated Mar. 8, 2019, received in U.S. Appl. No. 14/871,919, 29 pages.
Notice of Allowance, dated Jul. 31, 20198, received in U.S. Appl. No. 14/871,919, 8 pages.
Office Action, dated Sep. 5, 2017, received in U.S. Appl. No. 14/871,781, 39 pages.
Final Office Action, dated Jan. 23, 2018, received in U.S. Appl. No. 14/871,781, 30 pages.
Office Action, dated Mar. 30, 2020, received in Chinese Patent Application No. 201680028077.7, which corresponds with U.S. Appl. No. 14/871,781, 7 pages.
International Search Report and Written Opinion, dated Jan. 11, 2017, received in International Patent Application No. PCT/US2016/033520, which corresponds with U.S. Appl. No. 14/871,781, 21 pages.
Office Action, dated Apr. 10, 2024, received in Chinese Patent Application No. 202010806453.9, which corresponds with U.S. Appl. No. 14/871,738, 2 pages.
Office Action, dated Apr. 5, 2024, received in Chinese Patent Application No. 202010806456.2, which correspond with U.S. Appl. No. 16/988,502, 1 page.

\* cited by examiner

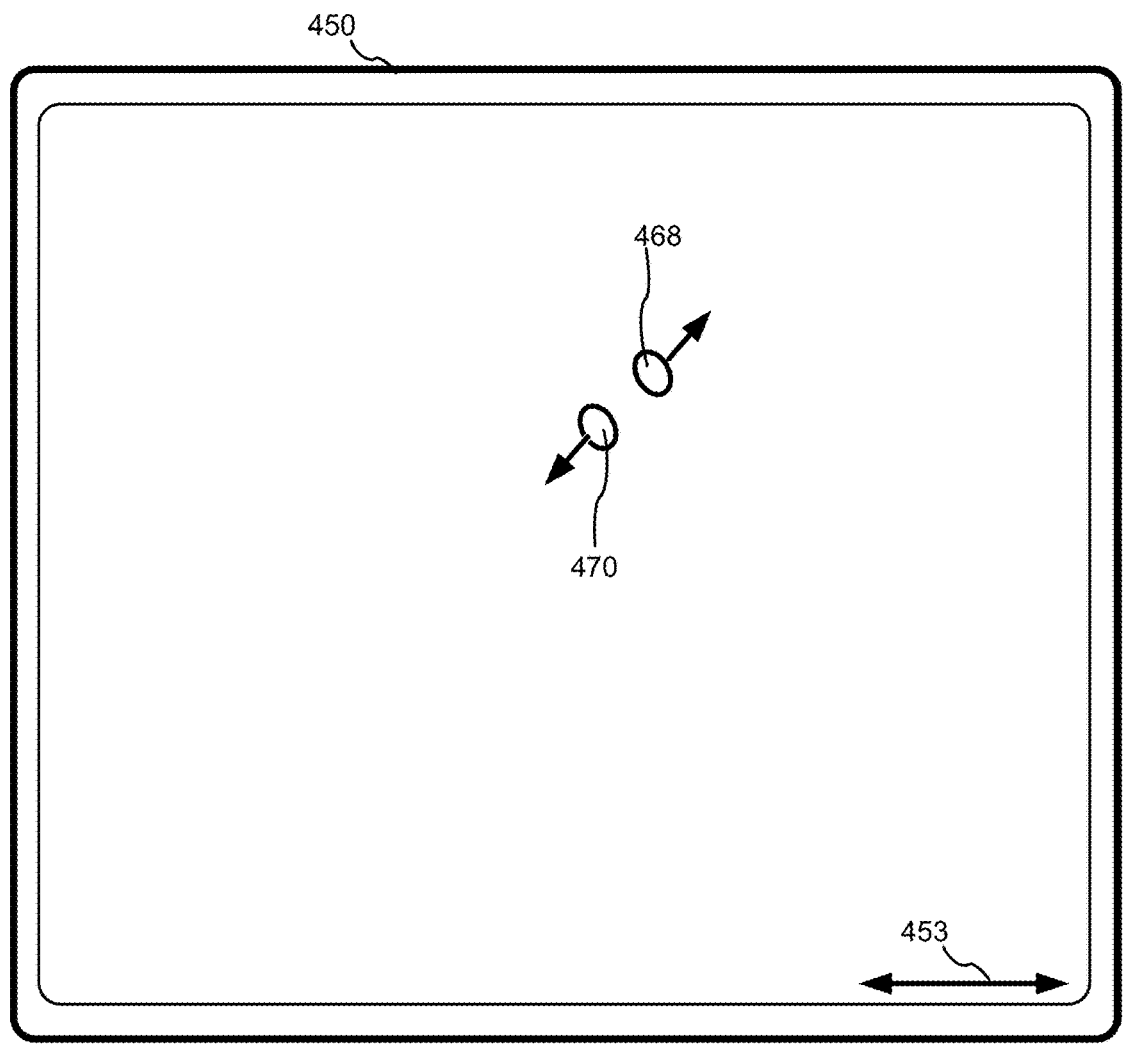
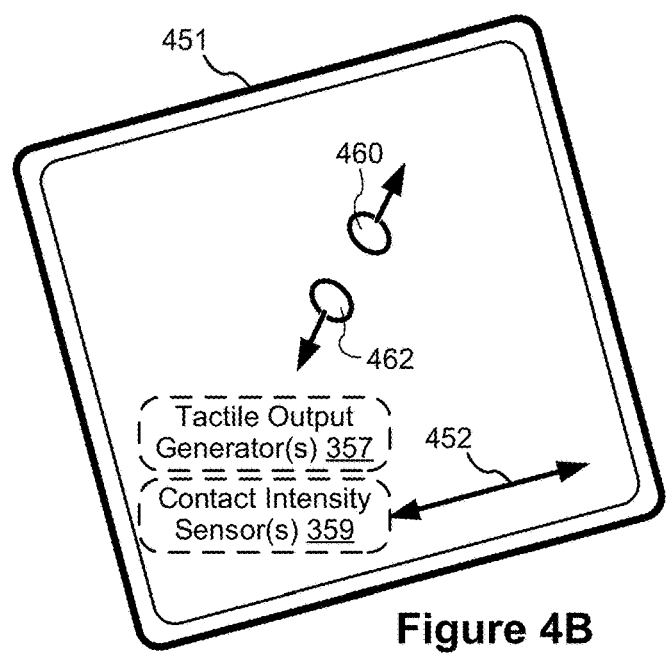
Figure 4B

600

602
Display an on-screen ruler in a sketch area in response to a predefined input. The on-screen ruler has a first edge and an interior portion delineated by the first edge

604
The first edge of the on-screen ruler has a predefined shape other than a straight line

606
In response to detecting a first touch input directed to the first edge of the on-screen ruler, render a line in the sketch area in accordance with the first edge of the on-screen ruler

608
Determine that the first touch input is a line drawing gesture in accordance with at least a determination that an initial position of a contact of the first touch input on the touch-sensitive surface corresponds to an on-screen location that is within a threshold distance from the first edge of the on-screen ruler

610
Rendering the line in the sketch area in accordance with the first edge of the on-screen ruler includes tracing the first edge with a predetermined line color in the sketch area while a corresponding on-screen location of a contact of the first touch input moves within a threshold distance from the first edge of the on-screen ruler (A)

612
In response to detecting a second touch input directed ot the first edge of the on-screen ruler, add fill content in a first portion of the sketch area that corresponds to regions touched by the second touch input on the touch-sensitive surface and that is delineated by the first edge of the on-screen ruler, such that the first portion of the sketch area is confined by the first edge or the line

614
Determine that the second touch input is a fill gesture in accordance with at least a determination that an initial position of a contact of the second touch input on the touch-sensitive surface corresponds to an on-screen location that is within a threshold distance from the first edge of the on-screen ruler

616
Determine that the second touch input is a fill gesture in accordance with at least a determination that a movement direction of a contact of the second touch input on the touch-sensitive surface corresponds to an on-screen movement direction that is beyond a threshold angle from the first edge in a region of the sketch area un-obscured by the on-screen ruler

618
Detecting the second touch input includes detecting a back and forth swiping motion of a contact on the touch-sensitive surface. Adding the fill content in the first portion of the sketch area that corresponds to regions touched by the second touch input on the touch-sensitive surface and that is delineated by the first edge of the on-screen ruler includes: defining a region of the sketch area that corresponds to regions spanned by the back and forth swiping motion of the contact on the touch-sensitive surface; maintaining a boundary of the region of the sketch area that is defined by the back and forth swiping motion of the contact on the touch-sensitive surface based on the first edge of the on-screen ruler; and adding the fill content into the region of the sketch area in accordance with the boundary

620
At least one portion of the region of the sketch area that corresponds to the regions spanned by the back and forth swiping motion of the contact on the touch-sensitive surface crosses the first edge of the on-screen ruler, and maintaining the boundary of the region of the sketch area includes at least one of stretching or cropping the region of the sketch area such that the boundary of the region of the sketch area is aligned with the first edge

---
622
Detect a third touch input directed to the first edge of the on-screen ruler ---
624
Determine whether an initial touch position of a contact of the third touch input on the touch-sensitive surface corresponds to an on-screen location that is within a predetermined central region of the on-screen ruler a threshold distance away from the first edge ---
626
In accordance with a determination that the initial touch position of the contact of the third touch input on the touch-sensitive surface corresponds to an on-screen location that is within the predetermined central region of the on-screen ruler, move the on-screen ruler to a different location on the display in accordance with movement of the contact of the third touch input on the touch-sensitive surface while keeping the sketch area stationary on the display 628
Moving the on-screen ruler to a different location on the display in accordance with the movement of the contact of the third touch-input on the touch-sensitive surface includes maintaining an orientation of the on-screen ruler on the display during movement of the on-screen ruler on the display

652
Receive a content moving gesture while the on-screen ruler is displayed

---

654
In response to receiving the content moving gesture, move content within the sketch area while keeping the on-screen ruler stationary relative to the sketch area

---

656
Receive a content zooming gesture while the on-screen ruler is displayed

---

658
In response to receiving the content zooming gesture, zooming content within the sketch area while zooming at least a portion of the on-screen ruler according to a current zoom level of the content

---

660
The on-screen ruler is at least partially transparent such that the content is visible from behind the on-screen ruler both before and after being zoomed

662
Detecting movement of a contact on the touch-sensitive surface that corresponds to a movement along the on-screen ruler on the display

---

664
In response to the movement of the contact on the touch-sensitive surface, displaying tick marks on the first edge to indicate a length scale of the on-screen ruler

666
Displaying the tick marks on the first edge includes determining a start location and an end location of the tick marks on the first edge in accordance with an initial position and a final position of the contact on the touch-sensitive surface.

668
Displaying the tick marks on the first edge includes detecting a braking movement of the contact before a lift-off of the contact on the touch-sensitive surface

670
In response to detecting the braking movement of the contact, snap the end location of the tick marks to a predetermined snap location on the on-screen ruler corresponding to the final position of the contact on the touch-sensitive surface

672
Determine an on-screen pitch of the tick marks based on a screen resolution or size of the display

---

674
Detecting movement of a contact on the touch-sensitive surface that corresponds to a movement along the on-screen ruler on the display

676
In response to the movement of the contact on the touch-sensitive surface, displaying a numerical value in proximity to the first edge to indicate a length scale of the movement of the contact

678
Display a length of a content object when the on-screen ruler is moved within a threshold distance from the content object

---

680
Display tick marks on the first edge of the on-screen ruler to indicate a length scale of the on-screen ruler

↓

682
Detect a predetermined moving gesture for moving the on-screen ruler

↓

684
Move the on-screen ruler in accordance with movement of the predetermined moving gesture

↓

686
In response to detecting that a predetermined tick mark of the on-screen ruler is within a threshold distance away from an existing content object in the sketch area at a termination of the predetermined moving gesture, continue to move the on-screen ruler to a new position such that the predetermined tick mark snaps to the existing content object

---

688
Display tick marks on the first edge of the on-screen ruler to indicate a length scale of the on-screen ruler

↓

690
Detect the first touch input directed to the first edge of the on-screen ruler. The first touch input includes an initial movement along the first edge and a braking movement before termination of the first touch input. Rendering the line in the sketch area in accordance with the first edge of the on-screen ruler includes: drawing the line in accordance with the initial movement of the first touch input along the first edge of the on-screen ruler and, in response to detecting the braking movement, snapping a final point of the line to a tick mark nearest an on-screen position corresponding to an end position of the first touch input.

692
Detect a pivoting gesture directed to the on-screen ruler. The pivoting gesture includes an initial rotation and a braking movement before termination of the pivoting gesture

694
In response to the pivoting gesture: rotate the on-screen ruler in accordance with the initial rotation of the pivoting gesture; and, in response to detecting the braking movement, snap a final orientation of the on-screen ruler to a predetermined snap angle nearest an on-screen position corresponding to an end position of the pivoting gesture

696
Display an angle indicator on the on-screen ruler to indicate a current orientation of the on-screen ruler.

702
Display an on-screen ruler in a sketch area in response to a predefined input. The on-screen ruler has a first edge and an interior portion delineated by the first edge.

706
The respective touch input directed to the first edge of the on-screen ruler is a second touch input directed to the first edge of the on-screen ruler

704
Detect a respective touch input directed to the first edge of the on-screen ruler

708
In response to detecting the respective touch input directed to the first edge of the on-screen ruler, add fill content in a first portion of the sketch area that corresponds to regions touched by the first touch input on the touch-sensitive surface and that is delineated by the first edge of the on-screen ruler, such that the first portion of the sketch area is confined by the first edge or the line.

710
Detect a first touch input directed to the first edge of the on-screen ruler

712
Render a line in the sketch area in accordance with the first edge of the on-screen ruler

802
Receive a line-drawing input

804
Render a line in a sketch area in accordance with the line-drawing input

806
While displaying the sketch area including the line, receive a fill gesture directed to the line in the sketch area

808
Receiving the fill gesture directed to the line in the sketch area includes:
receiving a touch gesture comprising a back and forth swiping motion of a contact on the touch-sensitive surface; and
determining that the touch gesture is a fill gesture directed to the line in the sketch area in accordance with a determination that an initial position of the contact on the touch-sensitive surface corresponds to an on-screen location that is beyond a threshold distance from the line and a sequence of every other turning position following the initial position of the contact during the back and forth swiping motion corresponds to a sequence of on-screen locations that are within a threshold distance from the line.

810
Receiving the fill-gesture directed to the line in the sketch area includes:
detecting selection of the line immediately before or after selection of a content fill mode;
receiving a touch gesture comprising a back and forth swiping motion of a contact on the touch-sensitive surface; and
determining that the touch gesture is a fill gesture directed to the line in the sketch area in accordance with a determination that the touch gesture is received while the line and the content fill mode are concurrently selected.

812
In response to receiving the fill gesture, add fill content in a first portion of the sketch area that corresponds to regions touched by the fill-gesture on the touch-sensitive surface and that is delineated and partially enclosed by the line in the sketch area

814
Adding fill content in a first portion of the sketch area that corresponds to regions touched by the fill gesture on the touch-sensitive surface and that is delineated and partially enclosed by the line in the sketch area includes: adding the fill content in a first region in the first portion of the sketch area in accordance with a first fill factor and adding the fill content in a second region in the first portion of the sketch area in accordance with a second fill factor. The first region is closer to the line than the second region and the first fill factor is greater than the second fill factor.

816
The second fill factor is determined in accordance with one or more characteristics of the fill gesture.

818
Adding the fill content in the first portion of the sketch area that corresponds to regions touched by the fill gesture on the touch-sensitive surface and that is delineated by the line in the sketch area includes defining a region of the sketch area on the display that corresponds to regions spanned by the back and forth swiping motion of the contact on the touch-sensitive surface, maintaining a boundary of the region of the sketch area that is defined by the back and forth swiping motion of the contact based on the line in the sketch area, and adding the fill content into the region of the sketch area in accordance with the boundary.

820
At least one portion of the region of the sketch area on the display that corresponds to the regions spanned by the back and forth swiping motion of the contact on the touch-sensitive surface crosses the line, and maintaining the boundary of the region includes at least one of stretching or cropping the region of the sketch area such that the boundary of the region of the sketch area is aligned with the line.

822
A beginning and an end of the line are non-overlapping and the line defines at least one fully enclosed region 824
The first portion of the sketch area includes the at least one fully enclosed region 826
The first portion of the sketch area does not include the at least one fully enclosed region

902
Display an on-screen ruler on the display

904
Detect a first portion of a rotational gesture directed to the on-screen ruler, where detecting the first portion of the rotational gesture includes detecting first movement of a first contact in a first direction around a pivot location on the touch-sensitive surface

906
In response to detecting the first portion of the rotational gesture directed to the on-screen ruler:
  rotate the on-screen ruler by a first angular amount about an anchor point on the display in accordance with the first movement of the first contact around the pivot location on the touch-sensitive surface; and
  in accordance with a determination that the on-screen ruler has entered a first snap zone associated with a first snap angle upon rotation by the first angular amount, rotate the on-screen ruler by a first adjusted amount to bring the on-screen ruler into alignment with the first snap angle

908
After the rotating the on-screen ruler by the first adjusted amount, detect a second portion of the rotational gesture directed to the on-screen ruler, where detecting the second portion of the rotational gesture includes detecting second movement of the first contact in a second direction around the pivot location on the touch-sensitive surface, and where the second movement in the second direction satisfies unsnapping criteria

910
In response to detecting the second portion of the rotational gesture directed to the on-screen ruler, rotate the on-screen ruler by a second adjusted amount to bring the on-screen ruler into alignment with a respective on-screen location that corresponds to a current location of the first contact on the touch-sensitive surface (A)

912
After rotating the on-screen ruler by the second adjusted amount, detect a third portion of the rotational gesture directed to the on-screen ruler, wherein detecting the third portion of the rotational gesture includes detecting third movement of the first contact around the pivot location on the touch-sensitive surface; and In response to detecting the third portion of the rotational gesture directed to the on-screen ruler, rotate the on-screen ruler around the anchor point on the display in accordance with the third movement of the first contact around the pivot location on the touch-sensitive surface

914
The on-screen ruler remains within the first snap zone associated with the first snap angle during the rotation in accordance with a first portion of the third movement of the first contact, and remains aligned with a respective on-screen location that corresponds to a current location of the first contact on the touch-sensitive surface throughout the first portion of the third movement of the first contact

916
The on-screen ruler exits and re-enters the first snap zone associated with the first snap angle at least once during the rotation in accordance with a second portion of the third movement of the first contact, and remains aligned with a respective on-screen location that corresponds to a current location of the first contact on the touch-sensitive surface throughout the second portion of the third movement of the first contact

918
The on-screen ruler exits the first snap zone associated with the first snap angle during the rotation in accordance with a third portion of the third movement of the first contact, and remains aligned with a respective on-screen location that corresponds to a current location of the first contact on the touch-sensitive surface throughout the third portion of the third movement of the first contact

920
The on-screen ruler exits the first snap zone associated with the first snap angle and enters a second snap zone associated with a second snap angle in accordance with a fourth portion of the third movement of the first contact.

In accordance with a determination that the on-screen ruler has entered the second snap zone associated with the second snap angle in accordance with the fourth portion of the third movement of the first contact, rotate the on-screen ruler by a third adjusted amount to bring the on-screen ruler into alignment with the second snap angle 922
While the on-screen ruler is within the second snap zone associated with the second snap angle, detect a fourth portion of the rotational gesture directed to the on-screen ruler, where detecting the fourth portion of the rotational gesture includes detecting fourth movement of the first contact around the pivot location on the touch-sensitive surface and detecting that the fourth movement of the first contact does not satisfy the unsnapping criteria; and, In response to detecting the fourth portion of the rotational gesture directed to the on-screen ruler, maintain alignment between the on-screen ruler and the second snap angle.

924
The unsnapping criteria include a criterion that is met when movement of a respective contact around a respective pivot location of a given rotational gesture directed to the on-screen ruler is reversed by at least a threshold amount once the on-screen ruler has entered a respective snap zone associated with a given snap angle in accordance with the movement of the respective contact

Figure 9C

DEVICE, METHOD, AND GRAPHICAL USER INTERFACE FOR PROVIDING AND INTERACTING WITH A VIRTUAL DRAWING AID

RELATED APPLICATION

This application is a continuation of U.S. application Ser. No. 14/871,738, filed Sep. 30, 2015, which claims priority to U.S. Provisional Application Ser. No. 62/172,207, filed Jun. 7, 2015, entitled "Device, Method, and Graphical User Interface for Providing and Interacting with a Virtual Drawing Aid", all of which are incorporated by reference herein in their entirety.

TECHNICAL FIELD

This relates generally to electronic devices with touch-sensitive surfaces, including but not limited to electronic devices with touch-sensitive surfaces that provide a virtual drawing aid.

BACKGROUND

Computer-programs that provide virtual design and drawing tools have wide applicability in both industrial and personal use settings. Some applications provide free-hand sketching capabilities that allow a user to draw lines and objects based on free-hand movement of a contact (e.g., a contact made by a finger or stylus) on a touch-sensitive surface (e.g., a trackpad or touch-screen display). In addition to selecting the color and texture for a drawing tool (e.g., pen, brush, pencil, etc.) used, a user may wish to employ certain conventional drawing aids, such as a straight-edge ruler, a template, a protractor, an angle ruler, etc. It is inconvenient and difficult to use a real-world drawing aid with a virtual drafting environment. Thus, providing virtual drawing aids in computer programs that provide sketching capabilities will improve the functionality of the computer programs. It is challenging to provide virtual drawing aids in a way that are functional, efficient, and ease to use.

SUMMARY

Accordingly, the present disclosure provides electronic devices with faster, more efficient methods and interfaces for providing and interacting with a virtual drawing aid. Such methods and interfaces optionally complement or replace conventional methods for providing and interacting with a virtual drawing aid. Such methods and interfaces reduce the burden on a user and produce a more efficient human-machine interface. Further, such methods reduce the processing power consumed to process user inputs, conserve power, reduce unnecessary/extraneous/repetitive inputs, and potentially reduce memory usage. For battery-operated devices, such methods and interfaces conserve battery power and increase the time between battery charges.

In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include note-taking, image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at a device with one or more processors, memory, a touch-sensitive surface, and a display. The method includes displaying an on-screen ruler in a sketch area in response to a predefined input. The on-screen ruler has a first edge and an interior portion delineated by the first edge. The method further includes, in response to detecting a first touch input directed to the first edge of the on-screen ruler, rendering a line in the sketch area in accordance with the first edge of the on-screen ruler. The method further includes, in response to detecting a second touch input directed to the first edge of the on-screen ruler, adding fill content in a first portion of the sketch area that corresponds to regions touched by the second touch input on the touch-sensitive surface and that is delineated by the first edge of the on-screen ruler, such that the first portion of the sketch area is confined by the first edge or the line.

In accordance with some embodiments, a method is performed at a device with one or more processors, memory, a touch-sensitive surface, and a display. The method includes displaying an on-screen ruler in a sketch area in response to a predefined input. The on-screen ruler has a first edge and an interior portion delineated by the first edge. The method further includes detecting a respective touch input directed to the first edge of the on-screen ruler. The method further includes, in response to detecting the respective touch input directed to the first edge of the on-screen ruler, adding fill content in a first portion of the sketch area that corresponds to regions touched by the first touch input on the touch-sensitive surface and that is delineated by the first edge of the on-screen ruler, such that the first portion of the sketch area is confined by the first edge or the line.

In accordance with some embodiments, an electronic device includes a display unit configured to display an on-screen ruler; a touch-sensitive surface unit, and a processing unit coupled with the display unit and the touch-sensitive surface unit. The on-screen ruler is displayed in a sketch area in response to a predefined input. The on-screen ruler has a first edge and an interior portion delineated by the first edge. The processing unit is configured to, in response to detecting a first touch input directed to the first edge of the on-screen ruler, render a line in the sketch area in accordance with the first edge of the on-screen ruler. The processing unit is further configured to, in response to detecting a second touch input directed to the first edge of the on-screen ruler, add fill content in a first portion of the sketch area that corresponds to regions touched by the second touch input on the touch-sensitive surface and that is delineated by the first edge of the on-screen ruler, such that the first portion of the sketch area is confined by the first edge or the line.

In accordance with some embodiments, a method is performed at a device with one or more processors, memory, a touch-sensitive surface, and a display. The method includes receiving a line-drawing input. The method further includes rendering a line in a sketch area in accordance with the line-drawing input. The method further includes, while displaying the sketch area including the line, receiving a fill gesture directed to the line in the sketch area. The method further includes, in response to receiving the fill gesture, adding fill content in a first portion of the sketch area that corresponds to regions touched by the fill-gesture on the touch-sensitive surface and that is delineated and partially enclosed by the line in the sketch area.

In accordance with some embodiments, an electronic device includes a display unit, a touch-sensitive surface unit configured to receive a line-drawing input, and a processing unit coupled with the display unit and the touch-sensitive surface unit. The processing unit is configured to render a line in a sketch area in accordance with the line-drawing input. The processing unit is further configured to, while displaying the sketch area including the line, receive a fill gesture directed to the line in the sketch area. The processing unit is further configured to, in response to receiving the fill gesture, add fill content in a first portion of the sketch area that corresponds to regions touched by the fill gesture on the touch-sensitive surface unit and that is delineated and partially enclosed by the line in the sketch area.

In accordance with some embodiments, a method is performed at a device with one or more processors, memory, a touch-sensitive surface, and a display. The method includes displaying an on-screen ruler on the display; detecting a first portion of a rotational gesture directed to the on-screen ruler, wherein detecting the first portion of the rotational gesture includes detecting first movement of a first contact in a first direction around a pivot location on the touch-sensitive surface; in response to detecting the first portion of the rotational gesture directed to the on-screen ruler: rotating the on-screen ruler by a first angular amount about an anchor point on the display in accordance with the first movement of the first contact around the pivot location on the touch-sensitive surface; and in accordance with a determination that the on-screen ruler has entered a first snap zone associated with a first snap angle upon rotation by the first angular amount, rotating the on-screen ruler by a first adjusted amount to bring the on-screen ruler into alignment with the first snap angle; after the rotating the on-screen ruler by the first adjusted amount, detecting a second portion of the rotational gesture directed to the on-screen ruler, wherein detecting the second portion of the rotational gesture includes detecting second movement of the first contact in a second direction around the pivot location on the touch-sensitive surface, and wherein the second movement in the second direction satisfies unsnapping criteria; and, in response to detecting the second portion of the rotational gesture directed to the on-screen ruler, rotating the on-screen ruler by a second adjusted amount to bring the on-screen ruler into alignment with a respective on-screen location that corresponds to a current location of the first contact on the touch-sensitive surface.

In accordance with some embodiments, an electronic device includes a display unit, a touch-sensitive surface unit, and a processing unit coupled with the display unit and the touch-sensitive surface unit. The processing unit is configured to: enable display an on-screen ruler on the display unit; detect a first portion of a rotational gesture directed to the on-screen ruler, wherein detecting the first portion of the rotational gesture includes detecting first movement of a first contact in a first direction around a pivot location on the touch-sensitive surface; in response to detecting the first portion of the rotational gesture directed to the on-screen ruler: rotate the on-screen ruler by a first angular amount about an anchor point on the display in accordance with the first movement of the first contact around the pivot location on the touch-sensitive surface; and in accordance with a determination that the on-screen ruler has entered a first snap zone associated with a first snap angle upon rotation by the first angular amount, rotate the on-screen ruler by a first adjusted amount to bring the on-screen ruler into alignment with the first snap angle; after the rotating the on-screen ruler by the first adjusted amount, detect a second portion of the rotational gesture directed to the on-screen ruler, wherein detecting the second portion of the rotational gesture includes detecting second movement of the first contact in a second direction around the pivot location on the touch-sensitive surface, and wherein the second movement in the second direction satisfies unsnapping criteria; and, in response to detecting the second portion of the rotational gesture directed to the on-screen ruler, rotate the on-screen ruler by a second adjusted amount to bring the on-screen ruler into alignment with a respective on-screen location that corresponds to a current location of the first contact on the touch-sensitive surface.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein.

In accordance with some embodiments, a computer readable storage medium (e.g., a non-transitory computer readable storage medium, or alternatively, a transitory computer readable storage medium) has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein.

In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein.

In accordance with some embodiments, an electronic device includes: a display, a touch-sensitive surface, and optionally one or more sensors to detect intensity of contacts with the touch-sensitive surface; and means for performing or causing performance of the operations of any of the methods described herein.

In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for providing and interacting with a drawing aid, thereby increasing the effectiveness, efficiency, and user satisfaction with such devices. Such methods and interfaces may complement or replace conventional methods for providing and interacting with a virtual drawing aid.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6I are flow diagrams illustrating a method of providing and interacting with a drawing aid (e.g., an on-screen ruler) in accordance with some embodiments.

FIG. 7 is a flow diagram illustrating a method of providing and interacting with a drawing aid (e.g., an on-screen ruler) in accordance with some embodiments.

FIGS. 8A-8C are flow diagrams illustrating a method of providing and interacting with a drawing aid (e.g., a free-form line) in accordance with some embodiments.

FIGS. 9A-9C are flow diagrams illustrating a method of providing and interacting with a drawing aid (e.g., rotating an on-screen ruler) in accordance with some embodiments.

DESCRIPTION OF EMBODIMENTS

In an application that provides free-hand sketching capabilities, such as a note-taking application, a sketching application, a scrapbooking application, etc., drawing tools are provided to a user to draw lines and objects of various colors and textures. Although free-hand sketching is fast and convenient in many cases, a user may also desire to employ a drawing aid from time to time to make the sketching more accurate and polished. The present disclosure describes devices, methods, and user interfaces that provide an on-screen ruler that provides many functions that facilitate free-hand sketching by the user, including, line-drawing, masking, and fill functions. In some embodiments, some of the functions of the on-screen ruler are also provided by a free-form line drawn by the user. In other words, the user may create a customized virtual drawing aid of any desired shape on the fly through free-form line-drawing. In addition, various intuitive ways of manipulating and interacting with the on-screen ruler or user-created drawing aid (e.g., a free-form line) are also provided herein.

Figure 2:
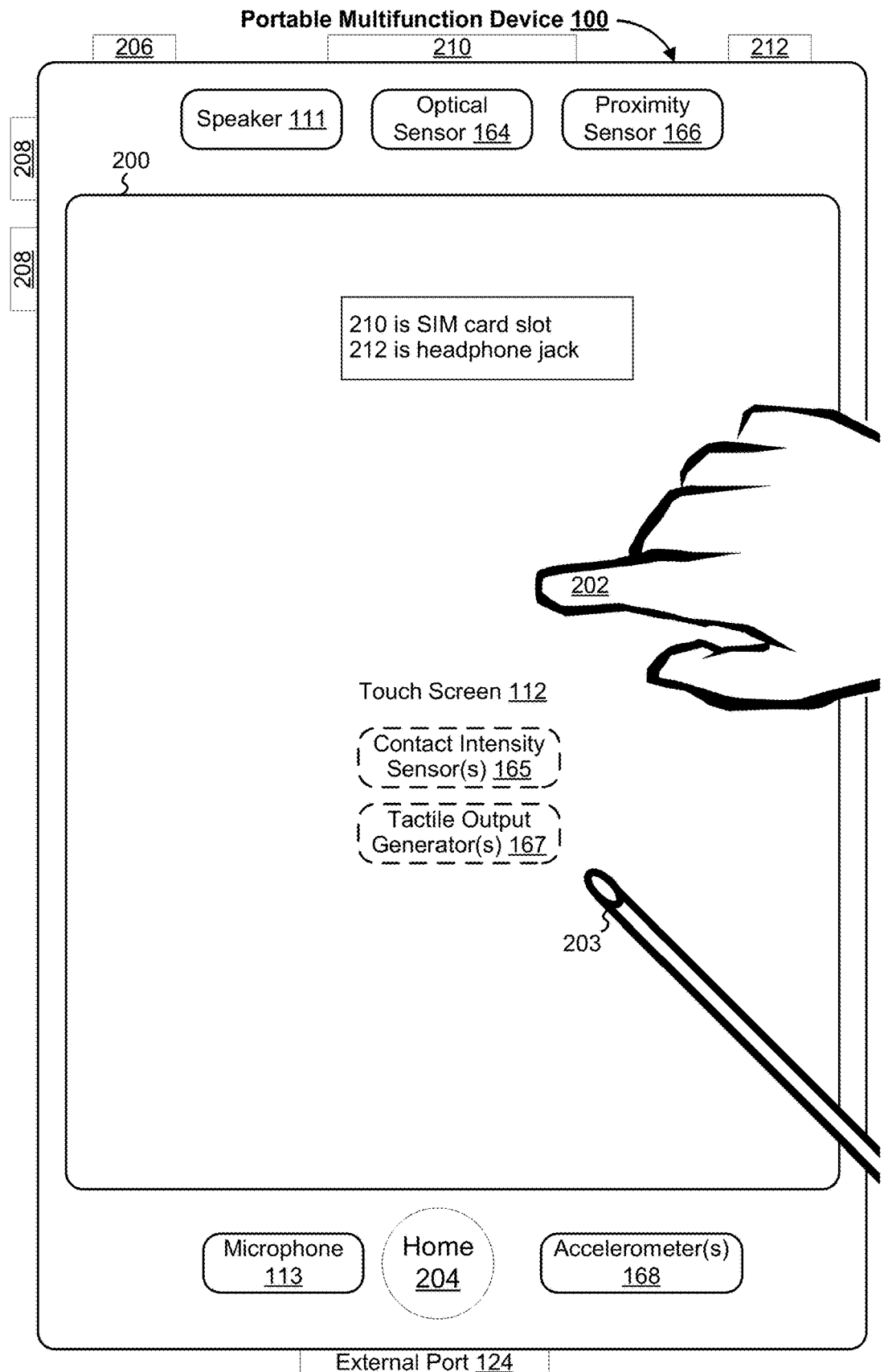
FIG. 2 illustrates a portable multifunction device having a touch screen in accordance with some embodiments.
Figure 3:
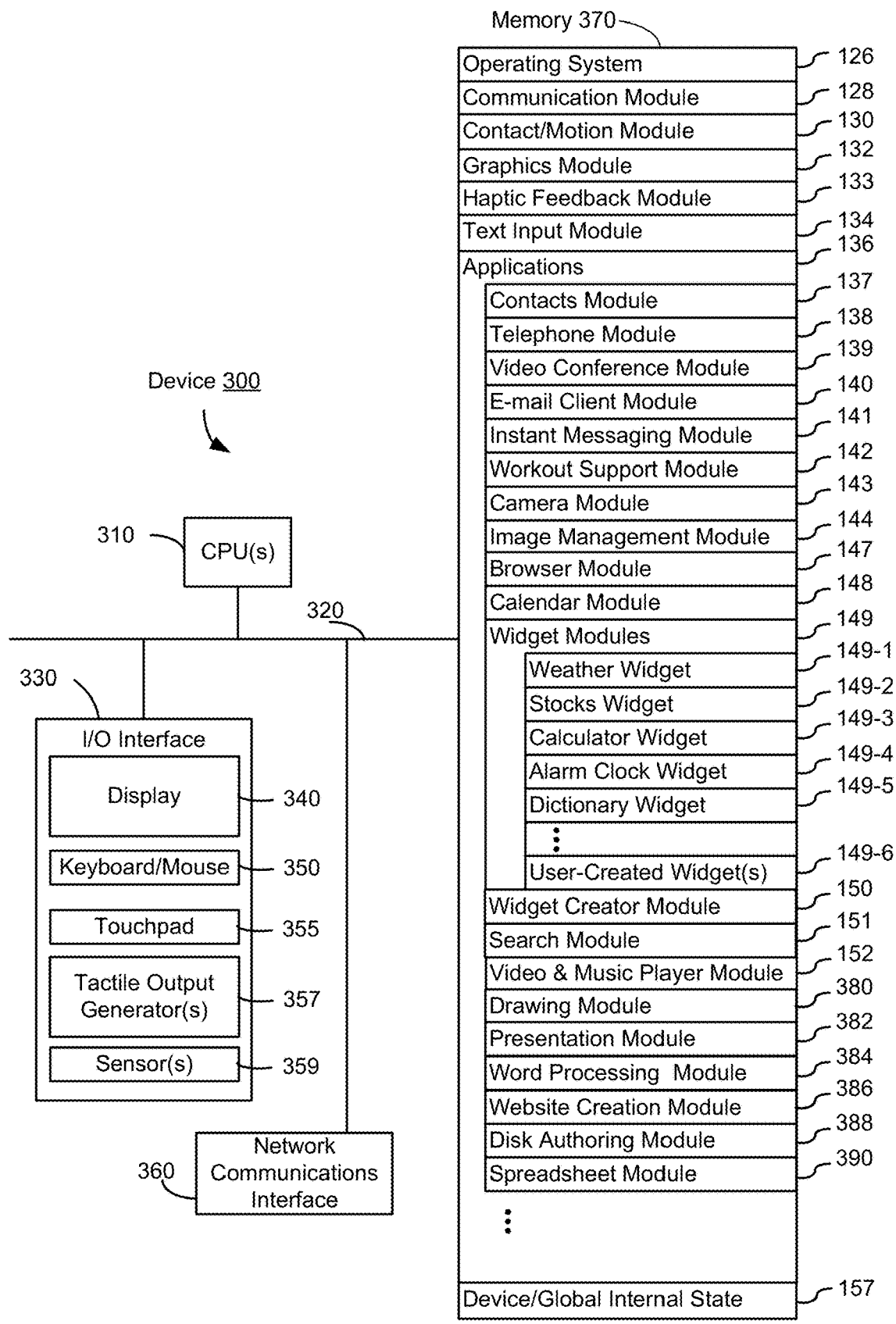
FIG. 3 is a block diagram of an exemplary multifunction device with a display and a touch-sensitive surface in accordance with some embodiments.
Figure 4A:
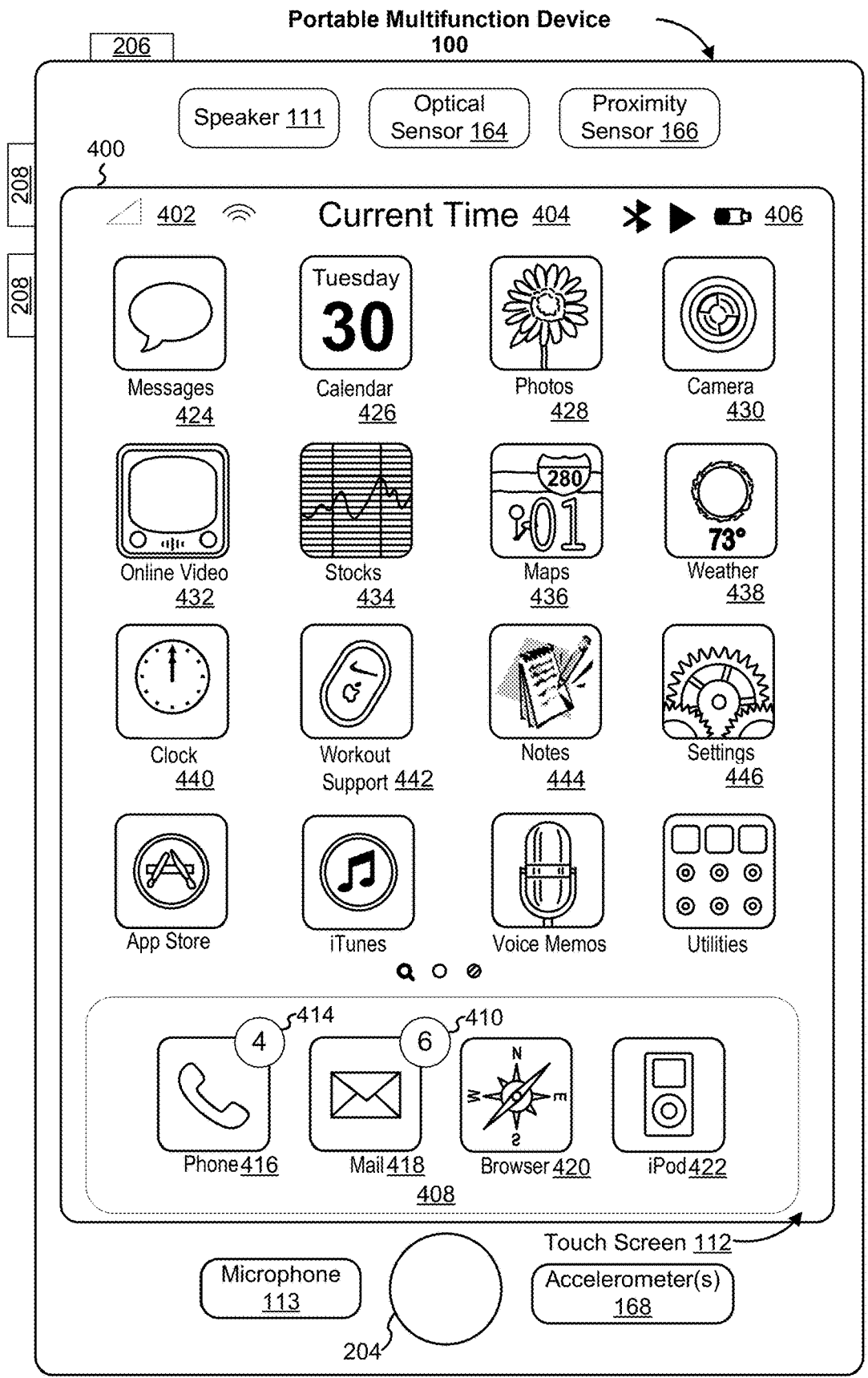
FIG. 4A illustrates an exemplary user interface for a menu of applications on a portable multifunction device in accordance with some embodiments.
Figure 5A:
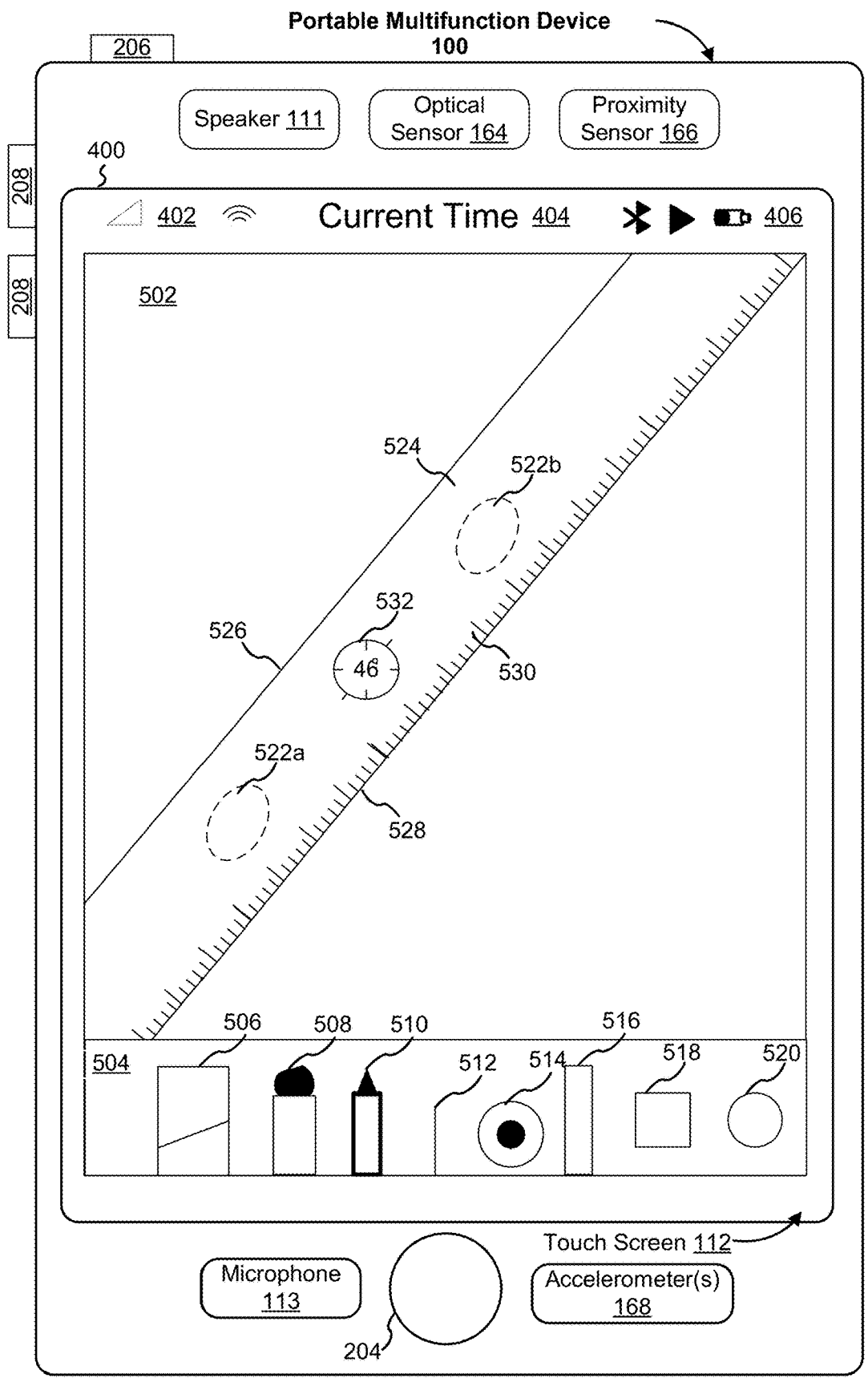
FIGS. 5A-5AL illustrate exemplary user interfaces for providing and interacting with a drawing aid (e.g., an on-screen ruler, a free-form line, etc.) in accordance with some embodiments.
Figure 10:
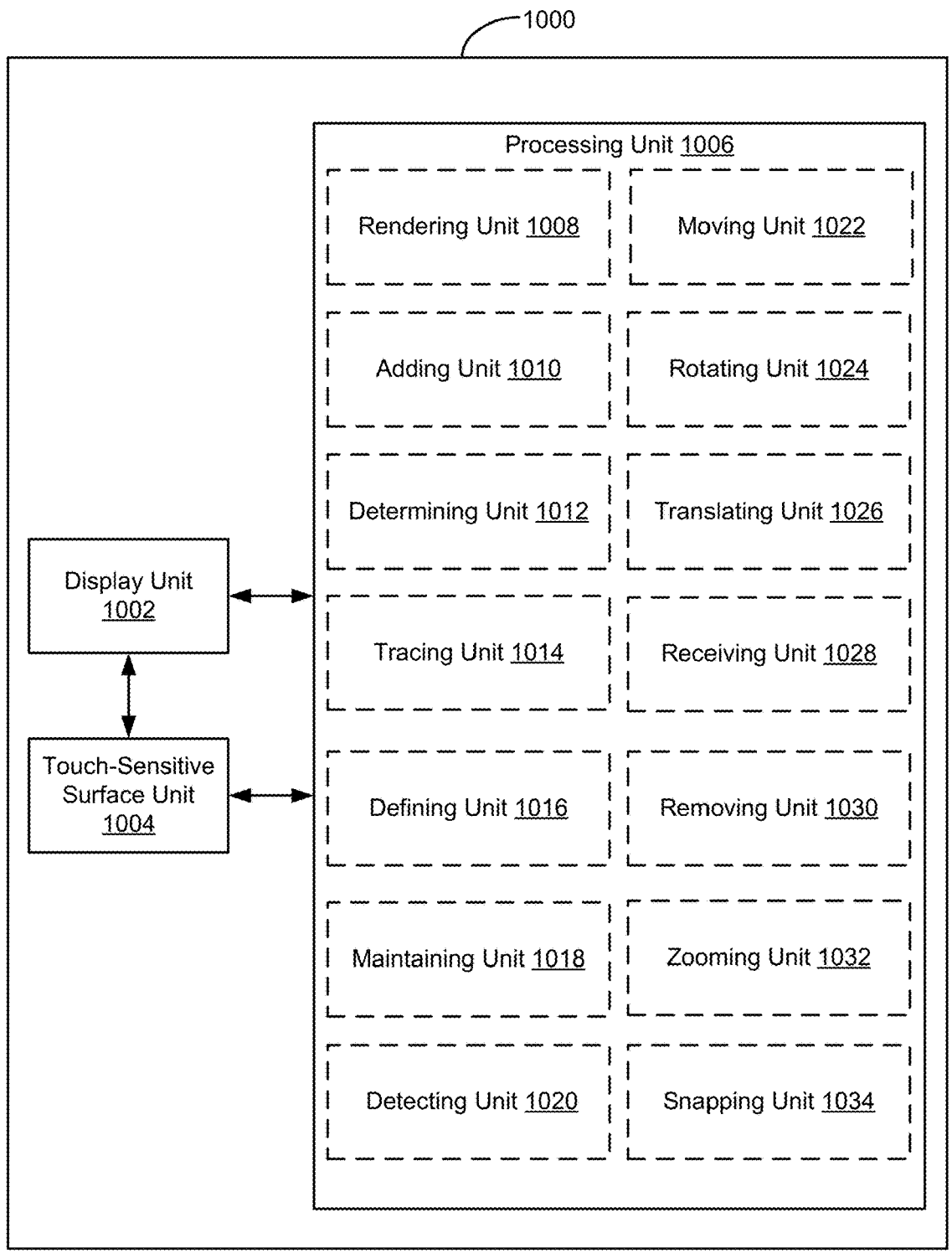
FIG. 10 is a functional block diagram of an electronic device in accordance with some embodiments.
Figure 11:
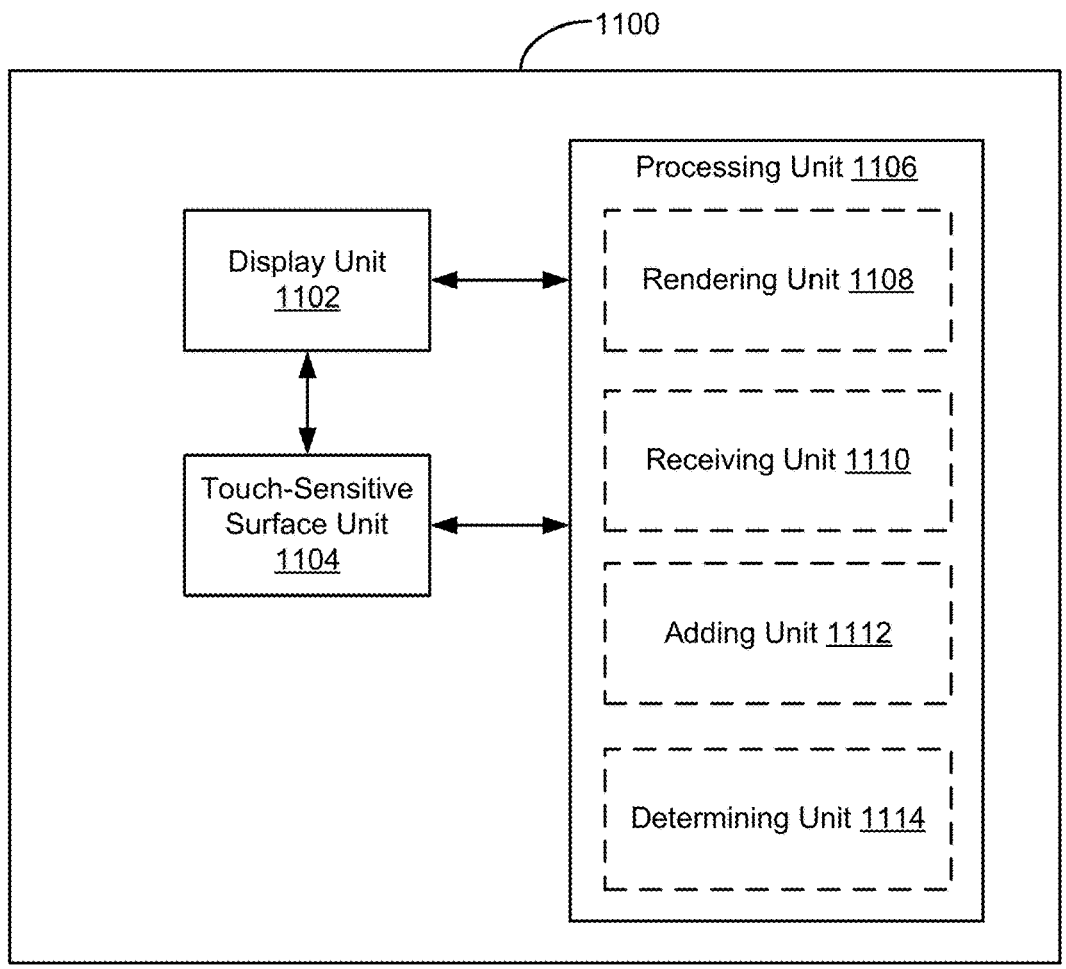
FIG. 11 is a functional block diagram of an electronic device in accordance with some embodiments.

Below, FIGS. 1A-1B, 2, and 3 provide a description of exemplary devices. FIGS. 4A-4B and 5A-5AL illustrate exemplary user interfaces for providing and interacting with a virtual drawing aid. FIGS. 6A-6I illustrate a flow diagram of a method of providing and interacting with a virtual drawing aid (e.g., an on-screen ruler). FIG. 7 illustrate a flow diagram of a method of providing and interacting with a virtual drawing aid (e.g., an on-screen ruler). FIGS. 8A-8C illustrate a flow diagram of a method of providing and interacting with a virtual drawing aid (e.g., a free-form line). FIGS. 9A-9C illustrate a flow diagram of a method of providing and interacting with a virtual drawing aid (e.g., rotating an on-screen ruler). The user interfaces in FIGS. 5A-5AL are used to illustrate the processes in FIGS. 6A-6I, 7, 8A-8C, and 9A-9C. FIGS. 10 and 11 illustrate exemplary electronic devices that implement the user interfaces in FIGS. 5A-5AL and the processes in FIGS. 6A-6I, 7, 8A-8C, and 9A-9C.

EXEMPLARY DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
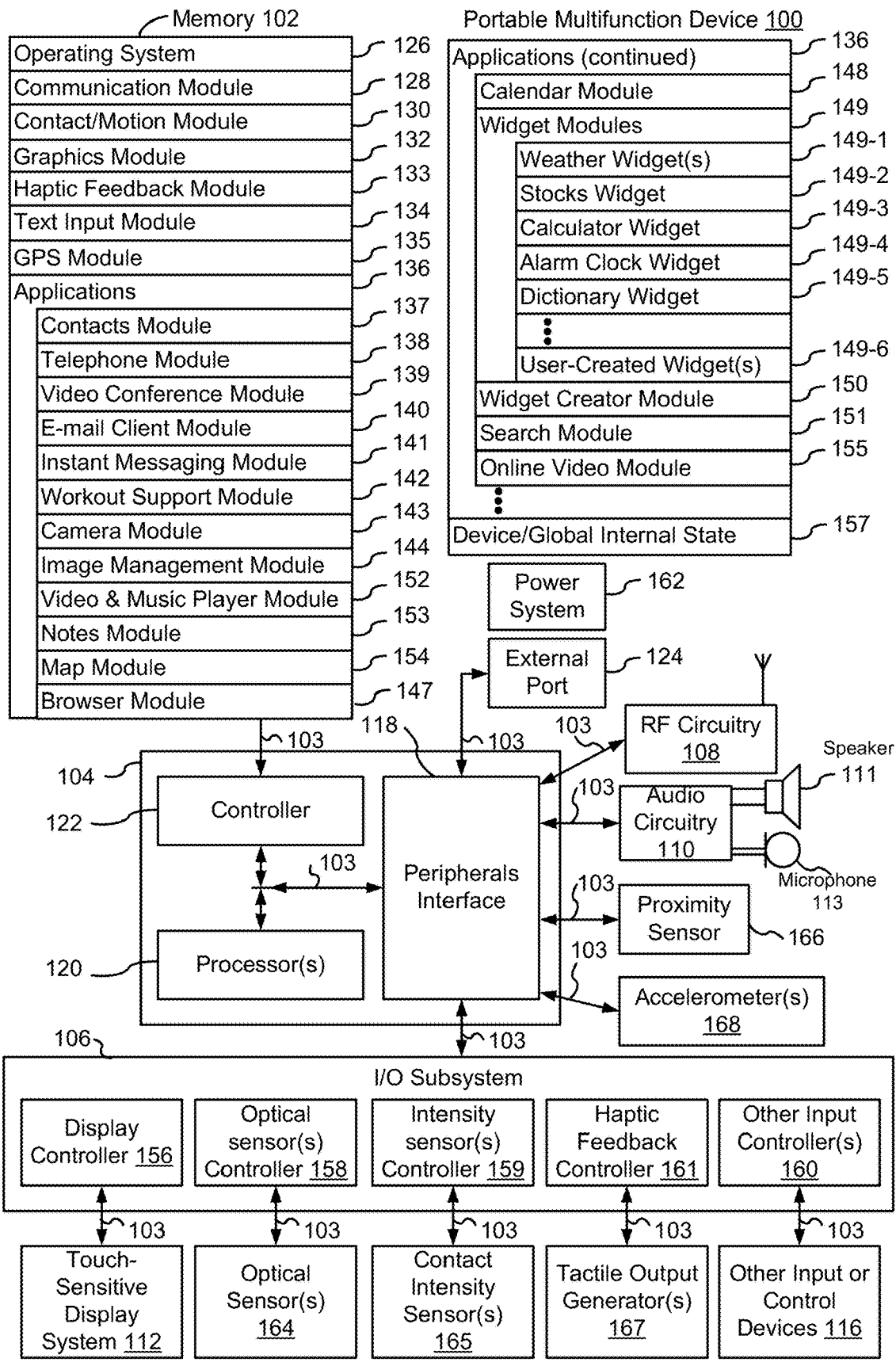
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back-and-forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, 1M 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
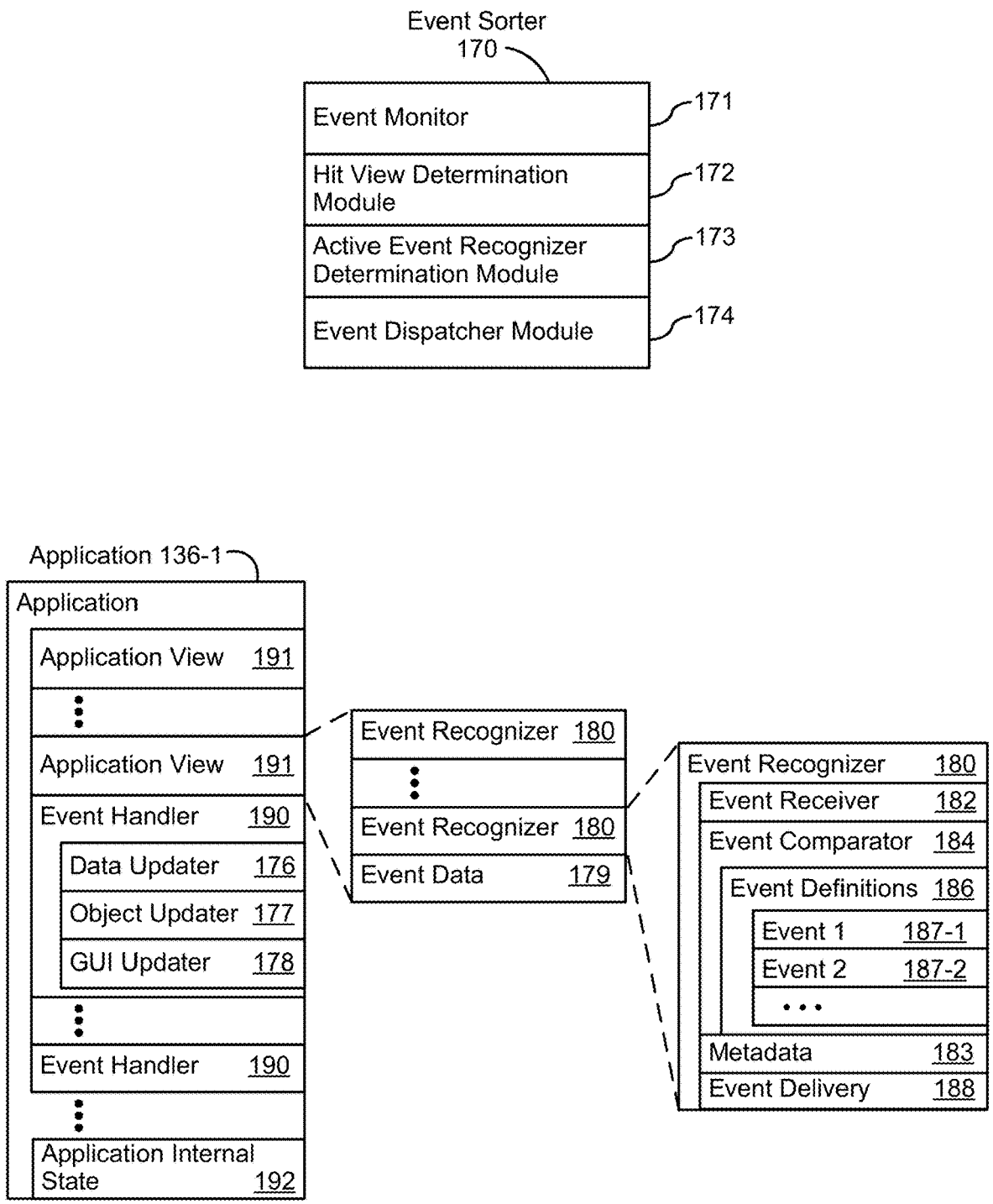
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
Icon 424 for IM module 141, labeled "Text;"
Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

FIGS. 5A-5AL illustrate exemplary user interfaces for providing and interacting with a virtual drawing aid (e.g., an on-screen ruler, a free-form line, etc.) in accordance with some embodiments. The exemplary user interfaces in these figures are used to illustrate the processes described below, including the processes in FIGS. 6A-6I, 7, 8A-8C, and 9A-9C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates user interface 400 of an application (e.g., a notes application, a sketch application, a scrapbooking application, etc.) that provides a sketching functionality for a portable electronic device (e.g., device 100, 1A). As shown in FIG. 5A, user interface 400 includes sketch area 502 (e.g., a drawing canvas with a background color) for drawing lines and objects according to a user's drawing input. In some embodiments, user interface 400 also includes tool selection area 504. In some embodiments, tool selection area 504 includes icons representing various drawing tools (e.g., eraser tool 506, paint brush tool 508, pencil tool 510, etc.). In some embodiments, tool selection area 504 includes icons representing various fill modes (e.g., line-fill mode 512, block-fill mode 514, etc.). In some embodiments, tool selection area 504 includes icons representing various drawing aids (e.g., ruler 516, square 518, circle 520, etc.). In some embodiments, tool selection area 504 is called up or dismissed in response to user input (e.g., an upward swipe from the bottom edge of user interface 400 or sketch area 502 brings up tool selection area 504; while a downward swipe toward the bottom edge dismisses tool selection area 504).

As shown in FIG. 5A, in some embodiments, detection of two simultaneous and stationary contacts 522*a* and 522*b* (e.g., two finger contacts, two stylus contacts, or one finger contact and one stylus contact) on a touch-sensitive surface (e.g., touch screen 112) at two locations corresponding to two separate points within sketch area 502 causes a virtual drawing aid (e.g., straight-edged ruler 524) to appear on a display coupled to the touch-sensitive surface (e.g., touch screen 112).

In some embodiments, the virtual drawing aid (e.g., straight-edged ruler 524) is displayed only after lift-off of the two contacts is detected. For example, a wide two-finger tap gesture on touch screen 112 (e.g., two fingers are spaced out by at least a threshold distance when touching down on and lifting off of touch screen 112) within sketch area 502 causes the display of the virtual drawing aid (e.g., straight-edge ruler 524) to appear at the location of the wide two-finger tap gesture.

In some embodiments, the virtual drawing aid (e.g., straight-edge ruler 524) is displayed before lift-off of one or both of the contacts is detected, and subsequent movement of the contact(s) that remain on the touch-sensitive surface are then detected as part of another input for manipulating the virtual drawing aid (e.g., straight-edge ruler 524). For example, in some embodiments, after two fingers touched down on touch screen 112 to cause straight-edge ruler 524 to appear on the touch screen, one of the fingers may lift up, and the remaining finger contact on the touch screen can move on the touch screen to drag straight-edge ruler 524 with the finger contact. In another example, in some embodiments, after two fingers touched down on touch screen 112 to cause straight-edge ruler 524 to appear on the touch screen, one of the finger contacts may stay stationary while the other finger contact pivots around the stationary finger contact on the touch-screen to rotate straight-edge ruler 524 with the pivoting finger contact.

In some embodiments, straight-edge ruler 524 has two opposing straight edges 526 and 528. In some embodiments, straight-edge ruler 524 includes only one straight edge that delineates its boundary on one-side. In some embodiments, tick marks 530 are displayed along one or both edges of straight-edge ruler 524 to indicate the length scale of straight-edge ruler 524. In some embodiments, the size and spacing of tick marks 530 is dependent on the size of sketch area 502 and/or the screen resolution of the display (e.g., touch screen 112). In some embodiments, the size and spacing of the tick marks are user-configurable. In some embodiments, tick marks 530 are not displayed until a predetermined user input (e.g., movement of a contact on the touch-sensitive surface that corresponds to movement along one of the ruler edges, or a tap on the ruler edge) is detected.

In some embodiments, straight-edge ruler 524 is opaque and completely shields content (e.g., text or sketches currently existing on the canvas) that is underneath straight-edge ruler 524 in sketch area 502. In some other embodiments, straight-edge ruler 524 is transparent or semi-transparent and reveals content that is underneath straight-edge ruler 524 in sketch area 502. In some embodiments, content directly underneath straight-edge ruler 524 is distorted (e.g., magnified, de-magnified, or shifted) to mimic a refractive property of straight-edge ruler 524.

In some embodiments, when straight-edge ruler 524 is displayed, the body of straight-edge ruler 524 is centered about a virtual line on the display that corresponds to a line connecting the two contacts (e.g., 522*a*, 522*b*) detected on the touch-sensitive surface. In some embodiments, the initial location of the straight-edge ruler 524 (e.g., as represented by a center of the ruler) on the display is snapped to the nearest one of a set of predetermined snap coordinates (e.g., coordinates on a background grid) on the display.

In some embodiments, when straight-edge ruler 524 is displayed, the initial orientation of straight-edge ruler 524 is determined based on the direction of a virtual line connecting the two contacts 522*a* and 522*b* on the touch-sensitive surface (e.g., touch screen 112). In some embodiments, angle indicator 532 is displayed in the interior portion of straight-edge ruler 524 (or at another location in user interface 400) to indicate the current orientation of straight-edge ruler 524. In some embodiments, the angular value shown in angle indicator 532 is dynamically updated as straight-edge ruler 524 is rotated. In some embodiments, the initial orientation of straight-edge ruler 524 is snapped to the nearest snap angle among a set of predetermined snap angles (e.g., every 5 degrees between 0-355 degrees). In some embodiments, angle indicator 532 includes tick marks or line segments to indicate the orientation of straight-edge ruler 524 and landmark angular values (e.g., 0, 45, 90, 135, 180 degrees, etc.). In some embodiments, angle indicator 532 is not displayed until one or more predetermined criteria (e.g., when the ruler is rotated, or when a tap on the ruler is detected) are satisfied.

In some embodiments, in addition to a predetermined gesture (e.g., a wide two-finger tap gesture) selection of ruler tool 516 in tool selection area 504 also causes straight-edge ruler 524 to appear on sketch area 502. In some embodiments, straight-edge ruler 524 has a default orientation (e.g., 45 degrees relative to the horizontal direction) when it is called up by the selection of ruler tool 516.

In some embodiments, straight-edge ruler 524 automatically disappears after a period of inactivity (e.g., when no user input directed to straight-edge ruler 524 has been received for at least a predetermined period of time). In some embodiments, straight-edge ruler 524 is dismissed from the display in response to a predetermined dismissal input (e.g., a pinch gesture (e.g., two contacts moving toward each other) detected on the touch-sensitive surface at a location that corresponds to the on-screen location of straight-edge ruler 524).

In some embodiments, depending on how the ruler was called up to the display, different heuristics are used to determine when the ruler is dismissed from the display. In some embodiments, if straight-edge ruler 524 was called up by the selection of ruler tool 516, straight-edge ruler 524 is dismissed by a pinch gesture on the ruler; and if straight-edge ruler 524 was called up by two contacts on the canvas within sketch area 502, the ruler is dismissed by the pinch gesture or after a period of inactivity. In some embodiments, the pinch gesture dismisses the ruler regardless of how the ruler was called up; and if the ruler was called by the selection of ruler tool 516, the ruler is also dismissed when another drawing aid is activated by the selection of such other drawing aid (e.g., square tool 518 or circle tool 520) in tool selection area 504. In some embodiments, if straight-edge ruler 524 was called up by the selection of ruler tool 516, straight-edge ruler 524 is dismissed after a first period of inactivity; and if straight-edge ruler 524 was called up by two contacts on the canvas, straight-edge ruler 524 is dismissed after a second period of inactivity that is different from (e.g., shorter than, or longer than) the first period of inactivity.

Although FIG. 5A shows a straight-edge ruler as an example of the ruler tool, rulers of other shapes are possible. As used herein, the term "ruler", unless otherwise specified, includes any of straight-edge rulers with parallel straight edges, rulers with at least one straight edge and at least one curved edge, rulers with two straight edges forming an angle, rulers with curved edges, etc. In some embodiments, rulers with edges of other shapes and relationships facilitate line drawing, masking, and fill functions in a manner analogous to those of straight-edge ruler 524 that are described with respect to FIGS. 5F-5I, and 5N below, and may be manipulated in a manner analogous to straight-edge ruler 524 as described with respect to FIGS. 5A, 5D-5E, 5J-5M, 5O, and 5V-5AL herein.

Figure 5B:
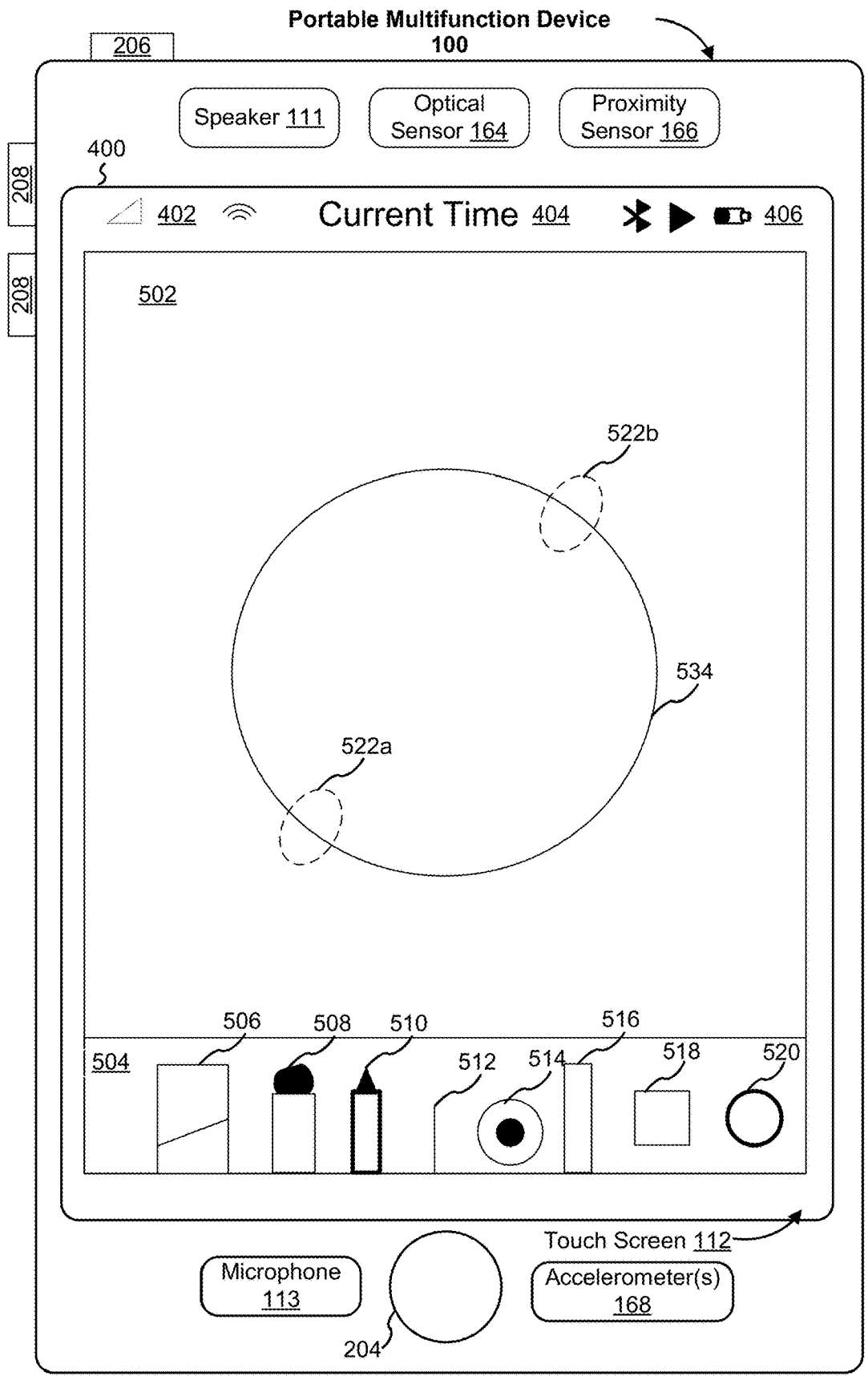
Figure 5C:
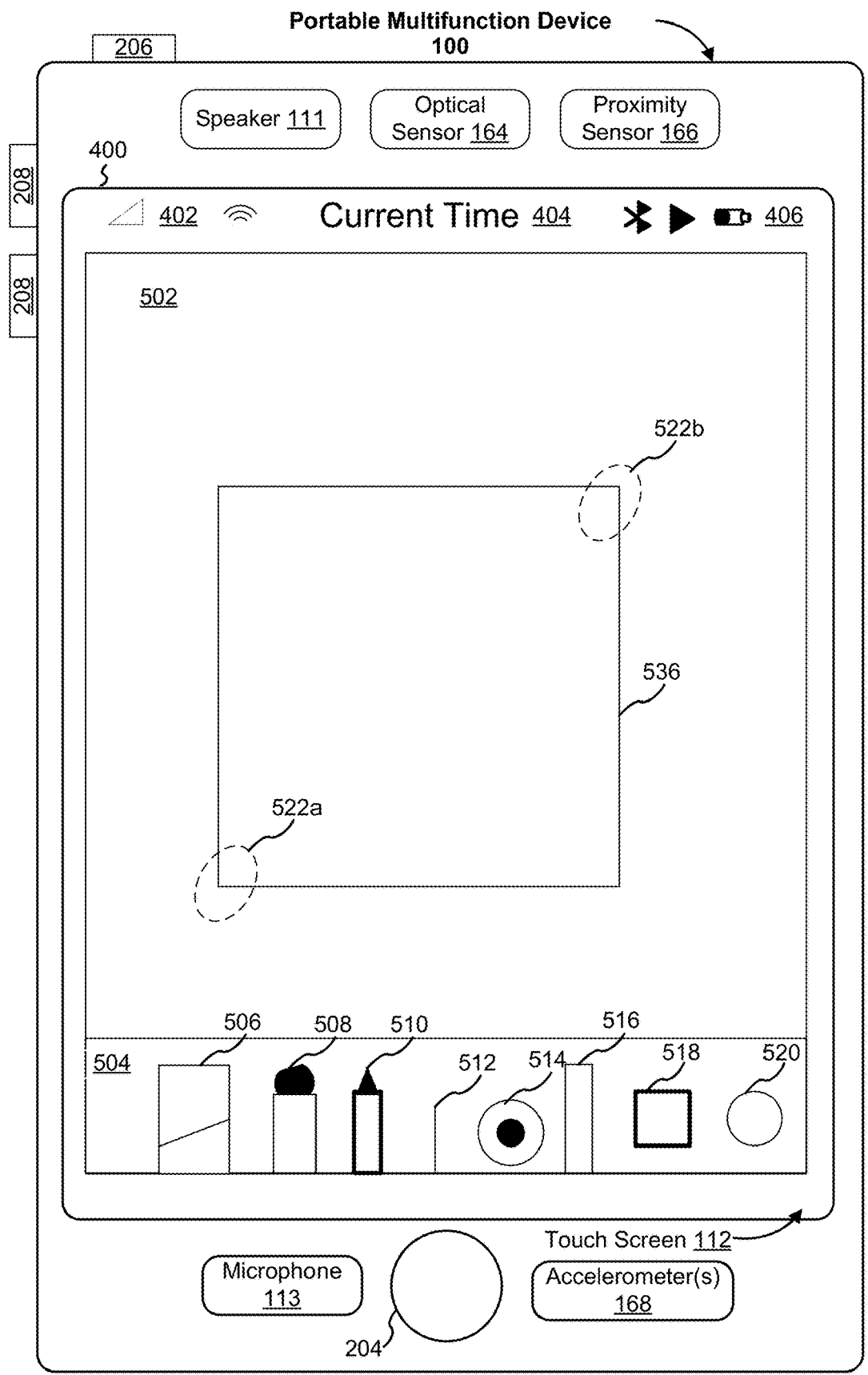

FIGS. 5B-5C illustrate two other virtual drawing aids that may be displayed in response to detection of two simultaneous and stationary contacts 522a and 522b (e.g., two finger contacts, two stylus contacts, or one finger contact and one stylus contact) on a touch-sensitive surface (e.g., touch screen 112) at two locations corresponding to two separate points within sketch area 502.

In FIG. 5B, a circle (e.g., circle 534) is displayed in response to two simultaneous and stationary contacts 522a and 522b (e.g., finger contacts of a wide two-finger tap gesture). The radius of circle 534 is determined based on (e.g., equal to or corresponds to) the spacing between the two contacts on the touch-sensitive surface. In some embodiments, before lift-off of contacts 522a and 522b is detected, contacts 522a and 522b may move toward each other on the touch-sensitive surface and cause a corresponding decrease in the radius of circle 534, or move away from each other on the touch-sensitive surface and cause a corresponding increase in the radius of circle 534. In some embodiments, before lift-off of contacts 522a and 522b is detected, contacts 522a and 522b may move in a synchronized fashion in one direction or another on the touch-sensitive surface and cause corresponding movement of circle 534 on the display.

In some embodiments, circle 534 is a drawing aid that facilitates line drawing, masking, and fill functions in a manner analogous to those of straight-edge ruler 524 that are described with respect to FIGS. 5F-5I, and 5N below. In some embodiments, depending on the tool that is currently selected in tool selection area 504, the detection of the two contacts 522a and 522b either adds circle 534 as a content object in sketch area 502 or as a virtual drawing aid. For example, in some embodiments, if a drawing tool (e.g., pencil tool 510) is selected in tool selection area 504 and no drawing aid is selected in tool selection area 504, circle 534 is drawn as a content object in sketch area 502 in response to the detection of the two contacts 522a and 522b. If circle tool 520 is selected in tool selection area 504, circle 534 is displayed as a virtual drawing aid in sketch area 502.

In FIG. 5C, a square (e.g., square 536) is displayed in response to two simultaneous and stationary contacts 522a and 522b (e.g., finger contacts of a wide two-finger tap gesture). The diagonal of square 536 is determined based on (e.g., equal to or corresponds to) the spacing between the two contacts on the touch-sensitive surface. In some embodiments, before lift-off of contacts 522a and 522b is detected, contacts 522a and 522b may move toward each other on the touch-sensitive surface and cause a corresponding decrease in the diagonal length of square 536, or move away from each other on the touch-sensitive surface and cause a corresponding increase in the diagonal length of square 536. In some embodiments, before lift-off of contacts 522a and 522b is detected, contacts 522a and 522b may move together in a synchronized fashion in one direction or another on the touch-sensitive surface and cause corresponding movement of square 536 on the display.

In some embodiments, square 536 is a drawing aid that facilitate line drawing, masking, and fill functions in a manner analogous to those of straight-edge ruler 524 that are described with respect to FIGS. 5F-5I, and 5N below. In some embodiments, depending on the tool that is currently selected in tool selection area 504, the detection of the two contacts 522a and 522b either adds square 536 as a content object in sketch area 502 or as a virtual drawing aid. For example, in some embodiments, if a drawing tool (e.g., pencil tool 510) is selected in tool selection area 504 and no drawing aid is selected in tool selection area 504, square 536 is drawn as a content object in sketch area 502 in response to the detection of the two contacts 522a and 522b. If square tool 518 is selected in tool selection area 504, square 536 is displayed as a virtual drawing aid in sketch area 502.

In some embodiments, when two simultaneous and stationary contacts 522a and 522b (e.g., two finger contacts, two stylus contacts, or one finger contact and one stylus contact) are detected on a touch-sensitive surface (e.g., touch screen 112) at two locations corresponding to two separate points within sketch area 502, the device 100 determines which one of the virtual drawing aids (e.g., straight-edge ruler 524, circle 534, and square 536) to display, based on which drawing aid is currently selected in tool selection area 504. In some embodiments, other drawing aids, such as an angle, an arc, a curvature template, etc. can also be displayed in response to the detection of two simultaneous and stationary contacts 522a and 522b on a touch-sensitive surface (e.g., touch screen 112) at two locations corresponding to two separate points within sketch area 502, when a corresponding drawing aid icon has been selected in tool selection area 504.

Figure 5D:
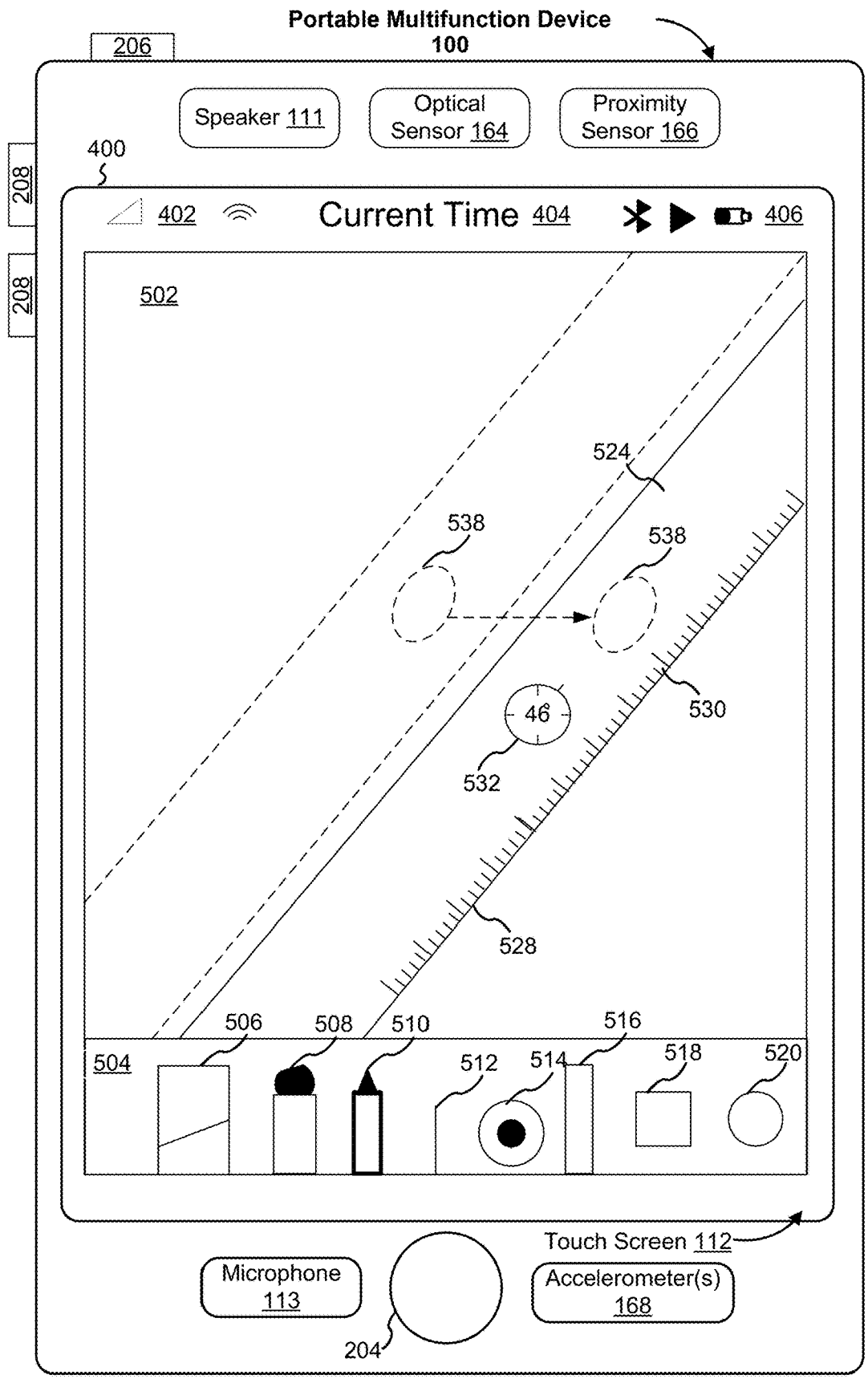

FIG. 5D illustrates translation of the virtual drawing aid (e.g., straight-edge ruler 524) on the display. In some embodiments, the virtual drawing aid is translated on sketch area 502 relative to the content drawn on the canvas within sketch area 502. As shown in FIG. 5D, in some embodiments, a single contact (e.g., contact 538) detected on the touch-sensitive surface at a location corresponding to the on-screen location of the virtual drawing aid (e.g., straight-edge ruler 524) grabs and moves the virtual drawing aid. The movement of the drawing aid (e.g., straight-edge ruler 524) on the display corresponds to the movement of the contact on the touch-sensitive surface. As shown in FIG. 5D, when the virtual drawing aid (e.g., straight-edge ruler 524) is moved by the contact, the orientation of the drawing aid is maintained.

In some embodiments, the movement of contact 538 detected on the touch-sensitive surface (e.g., touch screen 112) is determined to be a translation gesture in accordance with a determination that the initial location of contact 538 on the touch-sensitive surface corresponds to an on-screen location that is within a central portion of the drawing aid (e.g., the central portion of straight-edge ruler 524). In some embodiments, the central portion of the drawing aid is defined as an interior region of the drawing aid that is at least partially enclosed by the edge(s) of the virtual drawing aid (e.g., edges 526 and 528 of straight-edge ruler 524) and that is at least a threshold distance away from any of the edge(s) of the virtual drawing aid (e.g., edges 526 and 528 of straight-edge ruler 524).

Figure 5E:
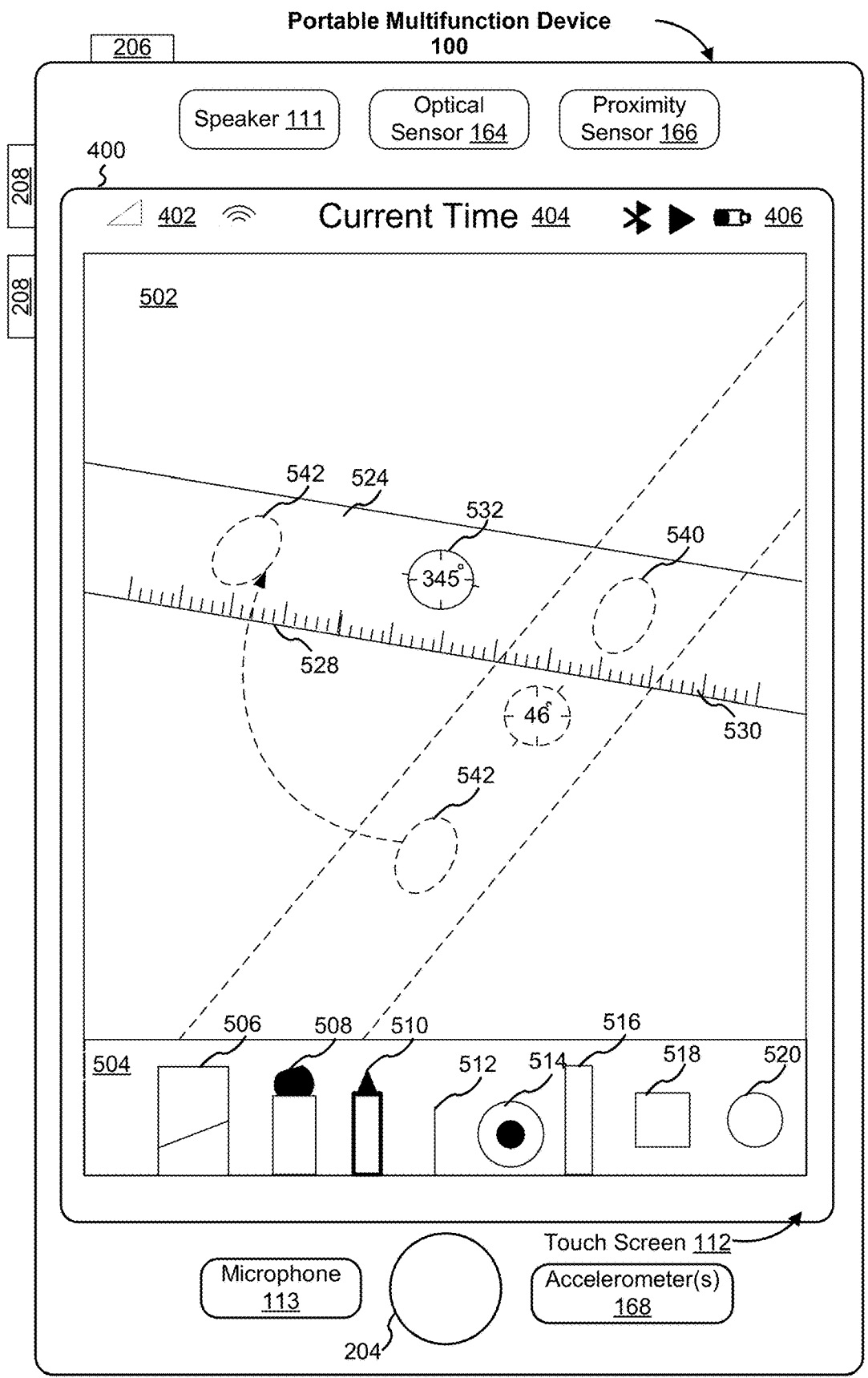

FIG. 5E illustrates rotation of a virtual drawing aid (e.g., straight-edge ruler 524) on the display. In some embodiments, the virtual drawing aid is rotated on sketch area 502 relative to the content drawn on the canvas within sketch area 502. As shown in FIG. 5E, in some embodiments, a pivoting gesture is detected on the touch-sensitive surface, where the pivoting gesture includes a stationary contact (e.g., stationary contact 540) at a first location on the touch-sensitive surface that corresponds to a first point on the virtual drawing aid (e.g., straight-edge ruler 524), and a pivoting contact (e.g., pivoting contact 542) at a second location on the touch-sensitive surface that corresponds to a second point on the virtual drawing aid (e.g., straight-edge ruler 524). In response to the pivoting movement of pivoting contact 542, one portion of the virtual drawing aid (e.g., straight-edge ruler 524) moves (or pivots) around another portion of the virtual drawing aid held stationary by stationary contact 540, resulting in the rotation of the virtual drawing aid (e.g., straight-edge ruler 524).

As shown in FIG. 5E, in some embodiments, an angle indicator (e.g., angle indicator 532) is displayed on the virtual drawing aid (e.g., straight-edge ruler 524) to indicate the current orientation of the virtual drawing aid (e.g., straight-edge ruler 524) during the rotation of the virtual drawing aid. In some embodiments, the angle indicator automatically disappears after the rotation has stopped. In some embodiments, the virtual drawing aid automatically snaps to the nearest snap angle among a set of preset snap angles (e.g., every five degrees from 0-355 degrees) when the termination of the pivoting gesture is detected (e.g., when lift-off of one or both of the contacts 540 and 542 is detected).

Figure 5F:
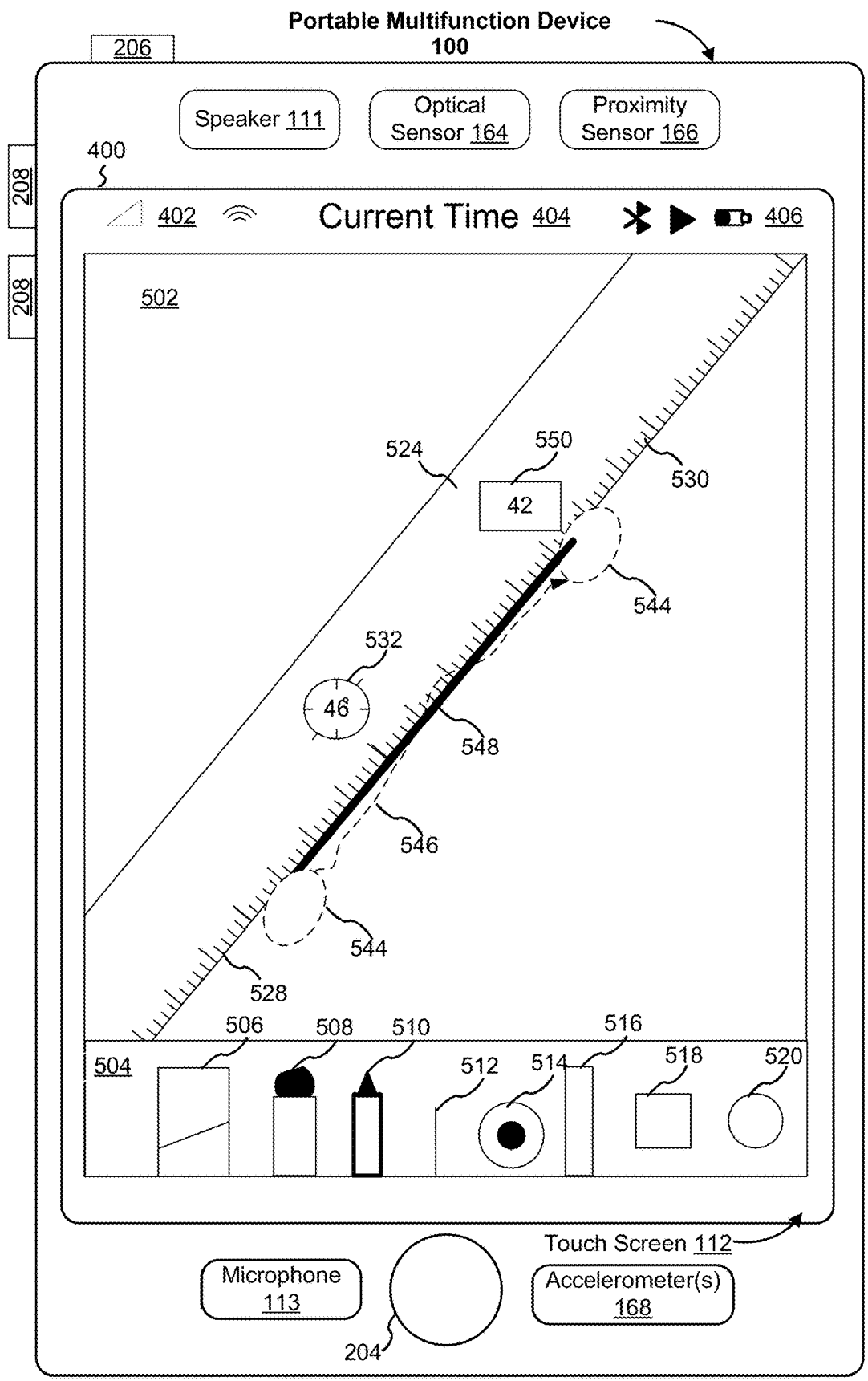

FIG. 5F illustrates how the virtual drawing aid (e.g., straight-edge ruler 524) facilitates a line drawing function in accordance with some embodiments. In some embodiments, to draw a line in the sketch area, a drawing tool that has the desired color and texture is selected from tool selection area 504. For example, a pencil tool 510 may be selected to draw a relatively fine line with a relatively uniform pencil mark texture, while a brush tool 508 may be selected to draw a relatively thick line with a more variable texture that depends on the intensity of the contact used to draw the line. In some embodiments, the eraser tool is treated like a drawing tool such as a pencil or paint brush, except that, instead of adding colors to pixels in the path of the drawing tool in the sketch area, the eraser tool changes any existing colors of the pixels in the path of the eraser tool to the background color of the drawing canvas.

After the drawing tool (e.g., pencil tool 510) is selected, a line (e.g., line 548) is drawn against a first edge of the virtual drawing aid (e.g., edge 528 of straight-edge ruler 524) in sketch area 502 in response to movement of contact 544 detected on the touch-sensitive surface that corresponds to on-screen movement along the edge of the first virtual drawing aid. In some embodiments, as shown in FIG. 5F, in order for line 548 to be drawn in accordance with the first edge of the virtual drawing aid (e.g., edge 528 of straight-edge ruler 524), on-screen path 546 of the movement that corresponds to the movement of contact 544 on the touch-sensitive surface (e.g., touch screen 112) is confined within a predetermined threshold distance (e.g., 10 pixels) from the first edge (e.g., edge 528 of straight-edge ruler 524). In some embodiments, as shown in FIG. 5F, even if on-screen path 546 is not smooth or straight, or strictly conform to the shape of the first edge of the virtual drawing aid (e.g., edge 528 of straight-edge ruler 524), the resulting line 548 drawn against the first edge is smooth and perfectly conforms to the shape of the first edge of the virtual drawing aid (e.g., edge 528 of straight-edge ruler 524) so long as on-screen path 546 meets predefined criteria (e.g., remaining within a predefined threshold distance from the first edge of the virtual drawing aid).

In some embodiments, on-screen path 546 of the movement that corresponds to the movement of contact 544 on the touch-sensitive surface may cross in and out of the first edge (e.g., edge 528 of straight-edge ruler 524), but the resulting line 548 is completely delineated by the first edge (e.g., edge 528 of straight-edge ruler 524) and does not move into or away from the first edge of the virtual drawing aid (e.g., edge 528 of straight-edge ruler 524).

In some embodiments, the starting point and the end point of line 548 is determined based on the on-screen locations that correspond to the initial contact location and the lift-off location of contact 544 on the touch-sensitive surface (e.g., touch screen 112). In some embodiments, the beginning and/or the end of line 548 is automatically snapped to the nearest snap location(s) among a set of predetermined snap locations in sketch area 502. In some embodiments, the snap locations are determined based on the locations along the ruler edge (e.g., positions at every x units of tick marks on the ruler edge).

In some embodiments, a length indicator (e.g., length indicator 550) is displayed (e.g., near the end of line 548) to dynamically indicate the current length of line 548. In some embodiments, the length of the line is expressed in terms of the number of tick marks crossed by line 548. In some embodiments, the length of the line is expressed in terms of the actual real-world length of line 548 based on the length scale of the tick marks and the number of tick marks crossed by line 548.

In some embodiments, line 548 is completely uniform in texture and color throughout its length. In some embodiments, the color, saturation, and/or thickness of line 548 vary depending on variation of the intensity of contact 544 along path 546. For example, a higher intensity of contact 544 corresponds to a deeper, more saturated, and/or thicker portion of line 548. In some embodiments, when thickness of line 548 is varied along the length of line 548 due to changes in the intensity of contact 544 along on-screen path 546, the variation in line thickness is only reflected on one side of the line farther away from the first edge of the virtual drawing aid (e.g., edge 528 of straight-edge ruler 524), while the other side of the line is completely delineated by the first edge of the virtual drawing aid.

Figure 5G:
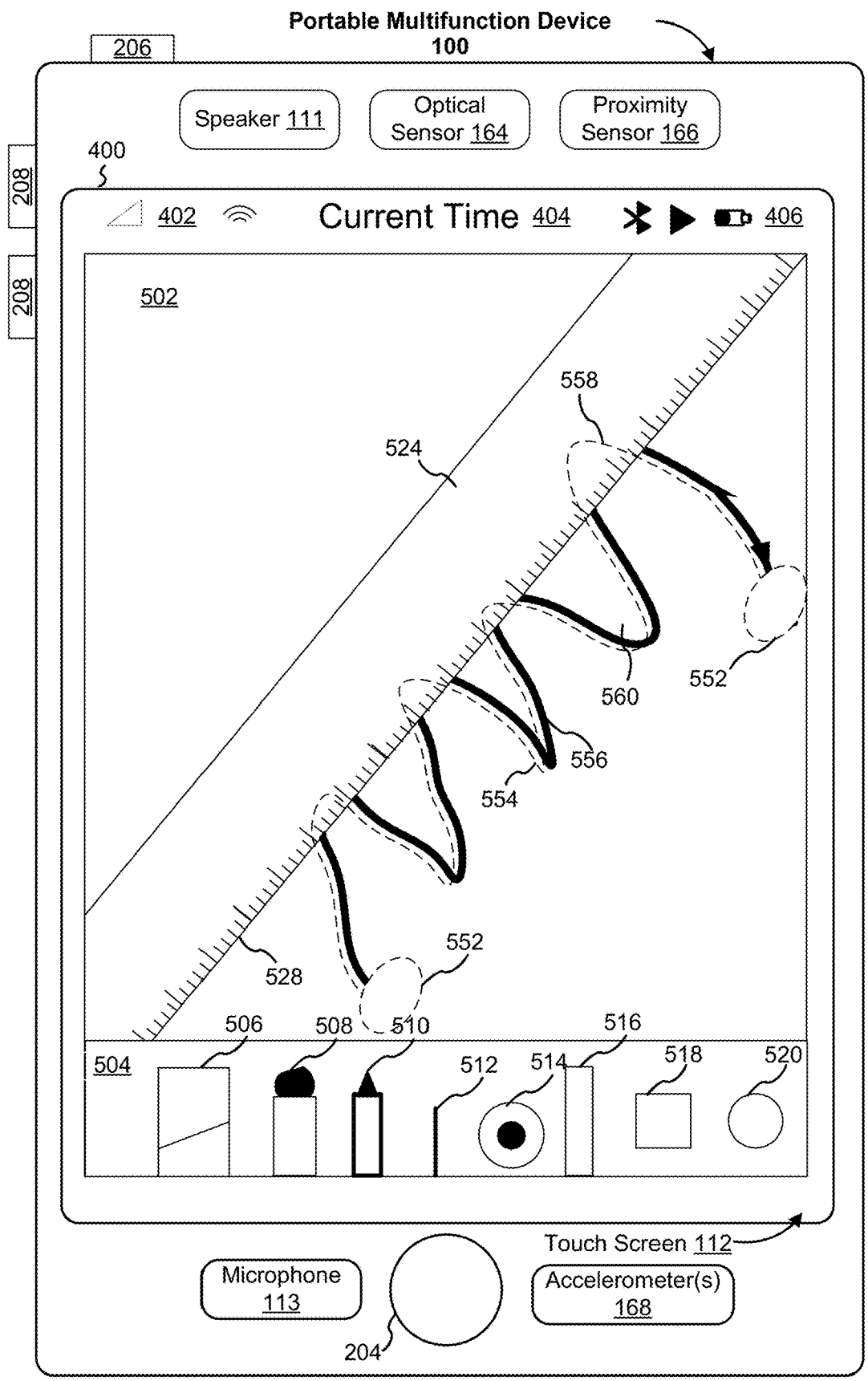

FIG. 5G illustrates a masking function provided by the virtual drawing aid (e.g., straight-edge ruler 524) in accordance with some embodiments. In some embodiments, the masking function of the virtual drawing aid is utilized in conjunction with a drawing tool (e.g., pencil tool 510) or eraser tool 506.

As shown in FIG. 5G, in some embodiments, the masking function of the virtual drawing aid (e.g., straight-edge ruler 524) is triggered when back-and-forth motion of a contact (e.g., contact 552) on the touch-sensitive surface (e.g., touch screen 112) is detected. In some embodiments, the back-and-forth motion is along directions that are at least a threshold angle (e.g., 30 degrees) away from the first edge of the virtual drawing aid (e.g., edge 528 of straight-edge ruler 524). In some embodiments, the masking function of the virtual drawing aid (e.g., straight-edge ruler 524) is triggered when an on-screen location corresponding to an initial position of contact 552 on the touch-sensitive surface is at least a threshold distance away from the first edge of the virtual drawing aid (e.g., edge 528 of straight-edge ruler 524) and is exterior to the body of the virtual drawing aid (e.g., straight-edge ruler 524), as shown in FIG. 5G. In some embodiments, the masking function of the virtual drawing aid (e.g., straight-edge ruler 524) is triggered when a movement of a contact on the touch-sensitive surface (e.g., touch screen 112) corresponds to on-screen movement that crosses the first edge of virtual drawing aid and that is along an on-screen direction at least a threshold angle (e.g., 30 degrees) away from the first edge of the virtual drawing aid (e.g., edge 528 of straight-edge ruler 524).

In some embodiments, as shown in FIG. 5G, when the masking function of the virtual drawing aid is triggered, line 556 drawn in sketch area 502 according to the movement of contact 552 on the touch-sensitive surface (e.g., touch screen 112) is masked by the virtual drawing aid, specifically, by the first edge of the virtual drawing aid (e.g., edge 528 of straight-edge ruler 524). As shown in FIG. 5G, although on-screen path 554 that corresponds to the movement of contact 552 on the touch-sensitive surface (e.g., touch screen 112) crosses the first edge of the virtual drawing aid (e.g., edge 528 of straight-edge ruler 524) at multiple places (e.g., region 558 is inside edge 528 and region 560 is outside of edge 528), line 556 that is drawn according to on-screen path 554 is masked by the first edge of the virtual drawing aid. In this example, line 556 is only visibly drawn on the exterior of the virtual drawing aid (e.g., straight-edge ruler 524), and is not drawn in the interior of the virtual drawing aid. Alternatively, line 556 is only visibly drawn on a first side of a first edge of the virtual drawing aid (e.g., the side of edge 528 corresponding to an initial position of contact 552 on the touch-sensitive surface relative to edge 528), and is not drawn on the other side (sometimes called the masked side) of the first edge of the virtual drawing aid. Thus, in these alternative embodiments, even if the contact 552 were to continue past the far side of the virtual drawing aid, line 556 would not be drawn at locations on the side of edge 528 opposite from the side corresponding to the initial location of contact 552.

Further, in some embodiments, if the eraser tool is selected while the masking function of the drawing aid is triggered, the eraser tool erases pixels' colors along the eraser's on-screen path only on the side of the canvas exposed by the first edge of the virtual drawing aid. As a result, the pixels underneath the body of the virtual drawing aid are shielded from the eraser even though the eraser's on-screen path may pass them. Alternatively, pixels on the masked side of first edge, opposite from the side corresponding to an initial location of contact 552, are shielded from the eraser even though the eraser's (i.e., the contact's) on-screen path may pass them.

In some embodiments, the masking function of the virtual drawing aid is utilized for both a line-fill mode and a block-fill mode. In the line-fill mode, the masking function of the virtual drawing aid masks the line(s) that are drawn in accordance with the movement of contact(s). In the block-fill mode, the masking function of the virtual drawing aid masks the on-screen fill area that corresponds to the regions spanned by the movement of the contact(s) on the touch-sensitive surface. In some embodiments, if both the line-fill mode and the block-fill mode are provided with the masking function of the virtual drawing aid, and the same gesture (e.g., the back-and-forth movement of contact 552, or movement of one or more contacts that correspond to on-screen movement that crosses the first edge of the virtual drawing aid in a direction at least a threshold angle away from the first edge) is used to trigger the masking function of the virtual drawing aid, the user may select the desired mode using the mode selection icons (e.g., icon for line-fill mode 512, and icon for block-fill mode 514) in the tool selection area 504. As shown in FIG. 5G, the line-fill mode has been selected using the icon for the line-fill mode 512.

In some embodiments, in addition to selecting a desired fill mode using the mode selection icons (e.g., icon for line-fill mode 512, and icon for block-fill mode 514) in tool selection area 504, a desired fill mode is automatically selected by the device based on the type of the drawing tool currently used in the sketch. For example, some drawing tools (e.g., the pencil tool, the pen tool, the eraser tool, etc.) are by default used for the line-fill mode, while other drawing tools (e.g., paint brush, spray can, etc.) are by default used for the block-fill mode. In some embodiments, the device automatically determines whether to use the line-fill mode or the block-fill mode by default based on certain characteristics (e.g., thickness, opacity, etc.) of a line drawn by the currently selected drawing tool. For example, if the thickness of a line drawn by the currently selected drawing tool is above a threshold thickness, the device selects the block-fill mode by default; and if the thickness of the line drawn by the currently selected drawing tool is below the threshold thickness, the device selects the line-fill mode by default. In another example, if the opacity of a line drawn by the currently selected drawing tool is above a threshold opacity, the device selects the block-fill mode by default; and if the opacity of the line drawn by the currently selected drawing tool is below the threshold opacity, the device selects the line-fill mode by default.

Figure 5H:
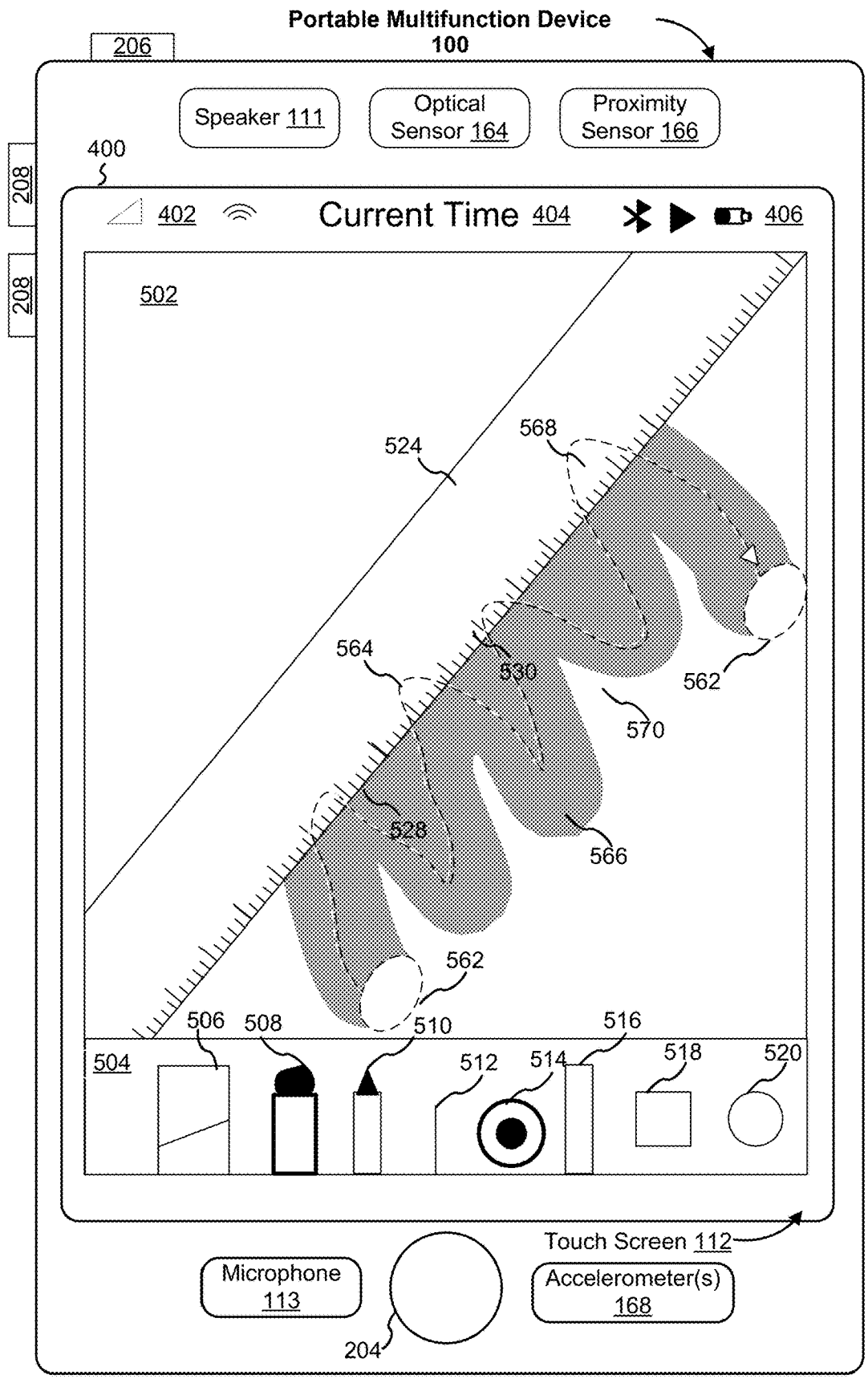
Figure 5I:
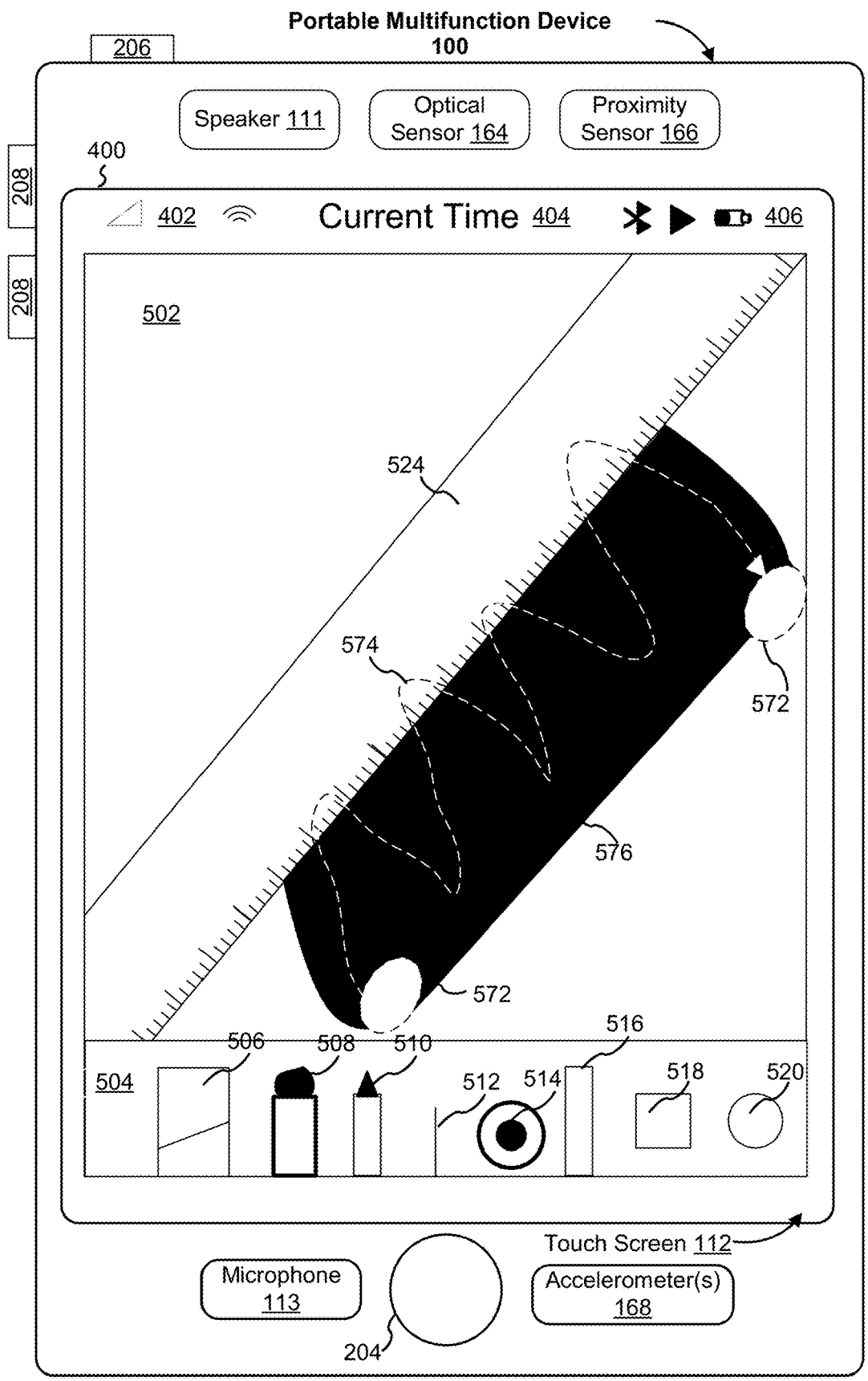

FIGS. 5H and 5I illustrate the masking function of the virtual drawing aid when used in the block-fill mode. As shown in FIGS. 5H and 5I, block-fill mode 514 has been selected in the mode selection area 504.

As shown in FIG. 5H, the masking function of the virtual drawing aid (e.g., straight-edge ruler 524) is triggered by back-and-forth swipe motion of a contact (e.g., contact 562) on the touch-sensitive surface (e.g., touch screen 112). In some embodiments, the back-and-forth motion is along directions that are at least a threshold angle (e.g., 30 degrees) away from the first edge of the virtual drawing aid (e.g., edge 528 of straight-edge ruler 524). In some embodiments, the masking function of the virtual drawing aid (e.g., straight-edge ruler 524) is triggered when an on-screen location corresponding to an initial position of contact 562 on the touch-sensitive surface is at least a threshold distance away from the first edge of the virtual drawing aid (e.g., edge 528 of straight-edge ruler 524) and is exterior to the body of the virtual drawing aid (e.g., straight-edge ruler 524), as shown in FIG. 5H. In some embodiments, the masking function of the virtual drawing aid (e.g., straight-edge ruler 524) is triggered when motion of a contact on the touch-sensitive surface (e.g., touch screen 112) corresponds to on-screen motion that crosses the first edge of virtual drawing aid (e.g., edge 528 of straight-edge ruler 524) and that is along an on-screen direction at least a threshold angle (e.g., 30 degrees) away from the first edge of the virtual drawing aid (e.g., edge 528 of straight-edge ruler 524).

FIG. 5H illustrates that, in the block-fill mode, fill content of preselected color and texture (e.g., color and texture of a currently selected drawing tool) is added to a fill region (e.g., fill region 566) in sketch area 502 in accordance with movement of contact 562 on the touch-sensitive surface (e.g., touch-screen 112). In some embodiments, fill region 566 is delineated on one side by the first edge of the virtual drawing tool (e.g., edge 528 of the rule 524). As shown in FIG. 5H, the side of the fill region 566 that is next to the first edge of the virtual drawing aid (e.g., edge 528 of straight-edge ruler 524) is smooth and completely conforms to the shape of the first edge of the virtual drawing aid (e.g., edge 528 of straight-edge ruler 524), even though the on-screen path of the movement that corresponds to the movement of contact 562 on the touch-sensitive surface crosses the first edge of the virtual drawing aid at more than one place. For example, when determining the fill region in accordance with the movement of contact 562 and the shape of the first edge (e.g., edge 528), the region defined by the back-and-forth on-screen movement of contact 562 may be stretched and/or cropped to conform to the shape of the first edge of the virtual drawing tool, such that the boundary of the fill region that lies next to the first edge will smoothly and completely conform to the shape of the first edge.

In some embodiments, on the side of fill region 566 that is opposite to the side next to the first edge of the virtual drawing aid, fill region 566 is delineated in accordance with on-screen path 564 that corresponds to the movement of contact 562 on the touch-sensitive surface. As shown in FIG. 5H, the boundary of fill region 566 on the opposing side of the first edge of the virtual drawing aid (e.g., edge 528 of straight-edge ruler 524) is wavy and jagged and is based on the wavy and jagged on-screen path 564 of contact 562. Some portions 570 between adjacent filled portions of fill region 566 is left unfilled, as shown in FIG. 5H. Although the boundary of fill region 566 on the opposing side of the first edge of the virtual drawing aid is based on the wavy and jagged on-screen path 564 of contact 562, the boundary and the path do not have to match exactly. In some embodiments, the boundary of fill region 566 on the opposing side of the first edge of the virtual drawing aid is less jagged than the on-screen path 564 of contact 562, and encloses at least some areas not crossed by the on-screen path 564 of contact 562.

In some embodiments (not shown in FIG. 5H), the fill factor of the fill content added to fill region 566 does not need to be uniform throughout fill region 566. In some embodiments, portions of fill region 566 that is crossed by on-screen path 564 more than once is filled with a higher fill factor (e.g., deeper color saturation, and/or fewer percentage of uncolored pixels), while portions of fill region that is crossed by on-screen path 564 only once or not crossed by the fill path at all is filled with a lower fill factor (e.g., less color saturation, and/or more percentage of uncolored pixels). In some embodiments, the fill factor changes on a gradient going from the boundary of the fill region that is next to the first edge of the virtual drawing aid toward the opposing boundary of the fill region.

In some embodiments, the boundary of fill region 566 on other sides are delineated in accordance with segments of on-screen path 564 that correspond to the initial on-screen movement toward the first edge of the virtual drawing aid (e.g., edge 528 of straight-edge ruler 524) and the final on-screen movement away from the first edge of the virtual drawing aid.

In some embodiments, the block-fill mode illustrated in FIG. 5H provides a feel of a more natural and hand-drawn fill pattern that preserves the individual strokes of the drawing tool used to draw the fill content. In some embodiments, when a more uniform and solid fill is needed, the block-fill mode shown in FIG. 5I is optionally used. The block-fill mode shown in FIG. 5H is an intermediate mode between the line-fill mode that is illustrated in FIG. 5G and the block-fill mode that is illustrated in FIG. 5I.

As shown in FIG. 5I, the masking function of the virtual drawing aid (e.g., straight-edge ruler 524) is triggered by back-and-forth motion of a contact (e.g., contact 572) on the touch-sensitive surface (e.g., touch screen 112). In some embodiments, the back-and-forth motion is along directions that are at least a threshold angle (e.g., 30 degrees) away from the first edge of the virtual drawing aid (e.g., edge 528 of straight-edge ruler 524). In some embodiments, the masking function of the virtual drawing aid (e.g., straight-edge ruler 524) is triggered when an on-screen location corresponding to an initial position of contact 572 on the touch-sensitive surface is at least a threshold distance away from the first edge of the virtual drawing aid (e.g., edge 528 of straight-edge ruler 524) and is exterior to the body of the virtual drawing aid (e.g., straight-edge ruler 524), as shown in FIG. 5I. In some embodiments, the masking function of the virtual drawing aid (e.g., straight-edge ruler 524) is triggered when motion of a contact on the touch-sensitive surface (e.g., touch screen 112) corresponds to on-screen motion that crosses the first edge of virtual drawing aid (e.g., edge 528 of straight-edge ruler 524) and that is along an on-screen direction (e.g., as measured by the smaller angle formed by the direction and the ruler edge) at least a threshold angle (e.g., 30 degrees) away from the first edge of the virtual drawing aid (e.g., edge 528 of straight-edge ruler 524).

FIG. 5I illustrates that, in the block-fill mode, fill content of preselected color and texture (e.g., color and texture of a currently selected drawing tool) is added to a fill region (e.g., fill region 576) in content area 502 in accordance with movement of contact 572 on the touch-sensitive surface (e.g., touch-screen 112). In some embodiments, fill region 576 is delineated on one side by the first edge of the virtual drawing tool (e.g., edge 528 of the rule 524). As shown in FIG. 5I, the side of the fill region 576 that is next to the first edge of the virtual drawing aid (e.g., edge 528 of straight-edge ruler 524) is smooth and completely conforms to the shape of the first edge of the virtual drawing aid (e.g., edge 528 of straight-edge ruler 524), even though on-screen path 574 of the movement that corresponds to the movement of contact 572 on the touch-sensitive surface crosses the first edge of the virtual drawing aid at more than one places. For example, when determining the fill region in accordance with the movement of contact 572 and the shape of the first edge (e.g., edge 528), the region defined by the back-and-forth on-screen movement of contact 572 may be stretched and/or cropped to conform to the shape of the first edge of the virtual drawing tool, such that the boundary of the fill region that lies next to the first edge will smoothly and completely conform to the shape of the first edge.

In some embodiments, on the side of fill region 576 that is opposite to the side next to the first edge of the virtual drawing aid, filled region 566 is delineated in accordance with a straight line that connects the beginning and the end of on-screen path 574 that corresponds to the movement of contact 572 on the touch-sensitive surface. As shown in FIG. 5I, the boundary of fill region 566 on the opposing side of the first edge of the virtual drawing aid (e.g., edge 528 of straight-edge ruler 524) is smooth and straight even though on-screen path 574 of contact 572 is wavy and jagged. Fill region 576 includes at least some areas not crossed by on-screen path 574 of contact 572.

In some embodiments (not shown in FIG. 5I), the fill factor of the fill content added to fill region 576 does not need to be uniform throughout fill region 576. In some embodiments, portions of fill region 576 that is closer to the first edge of the virtual drawing aid is filled with a higher fill factor (e.g., deeper color saturation, and/or fewer percentage of uncolored pixels), while portions of fill region that is father away from the first edge of the virtual drawing aid is filled with a lower fill factor (e.g., less color saturation, and/or more percentage of uncolored pixels). In some embodiments, the fill factor changes on a gradient going from the boundary of the fill region that is next to the first edge of the virtual drawing aid toward the opposing boundary of the fill region.

In some embodiments, the boundary of fill region 576 on other sides are delineated in accordance with segments of on-screen path 574 that correspond to the initial on-screen movement toward the first edge of the virtual drawing aid (e.g., edge 528 of straight-edge ruler 524) and the final on-screen movement away from the first edge of the virtual drawing aid.

Although a straight-edged ruler is used to illustrate the line-drawing, masking, and fill functions of the ruler edge in the above examples, rulers with edges of other shapes can be used to facilitate line-drawing, masking, and fill in a similar manner.

Figure 5J:
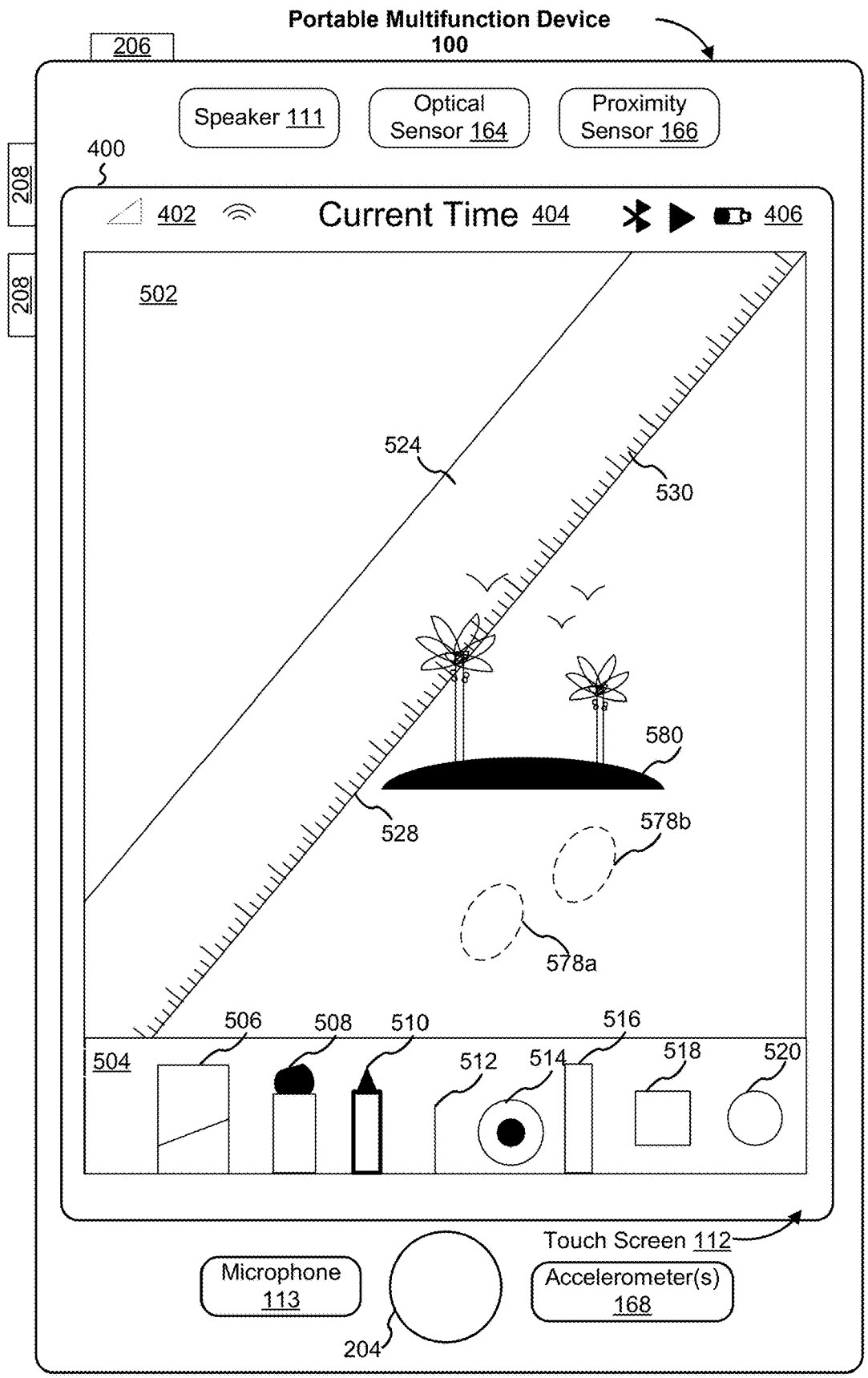
Figure 5K:
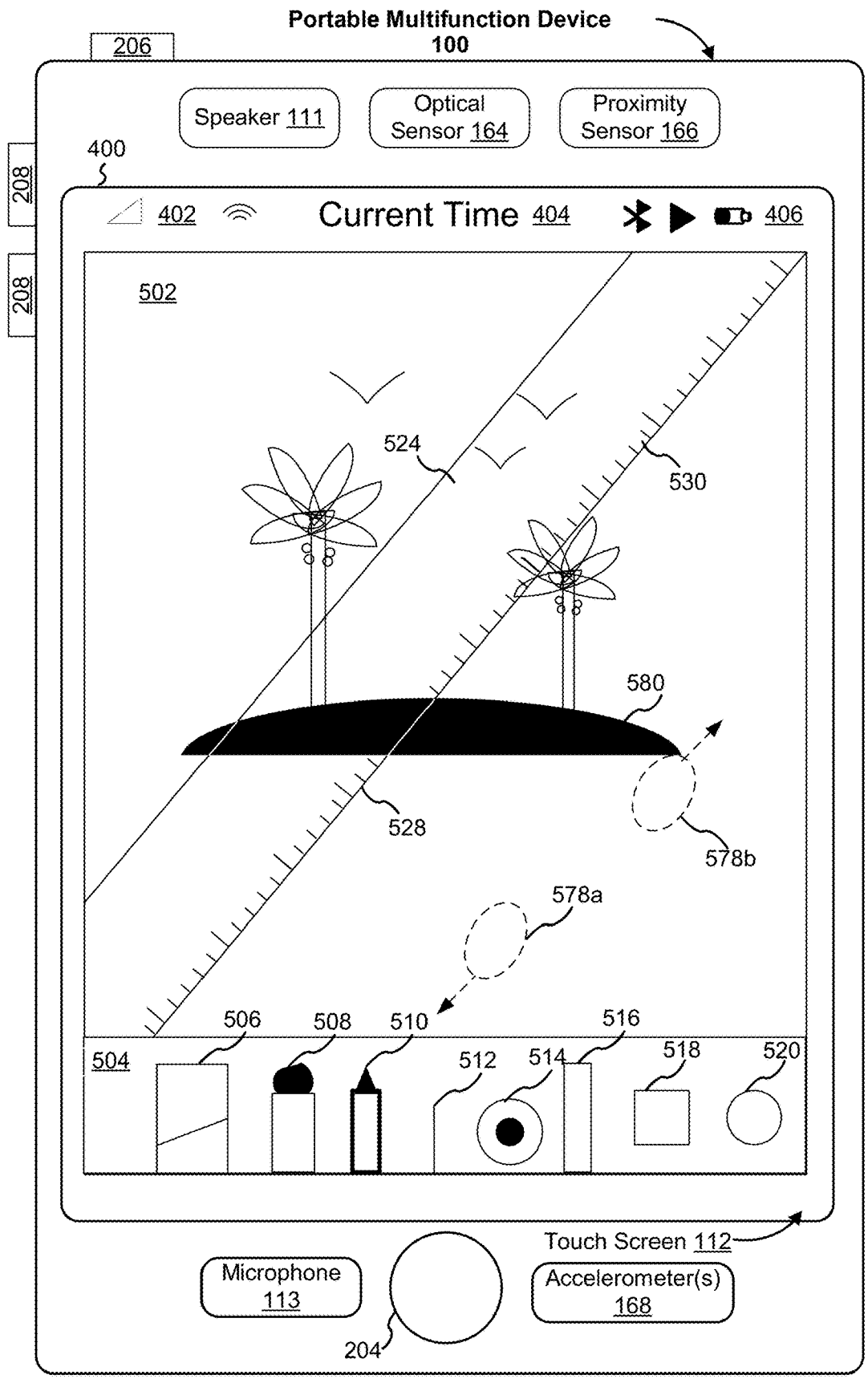

FIG. 5J illustrates effect of zooming on a virtual drawing aid (e.g., straight-edge ruler 524). In some embodiments, content area 502 is zoomed (e.g., enlarged or shrunken) in various degrees in response to a zooming input. In some embodiments, a zooming input is performed using a pinch gesture (for zooming out) or a reverse pinch gesture (for zooming in). As shown in FIG. 5J-5K, a zooming gesture is performed to enlarge the content (e.g., content object 580) shown on the drawing canvas in content area 502. The zooming gesture is performed by two contacts (e.g., contacts 578a, 578b) detected at locations on the touch-sensitive surface that correspond to locations on the drawing canvas (as opposed to locations on the virtual drawing aid) on the display. During the zooming gesture, the two contacts (e.g., contacts 578a, 578b) moves away from each other to increase a distance between each other on the touch-sensitive surface. In response to the zooming gesture, the content on the drawing canvas is enlarged according to a zoom factor in accordance with the zooming gesture, as shown in FIG. 5K. In addition, as shown in FIG. 5K, in some embodiments, the size and shape of the virtual drawing aid (e.g., straight-edge ruler 524) is maintained during the zooming of the content on the drawing canvas. In addition, as shown in FIG. 5K, in some embodiments, the length scale of the tick marks (as reflected in the spacing between tick marks 530) shown on the virtual drawing aid (e.g., straight-edge ruler 524) is zoomed as well in accordance with the zooming factor. By changing the length-scale of the tick marks on the virtual drawing aid in accordance with the zooming factor of the sketch content, it helps the user to maintain a sense of scale on the drawing canvas after the zooming action. By maintaining the size and shape of the virtual drawing aid, it helps to conserve screen space and reduce visual clutter.

In some embodiments, the virtual drawing aid (e.g., straight-edge ruler 524) is semi-transparent or transparent, and the zoomed content is revealed from behind the virtual drawing aid during the zooming action.

In some embodiments (not shown in FIG. 5K), the virtual drawing aid is zoomed along with the content using the same zoom factor. Zooming the drawing aid with the content is helpful when the virtual drawing aid is not a straight-edge ruler, but has more complex shaped edges. In some embodiments, the virtual drawing aid is zoomed without zooming the content on the drawing canvas, when the zooming gesture is detected at a location on the touch-sensitive surface that correspond to an on-screen location on the virtual drawing aid. In some embodiments, zooming the virtual drawing aid without zooming the content on the drawing canvas is helpful when the virtual drawing aid is not a straight-edge ruler, but has more complex shaped edges. By zooming the virtual drawing aid with the more complex shaped edges, the edges can be utilized at different sizes for the line-drawing, masking, and fill functions.

Figure 5L:
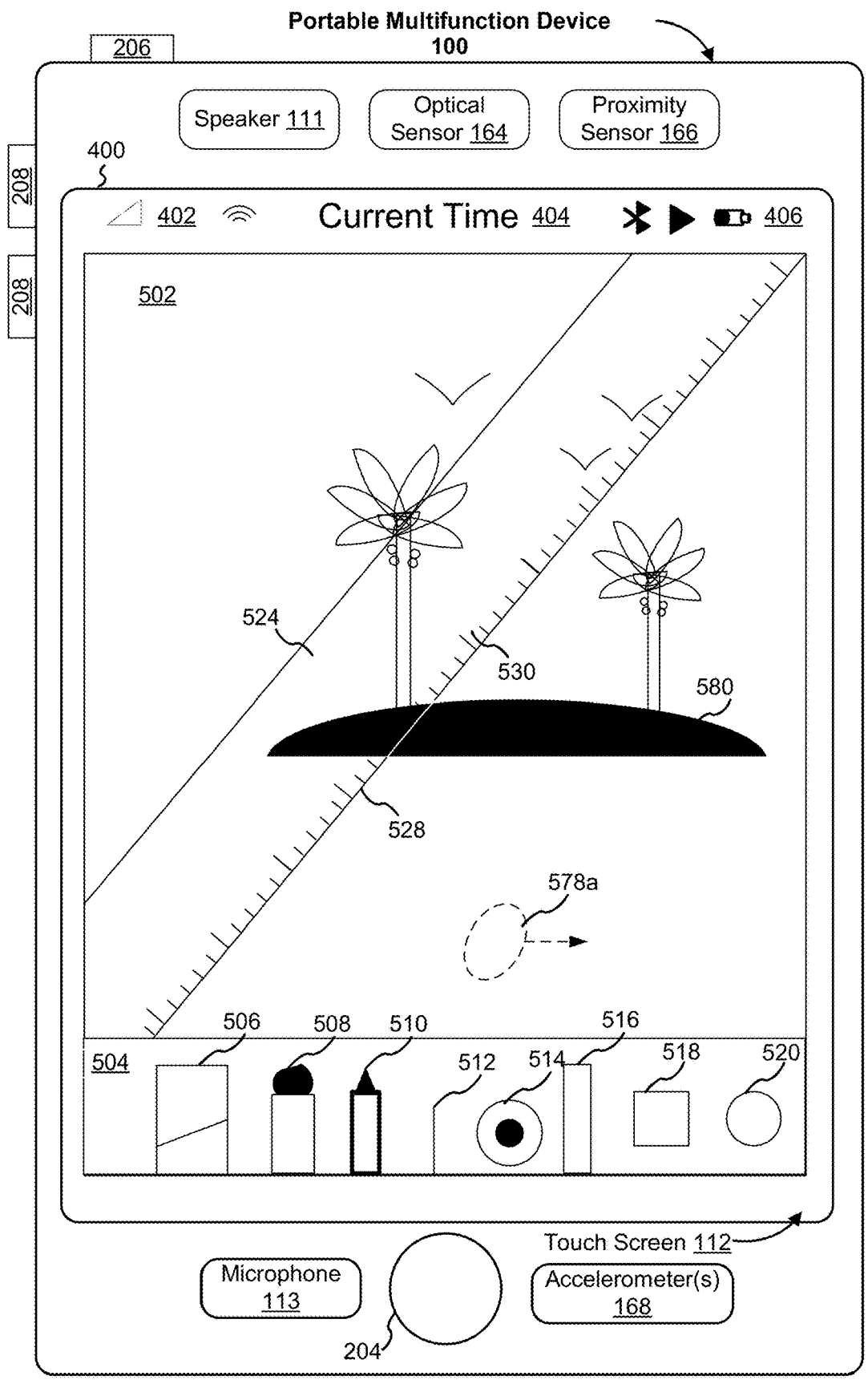

FIG. 5L illustrates translation of the drawing canvas underneath the virtual drawing aid in accordance with some embodiments. In some embodiments, a translation gesture is detected to be directed to the drawing canvas (as opposed to the virtual drawing aid). For example, in some embodiments, the translation gesture is provided by contact 578a after lift-off of contact 578b. The translation gesture includes movement of contact 578a on the touch-sensitive surface. The translation gesture causes the drawing canvas along with content (e.g., content 580) existing on the drawing canvas to move within content area 502 in accordance with the on-screen movement that corresponds to the movement of contact 578a on the touch-sensitive surface.

Figure 5M:
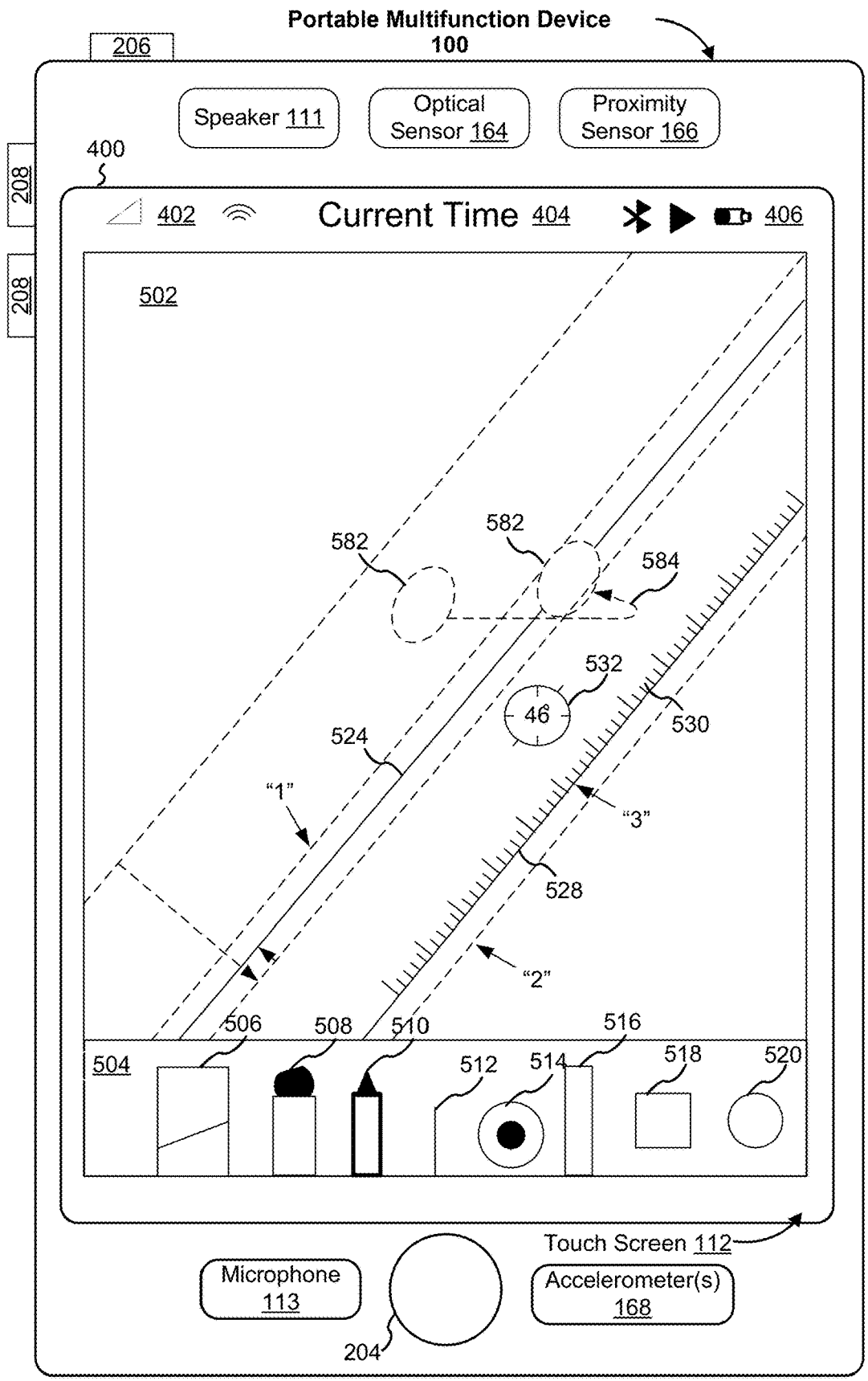

FIG. 5M illustrate snapping of a virtual drawing aid (e.g., straight-edge ruler 524) to a nearest snap location in response to braking motion at the end of a translation gesture that moves the virtual drawing aid in accordance with some embodiments.

As shown in FIG. 5M, in some embodiments, a translation gesture (e.g., a translation gesture provided by movement of contact 582) directed to the virtual drawing aid (e.g., straight-edge ruler 524) moves the virtual drawing aid in the content area 502 without changing the orientation of the virtual drawing aid.

In some embodiments, as described with respect to FIG. 5D above, the final location of the virtual drawing aid (e.g., straight-edge ruler 524) is determined based on the on-screen location that corresponds to the location on the touch-sensitive surface at which lift-off of the contact of the translation gesture is detected. In some embodiments, before detecting lift-off of the contact (e.g., contact 582) of the translation gesture, braking motion is detected in the movement of the contact of the translation gesture. In some embodiments, the braking motion includes a slowing down of the movement of the contact (e.g., contact 582) of the translation gesture, or a reversal of the movement of the contact (e.g., contact 582) of the translation gesture (e.g., the reversal of movement shown in on-screen path 584 of contact 582). In response to detecting the braking motion of the contact (e.g., contact 582) of the translation gesture immediately before the lift-off of the contact (e.g., contact 582) of the translation gesture, the device (e.g., device 100) selects a snap location nearest the final location as determined based on the lift-off location of the contact (e.g., contact 582), and moves the virtual drawing aid from the final location as determined based on the lift-off location of the contact (e.g., contact 582) to the selected snap location. As shown in FIG. 5M, the initial location of the virtual drawing aid (e.g., straight-edge ruler 524) is indicated by the ruler shadow 1 (e.g., labeled "1"), the final position as determined based on the lift-off location of the contact (e.g., contact 582) is indicated by the ruler shadow 2 (e.g., labeled "2"), and the selected snap position is indicated by the final position (e.g., labeled "3") of the virtual drawing aid (e.g., straight-edge ruler 524).

Figure 5N:
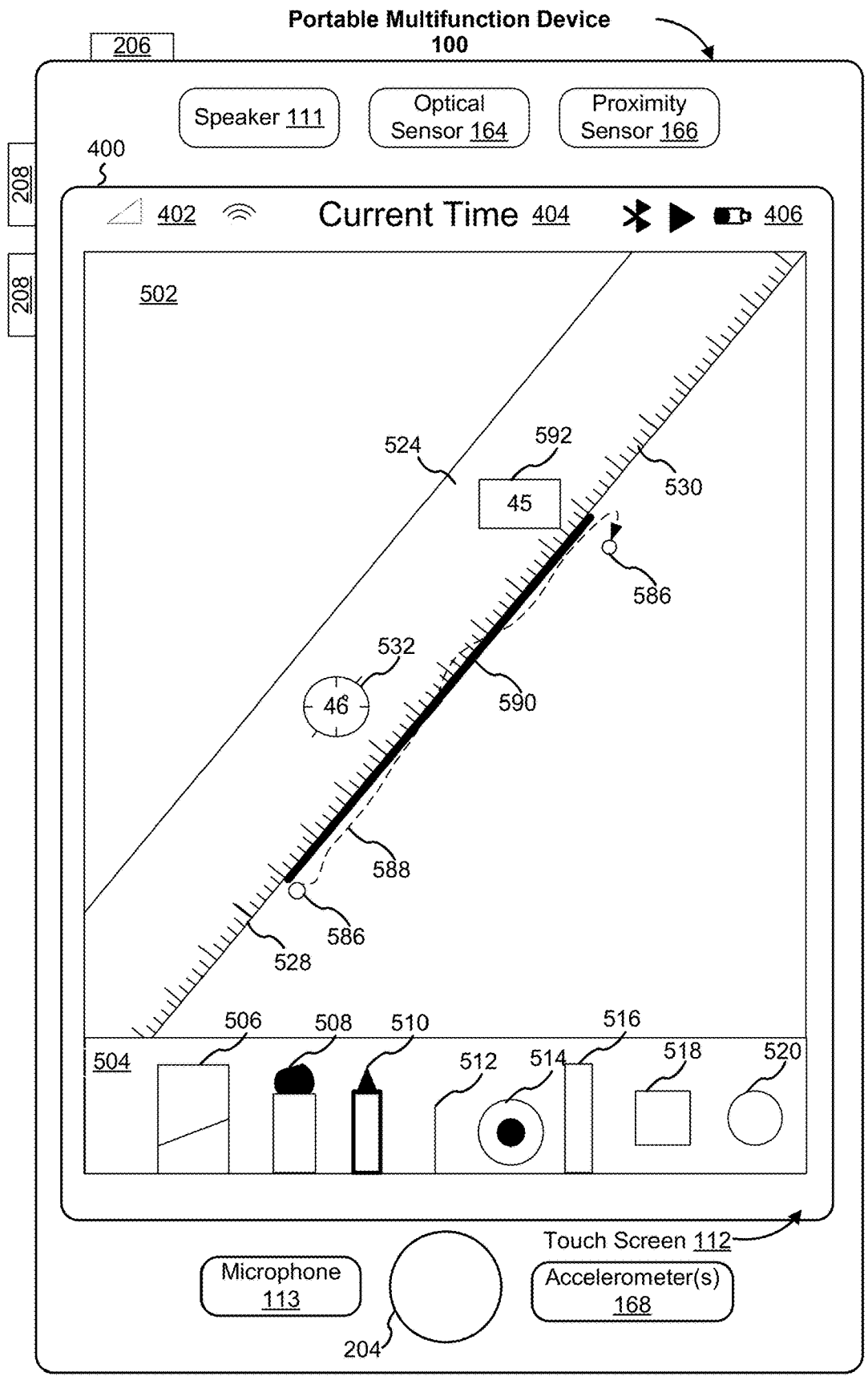

FIG. 5N illustrates snapping of a line drawn against an edge of a virtual drawing aid (e.g., edge 528 of straight-edge ruler 524) to a nearest snap location in response to braking motion at the end of a line-drawing gesture that drew the line in accordance with some embodiments.

As shown in FIG. 5N, in some embodiments, a line-drawing gesture (e.g., a line-drawing gesture provided by movement of contact 582) directed to the edge of the virtual drawing aid (e.g., edge 528 of straight-edge ruler 524) causes a line (e.g., line 590) to be drawn against the edge of the virtual drawing aid (e.g., edge 528 of straight-edge ruler 524).

In some embodiments, as described with respect to FIG. 5F above, the end location of the line (e.g., line 590) is determined based on the on-screen location that corresponds to the location on the touch-sensitive surface at which lift-off of the contact (e.g., contact 544, FIG. 5F) of the line-drawing gesture is detected. In some embodiments, before detecting lift-off of the contact (e.g., contact 586, FIG. 5N) of the line-drawing gesture, braking motion is detected in the movement of the contact (e.g., contact 586) of the line-drawing gesture. In some embodiments, the braking motion includes a slowing down of the movement of the contact (e.g., contact 582) of the translation gesture, or a reversal of the movement of the contact (e.g., contact 582) of the translation gesture (e.g., the reversal of movement shown in on-screen path 588 of contact 586). In response to detecting the braking motion of the contact (e.g., contact 586) of the line-drawing gesture immediately before the lift-off of the contact (e.g., contact 586) of the line-drawing gesture, the device (e.g., device 100) selects a snap location nearest the end location of the line (e.g., line 590) as determined based on the lift-off location of the contact (e.g., contact 586), and moves the end of the line (e.g., line 590) from the end location as determined based on the lift-off location of the contact (e.g., contact 586) to the selected snap location. As shown in FIG. 5N, the end location of the line (e.g., line 590) is somewhere between the farthest point that was reached by contact 586 and the final lift-off location of contact 586. In some embodiments, a length indicator indicates the final length (e.g., 45 tick marks) of line 590. In some embodiments, the snap location is determined based on a requirement that the final line length is selected from a set of snap lengths (e.g., lengths that are multiples of five tick marks).

Figure 5O:
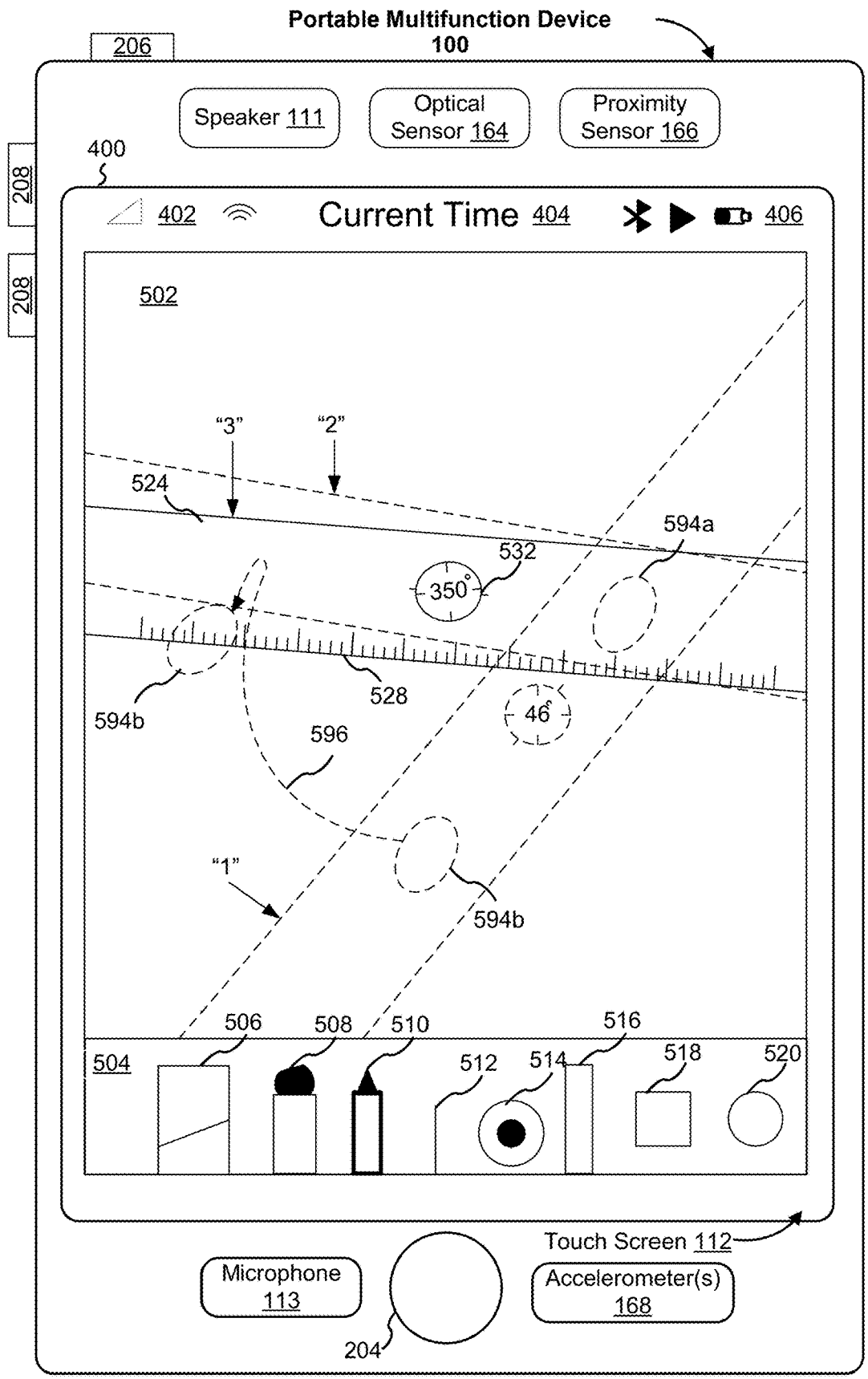

FIG. 5O illustrate snapping of a virtual drawing aid (e.g., straight-edge ruler 524) to a nearest snap angle in response to braking motion at the end of a pivoting gesture that rotates the virtual drawing aid in accordance with some embodiments.

As shown in FIG. 5O, in some embodiments, a rotational gesture (e.g., a pivoting gesture provided by stationary contact 594a and pivoting contact 594b moving around stationary contact 594a) directed to the virtual drawing aid (e.g., straight-edge ruler 524) rotates the virtual drawing aid in the content area 502.

In some embodiments, as described with respect to FIG. 5E above, the final orientation of the virtual drawing aid (e.g., straight-edge ruler 524) is determined based on the on-screen location that corresponds to the location on the touch-sensitive surface at which lift-off of the pivoting contact of the pivoting gesture is detected. In some embodiments, before detecting lift-off of the pivoting contact (e.g., contact 594b) of the pivoting gesture, braking motion is detected in the movement of the pivoting contact of the pivoting gesture. In some embodiments, the braking motion includes a slowing down of the movement of the pivoting contact (e.g., pivoting contact 594b) of the pivoting gesture, or a reversal of the movement of the pivoting contact (e.g., pivoting contact 594b) of the pivoting gesture (e.g., the reversal of movement shown in on-screen path 596 of pivoting contact 594b). In response to detecting the braking motion of the pivoting contact (e.g., pivoting contact 594b) of the pivoting gesture immediately before the lift-off of the pivoting contact (e.g., pivoting contact 594b) of the pivoting gesture, the device (e.g., device 100) selects a snap orientation nearest the final orientation as determined based on the lift-off location of the pivoting contact (e.g., pivoting contact 594b), and rotates the virtual drawing aid from the final orientation as determined based on the lift-off location of the pivoting contact (e.g., pivoting contact 594b) to the selected snap orientation. As shown in FIG. 5O, the initial orientation of the virtual drawing aid (e.g., straight-edge ruler 524) is indicated by the ruler shadow 1 (e.g., labeled "1"), the final orientation as determined based on the lift-off location of the pivoting contact (e.g., pivoting contact 594b) is indicated by the ruler shadow 2 (e.g., labeled "2"), and the selected snap orientation is indicated by the final orientation (e.g., labeled "3") of the virtual drawing aid (e.g., straight-edge ruler 524).

In some embodiments, an angle indicator (e.g., angle indicator 532) indicates the final orientation (e.g., 350 degrees away from the horizontal direction) of the virtual drawing aid (e.g., straight-edge ruler 524). In some embodiments, the snap orientation is determined based on a requirement that the final orientation of the virtual drawing aid is selected from a set of snap orientations (e.g., orientations that multiples of 5 degrees away from the horizontal direction). In some embodiments, the orientation of the on-screen ruler is determined based on an anchor location of the on-screen ruler (e.g., the anchor location is the fixed on-screen location that corresponds to the stationary contact of the pivoting gesture, or alternatively, the anchor location is a stationary or moving anchor location between the focus selectors corresponding to the two contacts of the rotational gesture (e.g., the anchor location is the on-screen location corresponding to a stationary or moving pivot location about which the two contacts rotate in opposite directions on the touch-sensitive surface)) during the rotation of the on-screen ruler (or during the rotational gesture).

Figure 5P:
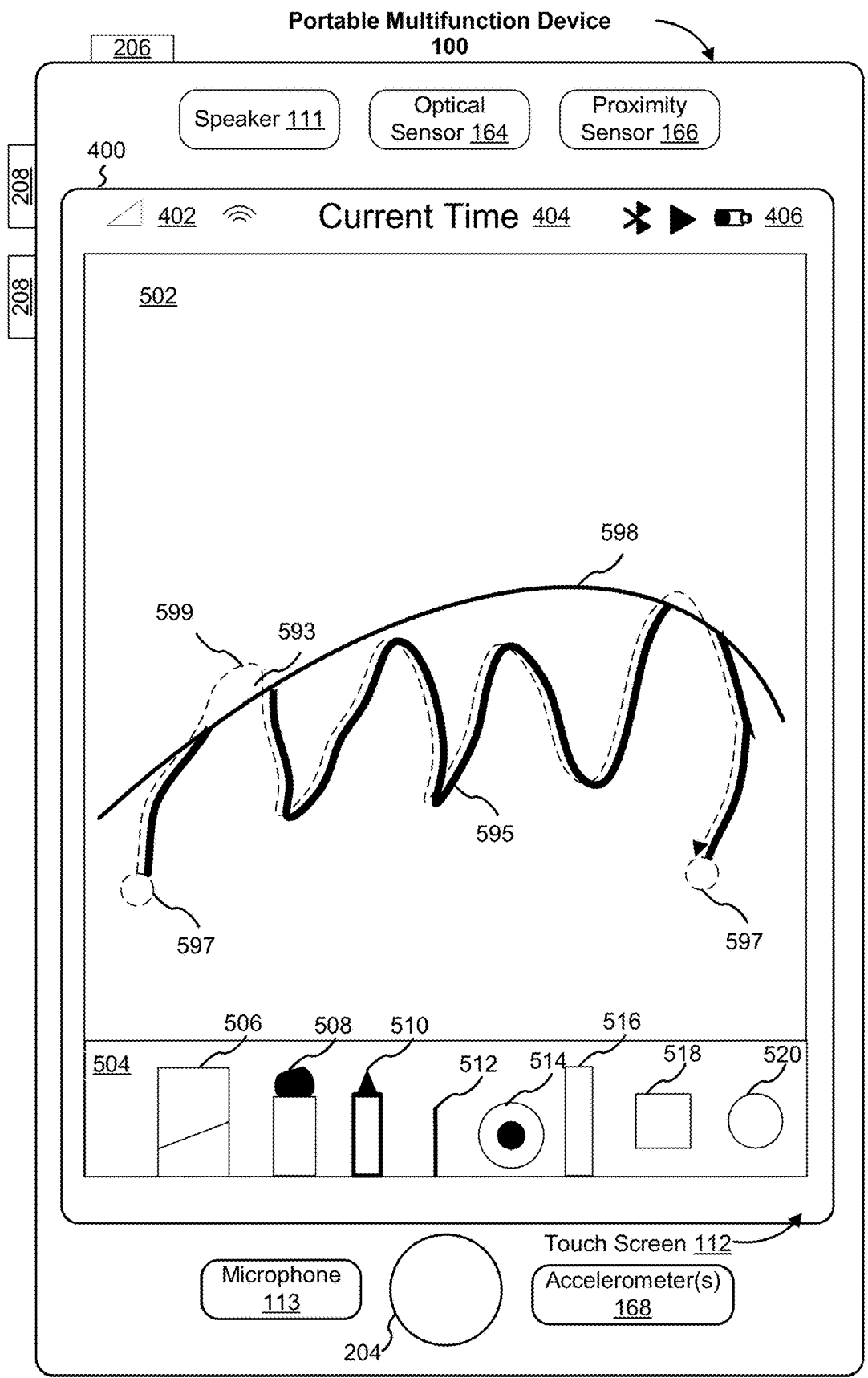

FIGS. 5A-5O illustrate virtual drawing aids (e.g., on-screen rulers with various predefined edge shapes, square, circle, etc.) that are preset by the device software. In some embodiments, a free-form line is optionally drawn by a user in content area 502 using a line-drawing tool (e.g., a pencil), and used as a customized virtual drawing aid. For example, as shown in FIG. 5P, a free-form line (e.g., line 598) has been drawn by the user on the drawing canvas in the content area 502. The free-form line has at least one edge which is the line itself, when the line-thickness is small and negligible. If the line-thickness is relatively large and non-negligible, the free-form line has two opposing edges that define the thickness of the line. In some embodiments, the user can select the free-form line and use the free-form line as a drawing aid to tracing additional lines against one of its edge(s), or use the free-form line as a mask for drawing lines, or fill a region under the free-form line. In some embodiments, the beginning and the end of the free-form line are not connected to each other, and the free-form line delineates and partially encloses a region next to the free-form line. In some embodiments, the free-form line includes one or more loops.

In some embodiments, the user can temporarily turn a free-form line drawn on the drawing canvas into a customized drawing aid by selecting the free-form line first (e.g., by tapping on the free-form line) while providing a press and hold input on a corresponding control for activating customized drawing aids. In some embodiments, the user can select a control for activating customized drawing aids first, and then select a free-form line already drawn or draw a new free-form line on the drawing canvas as the drawing aid. In some embodiments, when the user selected the control for activating customized drawing aids, and the user provides a predetermined gesture (e.g., a back and forth swipe gesture) on the touch-sensitive surface, the first line that comes in contact with an on-screen path that corresponds of the movement of the contact of the predetermined gesture on the touch-sensitive surface is selected as the drawing aid. The line that is selected as the drawing aid is then used to provide the masking function for the movement of the contact in the line-fill mode or the block-fill mode.

In some embodiments, once a free-form line is selected as a customized virtual drawing aid, the free-form line is optionally manipulated (e.g., translated, rotated, snapped, zoomed, etc.) in a manner analogous to that described with respect to other predefined virtual drawing aids (e.g., straight-edge ruler 524) in FIGS. 5D-5E, 5J-5M, 5O, and 5V-5AL.

FIG. 5P illustrates that a free-form line (e.g., line 598) has been selected as a customized virtual drawing aid. In some embodiments, the free form line (e.g., line 598) is selected as the customized virtual drawing aid because it is the first line encountered by the on-screen path (e.g., on-screen path 599) of a contact (e.g., contact 597) of a predetermined gesture (e.g., a back-and-forth swipe gesture) that also triggers the masking function of the free-form line (e.g., line 598).

As shown in FIG. 5P, in some embodiments, the masking function of the free-form line (e.g., line 598) is triggered when back-and-forth motion of a contact (e.g., contact 597) is detected on the touch-sensitive surface (e.g., touch screen 112). In some embodiments, the masking function of the free-form line (e.g., line 598) is triggered when an on-screen location corresponding to an initial position of contact 597 on the touch-sensitive surface is at least a threshold distance away from the free-form line (e.g., line 598), as shown in FIG. 5P. In some embodiments, the masking function of the free-form line (e.g., line 598) is triggered when a motion of a contact on the touch-sensitive surface (e.g., touch screen 112) corresponds to on-screen motion that crosses the free-form line (e.g., line 598) and that is along an on-screen direction at least a threshold angle (e.g., 30 degrees) away from the free-form line (e.g., line 598) at the crossing location.

In some embodiments, as shown in FIG. 5P, when the masking function of the free-form line is triggered, line 595 drawn in sketch area 502 according to the movement of contact 597 on the touch-sensitive surface (e.g., touch screen 112) is masked by the free-form line (e.g., line 598). As shown in FIG. 5P, although on-screen path 599 that corresponds to the movement of contact 597 on the touch-sensitive surface (e.g., touch screen 112) crosses the free-form line (e.g., line 598) at multiple places (e.g., regions 593 and 591 have crossed line 598), line 595 that is drawn according to on-screen path 599 is masked by the free-form line. In other words, line 595 is only visibly drawn on the side of the free-form line (e.g., line 598) from which on-screen path 599 was initiated. In some embodiments, if the eraser tool is selected while the masking function of the drawing aid is triggered, the eraser tool erases pixels' colors along the eraser's on-screen path only on the side of the canvas from which on-screen path 599 was initiated. In other words, the pixels on the other side of the free-form line (e.g., line 598) are shielded from the eraser even though the eraser's on-screen path may pass them.

In some embodiments, the masking function of a free-form line is utilized for both a line-fill mode and a block-fill mode. In the line-fill mode, the masking function of the free-form line masks the line(s) that are drawn in accordance with the movement of contact(s). In the block-fill mode, the masking function of the free-form line masks the on-screen fill area that corresponds to the regions spanned by the movement of the contact(s) on the touch-sensitive surface. In some embodiments, if both the line-fill mode and the block-fill mode are provided with the masking function of the free-form line, and the same gesture (e.g., the back-and-forth swipe motion of contact 597, or movement of one or more contacts that correspond to on-screen movement that crosses the free-form line in a direction at least a threshold angle away from the free-form line at the cross location) is used to trigger the masking function of the free-form line, the user may select the desired mode using the mode selection icons (e.g., icon for line-fill mode 512, and icon for block-fill mode 514) in the tool selection area 504. As shown in FIG. 5P, the line-fill mode has been selected using the icon for the line-fill mode 512.

FIGS. 5Q-5T illustrate the masking function of the free-form line when used in the block-fill mode. As shown in FIGS. 5Q-5T, block-fill mode 514 has been selected in the mode selection area 504.

Figure 5Q:
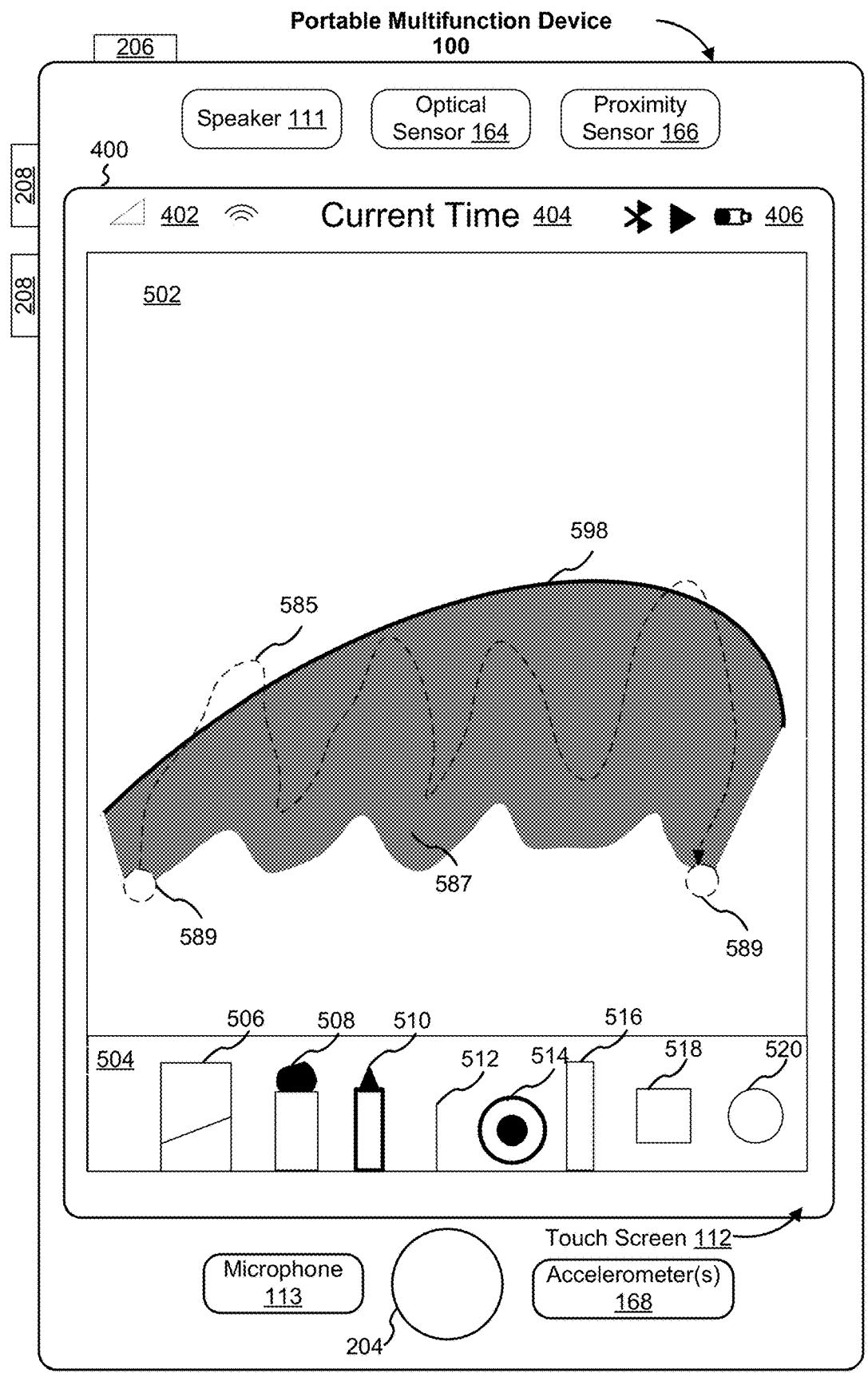

As shown in FIG. 5Q, the masking function of the free-form line (e.g., line 598) is triggered by back-and-forth movement of a contact (e.g., contact 589) on the touch-sensitive surface (e.g., touch screen 112). In some embodiments, the masking function of the free-form line (e.g., line 598) is triggered when an on-screen location corresponding to an initial position of contact 589 on the touch-sensitive surface is at least a threshold distance away from the free-form line (e.g., line 598), as shown in FIG. 5Q. In some embodiments, the masking function of the free-form line (e.g., line 598) is triggered when motion of a contact on the touch-sensitive surface (e.g., touch screen 112) corresponds to on-screen motion that crosses the free-form line (e.g., line 598) and that is along an on-screen direction at least a threshold angle (e.g., 30 degrees) away from the free-form line (e.g., line 598) at the cross location.

FIG. 5Q illustrates that, in the block-fill mode, fill content of preselected color and texture (e.g., color and texture of a currently selected drawing tool) is added to a fill region (e.g., fill region 587) in sketch area 502 in accordance with movement of contact 589 on the touch-sensitive surface (e.g., touch-screen 112). In some embodiments, fill region 587 is delineated on one side by the free-form line (e.g., line 598). As shown in FIG. 5Q, the side of the fill region 587 that is next to the free-form line (e.g., line 598) completely conforms to the shape of the free-form line (e.g., line 598), even though the on-screen path of the movement that corresponds to the movement of contact 589 on the touch-sensitive surface crosses the free-form line at more than one places. For example, when determining the fill region in accordance with the movement of contact 589 and the shape of the free-form line (e.g., line 598), the region defined by the back-and-forth on-screen movement of contact 589 may be stretched and/or cropped to conform to the shape of the free-form line, such that the boundary of the fill region that lies next to the first edge will completely conform to the shape of the free-form line (e.g., line 598).

In some embodiments, on the side of fill region 587 that is opposite to the side next to the free-form line (e.g., line 598), filled region 587 is delineated in accordance with on-screen path 585 that corresponds to the movement of contact 589 on the touch-sensitive surface. As shown in FIG. 5Q, the boundary of fill region 587 on the opposing side of the free-form line (e.g., line 598) is wavy and jagged and is based on the wavy and jagged on-screen path 585 of contact 589. Some portions between adjacent filled portions of fill region 587 are left unfilled, as shown in FIG. 5Q. Although the boundary of fill region 587 on the opposing side of the free-form line (e.g., line 598) is based on the wavy and jagged on-screen path 585 of contact 589, the boundary and the path do not have to match exactly. In some embodiments, the boundary of fill region 587 on the opposing side of the free-form line is less jagged than the on-screen path 585 of contact 589, and encloses at least some areas not crossed by the on-screen path 585 of contact 589.

In some embodiments (not shown in FIG. 5Q), the fill factor of the fill content added to fill region 587 does not need to be uniform throughout fill region 587. In some embodiments, portions of fill region 587 that is crossed by on-screen path 585 more than one time is filled with a higher fill factor (e.g., deeper color saturation, and/or fewer percentage of uncolored pixels), while portions of fill region that is crossed by on-screen path only once or not crossed by the fill path at all is filled with a lower fill factor (e.g., less color saturation, and/or more percentage of uncolored pixels). In some embodiments, the fill factor changes on a gradient going from the boundary of the fill region that is next to the free-form line toward the opposing boundary of the fill region.

In some embodiments, the boundary of fill region 587 on other sides are delineated in accordance with segments of on-screen path 585 that correspond to the initial on-screen movement toward the free-form line (e.g., line 598) and the final on-screen movement away from the free-form line.

Figure 5R:
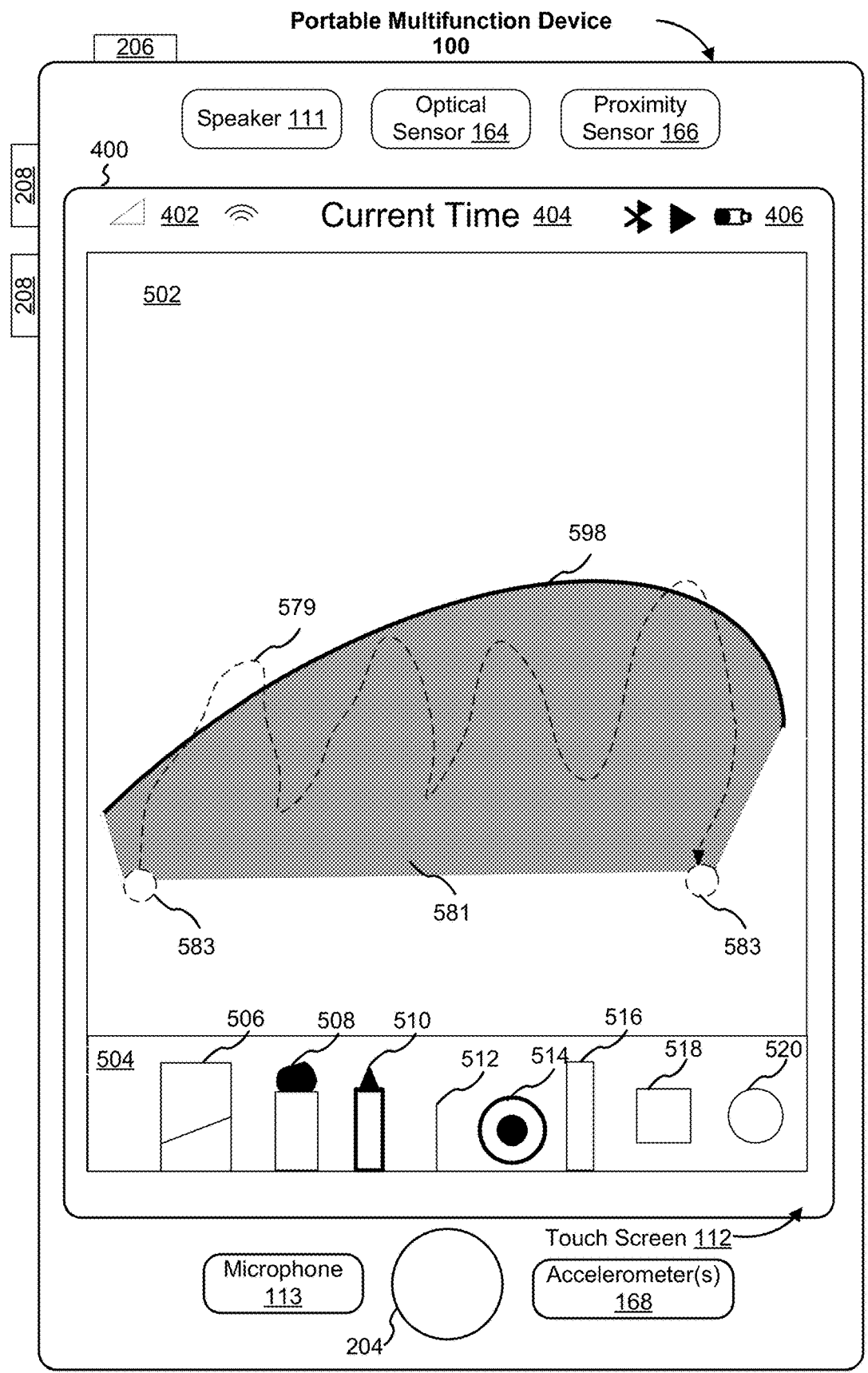

As shown in FIG. 5R, the masking function of the free-form line (e.g., line 598) is triggered by back-and-forth motion of a contact (e.g., contact 583) on the touch-sensitive surface (e.g., touch screen 112). In some embodiments, the masking function of the free-form line (e.g., line 598) is triggered when an on-screen location corresponding to an initial position of contact 583 on the touch-sensitive surface is at least a threshold distance away from the free-form line (e.g., line 598), as shown in FIG. 5R. In some embodiments, the masking function of the free-form line (e.g., line 598) is triggered when motion of a contact on the touch-sensitive surface (e.g., touch screen 112) corresponds to on-screen motion that crosses the free-form line (e.g., line 598) and that is along an on-screen direction (e.g., as measured by the smaller angle formed between the line and the on-screen direction) at least a threshold angle (e.g., 30 degrees) away from the free-form line (e.g., line 598) at the cross location.

FIG. 5R illustrates that, in the block-fill mode, fill content of preselected color and texture (e.g., color and texture of a currently selected drawing tool) is added to a fill region (e.g., fill region 581) in sketch area 502 in accordance with movement of contact 583 on the touch-sensitive surface (e.g., touch-screen 112). In some embodiments, fill region 581 is delineated on one side by the free-form line (e.g., line 598). As shown in FIG. 5R, the side of the fill region 581 that is next to the free-form line (e.g., line 598) completely conforms to the shape of the free-form line (e.g., line 598), even though on-screen path 579 of the movement that corresponds to the movement of contact 583 on the touch-sensitive surface crosses the free-form line at more than one places. For example, when determining the fill region in accordance with the movement of contact 583 and the shape of the free-form line (e.g., line 598), the region defined by the back-and-forth on-screen movement of contact 583 may be stretched and/or cropped to conform to the shape of the free-form line, such that the boundary of the fill region that lies next to the free-form line will completely conform to the shape of the free-form line.

In some embodiments, on the side of fill region 581 that is opposite to the side next to the free-form line, filled region 581 is delineated in accordance with a straight line that connects the beginning and the end of on-screen path 579 that corresponds to the movement of contact 583 on the touch-sensitive surface. As shown in FIG. 5R, the boundary of fill region 581 on the opposing side of the free-form line (e.g., line 598) is smooth and straight even though on-screen path 579 of contact 583 is wavy and jagged. Fill region 581 includes at least some areas not crossed by on-screen path 579 of contact 583.

In some embodiments (not shown in FIG. 5R), the fill factor of the fill content added to fill region 581 does not need to be uniform throughout fill region 581. In some embodiments, portions of fill region 581 that is closer to the free-form line is filled with a higher fill factor (e.g., deeper color saturation, and/or fewer percentage of uncolored pixels), while portions of fill region that is father away from the first edge of the virtual drawing aid is filled with a lower fill factor (e.g., less color saturation, and/or more percentage of uncolored pixels). In some embodiments, the fill factor changes on a gradient going from the boundary of the fill region that is next to the free-form line toward the opposing boundary of the fill region.

In some embodiments, the boundary of fill region 581 on other sides are delineated in accordance with segments of on-screen path 579 that correspond to the initial on-screen movement toward the free-form line (e.g., line 598) and the final on-screen movement away from the free-form line.

Figure 5S:
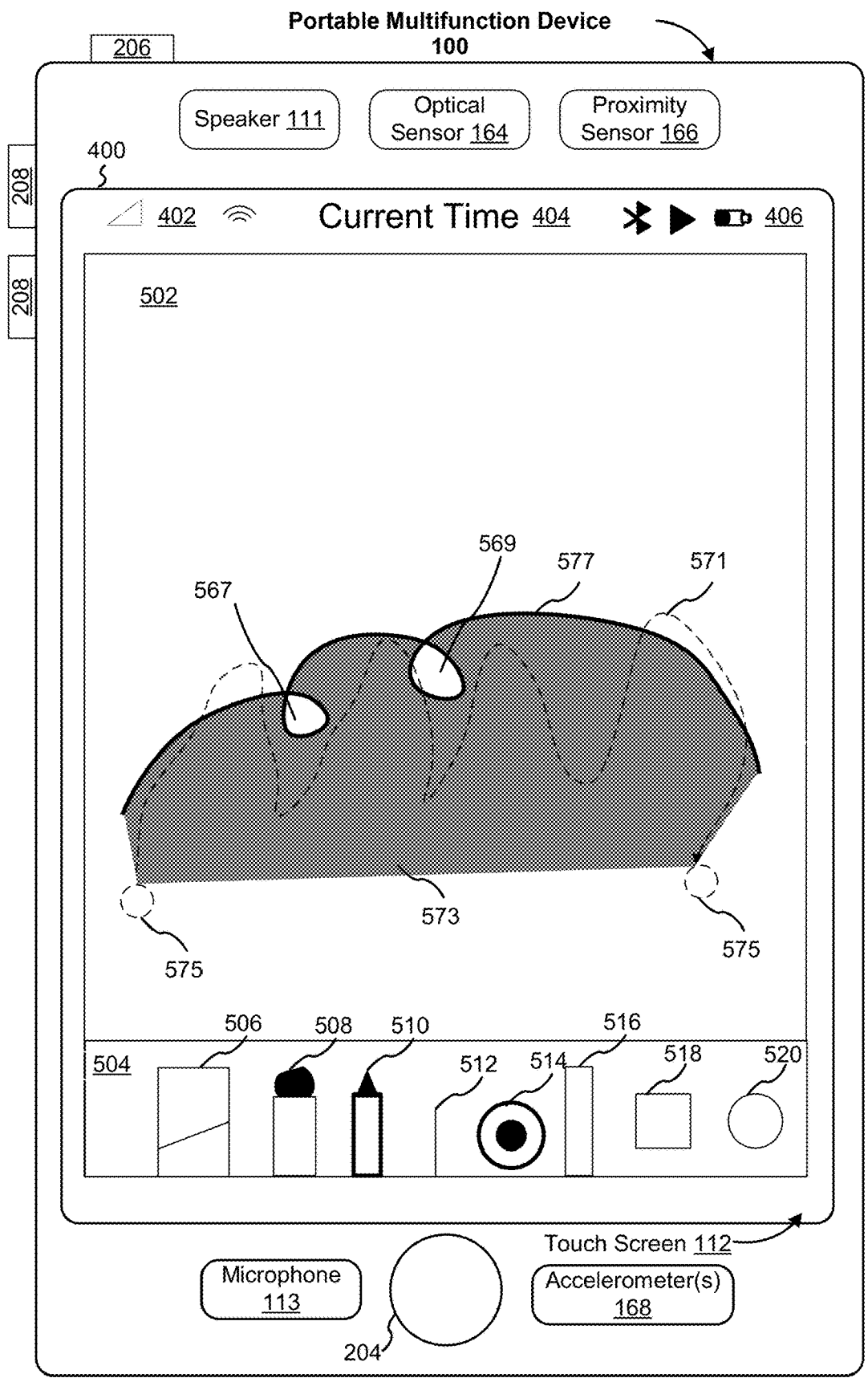
Figure 5T:
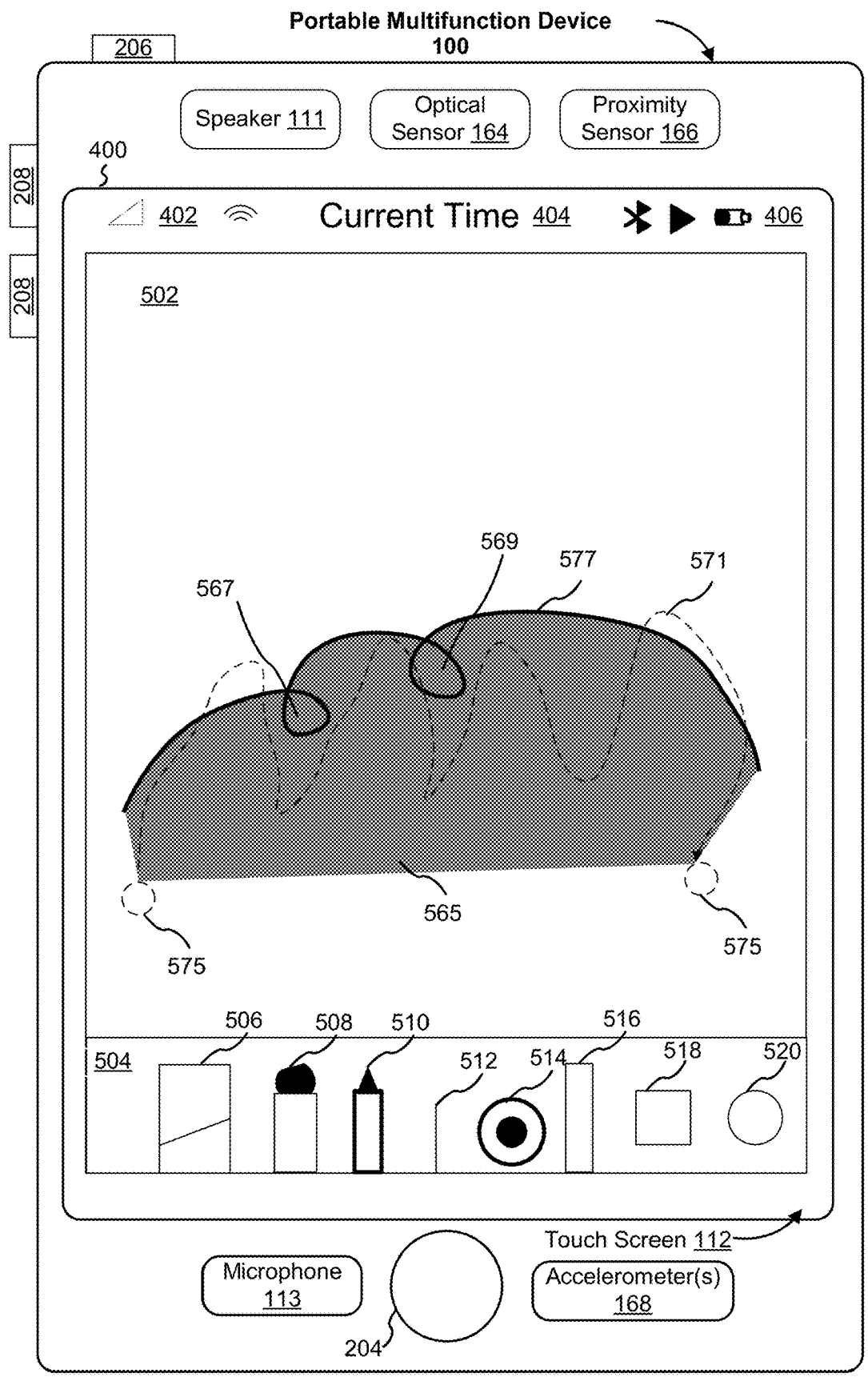

FIGS. 5S-5T illustrate two alternative treatments of loops in the free-form line, when the free-form line is used as a virtual drawing aid. In FIG. 5S, a free-form line (e.g., line 577) includes two loops (e.g., loops 567 and 569). As shown in FIG. 5S, free-form line 577 has been selected as a virtual drawing aid for masking fill area 573 that is determined according to movement of contact 575 on the touch-sensitive surface. In some embodiments, loops (e.g., loops 567 and 569) are not filled by the fill content, and in this example case, the inner envelope of the free-form line (e.g., line 577) is used to mask the fill area (e.g., fill area 573). In some embodiments, the loops are not filled even if the on-screen path (e.g., on-screen path 571) that corresponds to the movement of the contact (e.g., contact 575) on the touch-sensitive surface crosses one or more of the loops (e.g., loop 569).

In FIG. 5T, a free-form line (e.g., line 577) includes two loops (e.g., loops 567 and 569). As shown in FIG. 5T, free-form line 577 has been selected as a virtual drawing aid for masking fill area 565 that is determined according to movement of contact 575 on the touch-sensitive surface. In some embodiments, loops (e.g., loops 567 and 569) are filled by the fill content, and in this example case, the outer envelope of the free-form line (e.g., line 577) is used to mask the fill area (e.g., fill area 565). In some embodiments, the loops are filled even if the on-screen path (e.g., on-screen path 571) that corresponds to the movement of the contact (e.g., contact 575) on the touch-sensitive surface does not crosses one or more of the loops (e.g., loop 569).

Figure 5U:
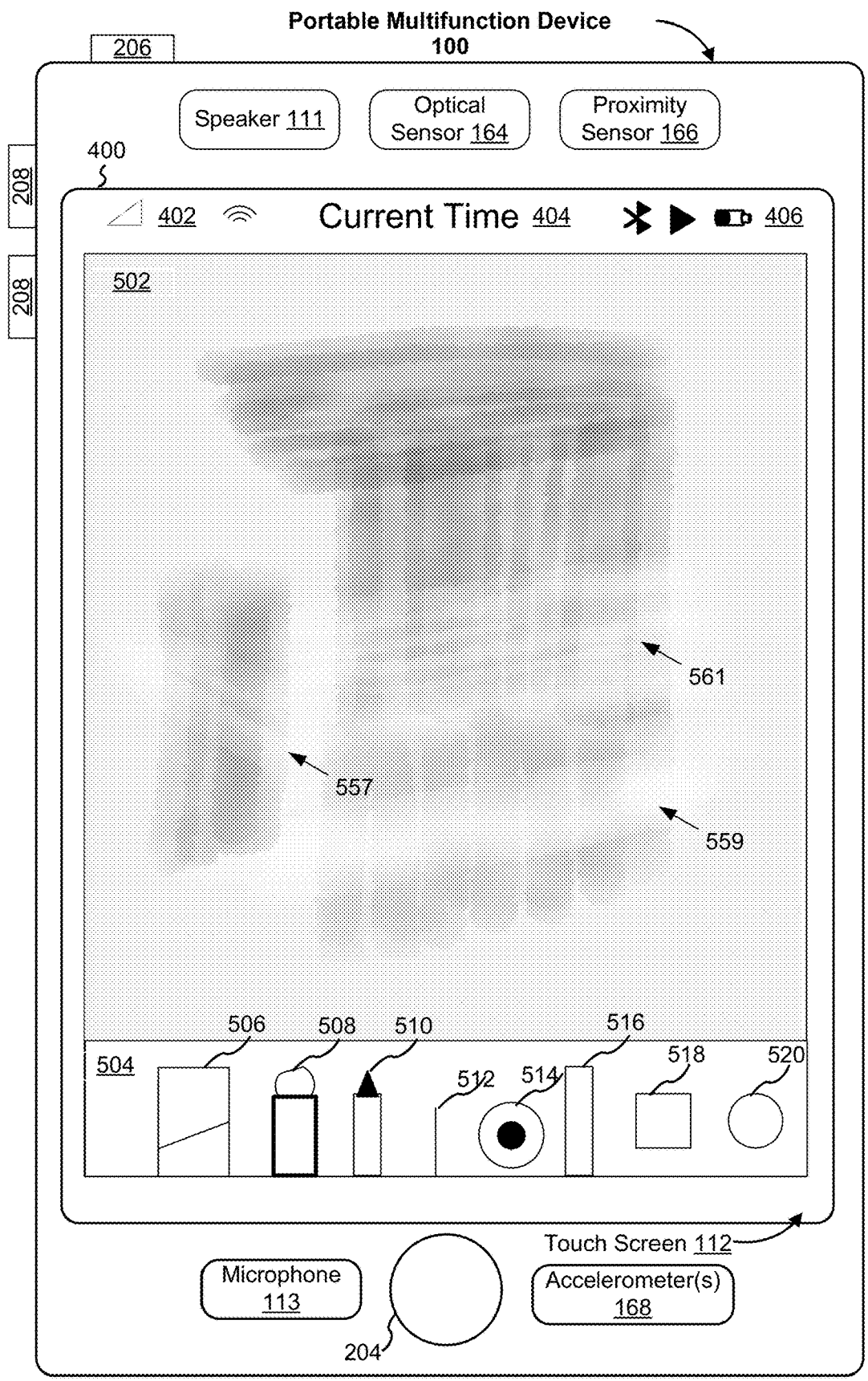

FIG. 5U illustrate application of a white wash over existing paint strokes on the drawing canvas. In some embodiments, when drawing strokes on the drawing canvas using a drawing tool that provide a non-opaque texture (e.g., water-color), a color-multiple technique is used to determine the final color of the pixels that were passed by the drawing strokes multiple times. For example, in the top region of the drawing canvas, coral colored paint is used when multiple horizontal brush strokes are applied onto the drawing canvas. As a result of the multiple coral colored brush strokes, the coral color in regions where multiple strokes had overlapped is deeper and more saturated. The actual color applied to a pixel that is passed by the coral colored paint brush more than once is determined based on a predetermined blending algorithm (e.g., a color multiply algorithm). In the bottom region of the drawing canvas, peach colored paint is used when multiple vertical brush strokes are applied onto the drawing canvas. The peach colored strokes do not overlap with one another. In the region between the coral colored region and the peach colored region, blue colored paint is used when multiple vertical brush strokes are applied onto the drawing canvas. As a result of the multiple blue colored brush strokes, the blue color in regions where multiple strokes had overlapped is deeper and more saturated. The actual color applied to a pixel that is passed by the blue colored paint brush more than once is determined based on the same predetermined blending algorithm (e.g., the color multiply algorithm). In addition, the overlap between the coral colored region and the blue colored region also has a deeper and more saturated color, and the actual color applied to a pixel that is passed by both the blue colored paint brush and the coral colored brush is determined based on the same predetermined blending algorithm (e.g., the color multiply algorithm). In the regions described above, regardless of the colors that were blended, a deeper and darker color resulted from the blending using the color multiple algorithm.

In some embodiments, when a white colored brush stroke is applied over another non-white colored brush stroke, in order to achieve a white wash visual effect, a special blending process is used. In some embodiments, for each pixel that is touched by the white colored brush stroke: an opaque white layer is created to cover the original color of the pixel. Then, the original color of the pixel is blended with the white color using a soft blending algorithm to obtain a white-washed color, and the obtained white-washed color is applied on top of the opaque white layer at the pixel's location. The same process is repeated when the white colored brush passes the pixel again. As shown in regions 561, 559, and 557, when white colored brush strokes are applied over other non-white colored strokes, a lighter, white-washed color is shown.

In some embodiments, an example process for applying the white wash effect is as follows. The device receives a first plurality of paint strokes on a canvas, the first plurality of paint strokes having a first non-white color. The device renders the plurality of paint strokes on the canvas, the rendering including applying to each pixel on the canvas a respective first color value that is touched by at least one of the first plurality of paint strokes. In some embodiments, the respective first color value applied to the pixel is calculated based on a total count of paint strokes among the first plurality of paint strokes that touched the pixel. In some embodiments, the respective first color value is calculated based on a color multiply formula applied to the first non-white color and the total count of paint strokes among the first plurality of paint strokes that touched the pixel. After rendering the first plurality of paint strokes on the canvas, the device receives a second plurality of paint strokes, the second plurality of paint strokes having a white color and overlapping with at least a portion of the first plurality of paint strokes rendered on the canvas. The device renders the second plurality of paint strokes over at least the portion of the first plurality of paint strokes, where the rendering includes: for each pixel in the at least portion of the first plurality of paint strokes, applying a white color to the pixel, calculating a respective second color value based on the respective first color value applied to the pixel and the white color in accordance with a soft-blending formula, and applying the respective second color value to the pixel. In some embodiments, calculating the respective second color value based on the respective first color value applied to the pixel and the white color in accordance with the soft-blending formula further includes applying the soft-blending formula to the white color, the respective second color value, and a total count of paint strokes among the second plurality of paint strokes that touched the pixel.

Figure 5V:
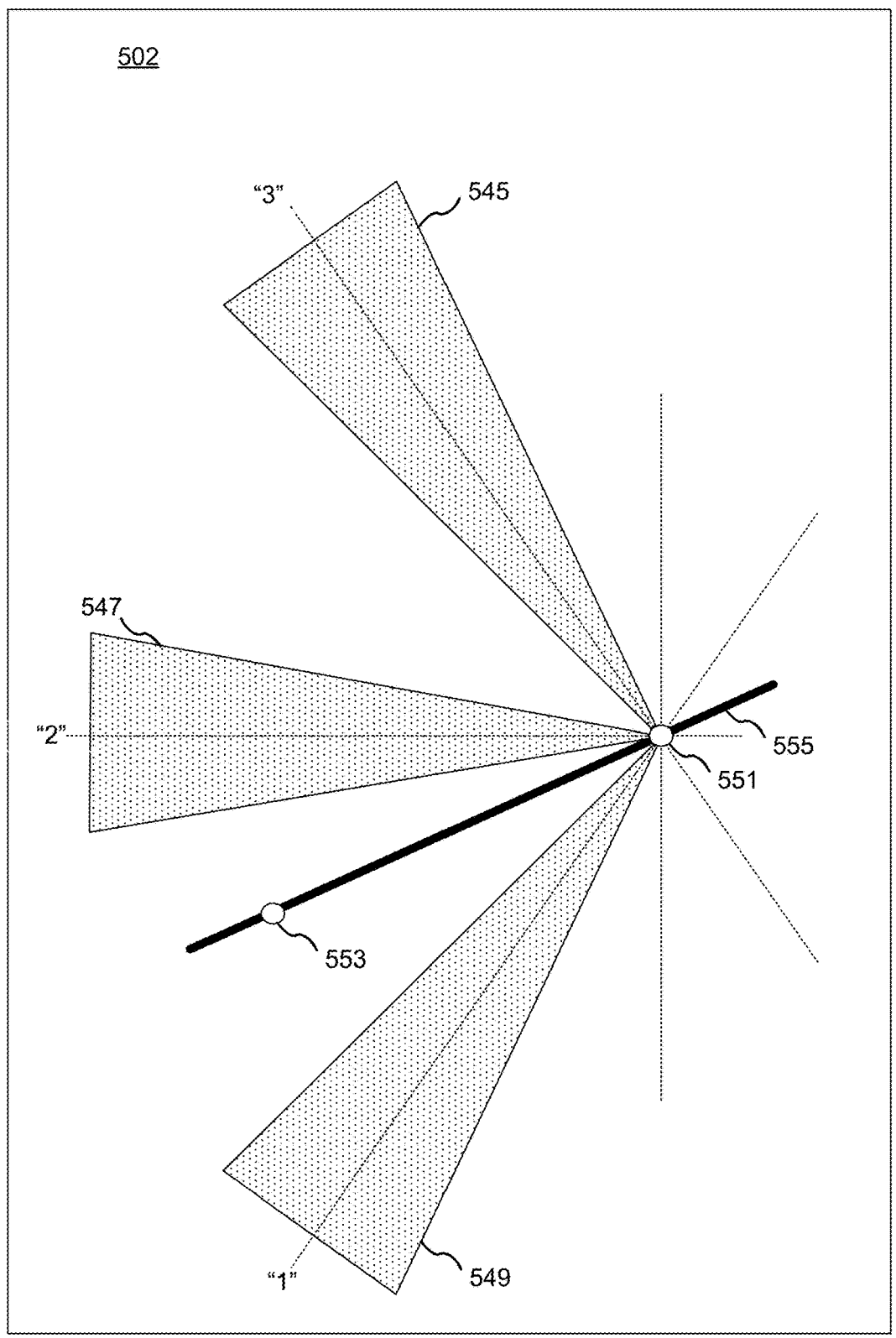

In some embodiments, providing an angle snapping function associated with rotation of a virtual drawing aid is desirable. For example, in some embodiments, when the angle snap mode is turned on, in order to rotate the virtual drawing aid (e.g., a straight-edged on-screen ruler) to an exact orientation associated with one of a set of preset snap angles, the user only need to rotate the virtual drawing aid to an orientation sufficiently close to (e.g., within a threshold snap zone of) the desired snap angle, and the virtual drawing aid will automatically snap to the desired snap angle (e.g., by automatically rotate an adjusted angular amount). FIGS. 5E and 5O, and accompanying descriptions disclose some details of angle snapping in accordance with some embodiments. Sometimes, the user may wish to temporarily disable or suspend the angle snap mode, and rotate the virtual drawing aid freely to any angle other than the preset snap angles. FIGS. 5V-5AL illustrate processes for entering and existing the angle snap mode in response to the movement of a contact of a rotational gesture, in accordance with some embodiments. Based on the processes described in FIGS. 5V-SAL, the user can trigger the angle snapping and free-rotation modes as needed during a continuous rotational gesture, without lifting off of the pivoting contact of the rotational gesture.

In FIG. 5V, a sketch area (e.g., sketch area 502) of is shown. Within sketch area 502, a simplified representation (e.g., ruler axis 555) of a virtual drawing aid (e.g., a straight-edged ruler, or any other virtual drawing aid that can be rotated) is shown. In some embodiments, an orientation of ruler axis 555 represents an orientation of the virtual drawing aid. For example, the ruler axis 555 for a straight-edged ruler is optionally the central axis of the straight-edged ruler that runs longitudinally along the ruler body. For another virtual drawing aid that has a more complex shape, the ruler axis is optionally defined by the central axis that runs longitudinally along the body of the virtual drawing aid (e.g., for an oval-shaped ruler, the ruler axis is the major axis of the oval-shaped ruler).

In some embodiments, as shown in FIG. 5V, a rotational gesture directed to the on-screen ruler (e.g., as represented by ruler axis 555) includes two contacts (e.g., contacts 553 and 551) on the on-screen ruler that are spaced apart from each other by at least a threshold distance, where one of the contacts (e.g., contact 551) is stationary and its on-screen location serves as an anchor location for the ruler's rotation, while the other contact (e.g., contact 553) pivots around the stationary contact (e.g., contact 551) in the clockwise or the counterclockwise direction to cause rotation of the ruler (e.g., as represented by ruler axis 555) around the anchor location. Although the rotational gesture in the following example is a pivoting gesture that includes a moving contact and a stationary contact, sometimes, both contacts of the rotational gesture may move during the rotational gesture. For example, the rotational gesture may include a translational component that is shared by both contacts of the rotational gesture. The shared translational movement of the two contacts can be represented by a movement of a pivot location (which may serve as an anchor location for the rotation of the ruler) between the two moving contacts, and the rotational movements of the two contacts are movements in opposite directions relative to the pivot location.

In some embodiments, in a free-rotation mode, the rotation of the ruler (as represented by ruler axis 555) adheres to the movement of pivoting contact (e.g., movement of the pivoting contact 553) around the anchor location (e.g., around the on-screen location of the stationary contact 551 or another anchor location defined based on other methods). In other words, in the free rotation mode, the ruler is always attached to and moves with the moving contact or a focus selector corresponding to the moving contact. In some embodiments, if both contacts are moving around a common pivot location during the rotational gesture, either contact may serve as the moving or pivoting contact in the following examples. The anchor location defined by the movements of the contacts (e.g., the anchor location is the same as the pivot location on a touch-screen, and the anchor location is at the on-screen location corresponding to the pivot location on the touch-sensitive surface) is the location relative to which the snap angles and ruler orientations are measured.

In some embodiments, in an angle snap mode, the ruler (e.g., as represented by ruler axis 555) snaps to (e.g., automatically rotates to) a preset snap angle as soon as the ruler enters a respective snap zone associated with the preset snap angle. For example, the ruler enters the respective snap zone associated with the preset snap angle in accordance with the movement of a contact of the rotational gesture directed to the ruler, and then jumps away from the contact to snap to the preset angle. Once the ruler snaps to the preset snap angle, subsequent movement of the contact within the snap zone of the preset snap angle no longer rotates the ruler, until the contact moves outside of the snap zone again to suspend the angle snap mode and start the free-rotation mode. When the contact exits the snap zone of the preset angle, the ruler snaps back to the contact, and rotates freely with the moving contact outside of the snap zone.

In some embodiments, the snap angles and snap zones associated with the snap angles are determined based on the anchor location of the rotational gesture. For example, as shown in FIG. 5V, as soon as the two contacts (e.g., contacts 553 and 551) of the rotational gesture are detected on the on-screen ruler, a reference orientation is defined based on the anchor location associated with the rotational gesture. For example, in some embodiments, the anchor location is the on-screen location corresponding to the stationary contact (e.g., contact 551) of the rotational gesture. In some embodiments, the anchor location is an on-screen location corresponding to a pivot location that is between two moving contacts of the rotational gesture and that is the center about which the two moving contacts rotate in opposite directions. In some embodiments, the reference orientation is based on a horizontal line that passes through the anchor location, and the preset snap angles are a set of angles relative to the reference orientation (e.g., the horizontal line) around the anchor location. In some embodiments, the reference orientation is based on the ruler axis at the time that the rotational gesture is detected, and the preset snap angles are a set of angles relative to the ruler axis around the anchor location. In some embodiments, the anchor location is not static throughout the rotational gesture, and the set of snap angles are dynamically determined based on the current anchor location during the rotational gesture.

As shown in FIG. 5V, three adjacent snap angles (e.g., marked "1", "2", and "3") are illustrated in sketch area 502, each snap angle has a respective snap zone (e.g., defined by a threshold angular range (e.g., +/−2 degrees)) around the snap angle. The snap angles (e.g., angles "1", "2", and "3") and corresponding snap zones (e.g., snap zones 549, 547, and 545) shown in FIG. 5V are exaggerated for ease of illustration. In an actual implementation, many more snap angles (e.g., every 5 degrees), and/or much smaller snap zones can be defined. The angular range between each pair of adjacent snap zones (e.g., the angular range between snap zones 545 and 547, and the angular range between snap zones 547 and 549) is a free-rotation zone, and no angle snapping occurs within the free-rotation zone.

Entering and exiting the angle snap mode purely based on whether the ruler or the moving contact has entered or exited a snap zone is not sufficient when the user wishes to rotate the ruler to an angle other than the snap angle within the snap zone.

Figure 5W:
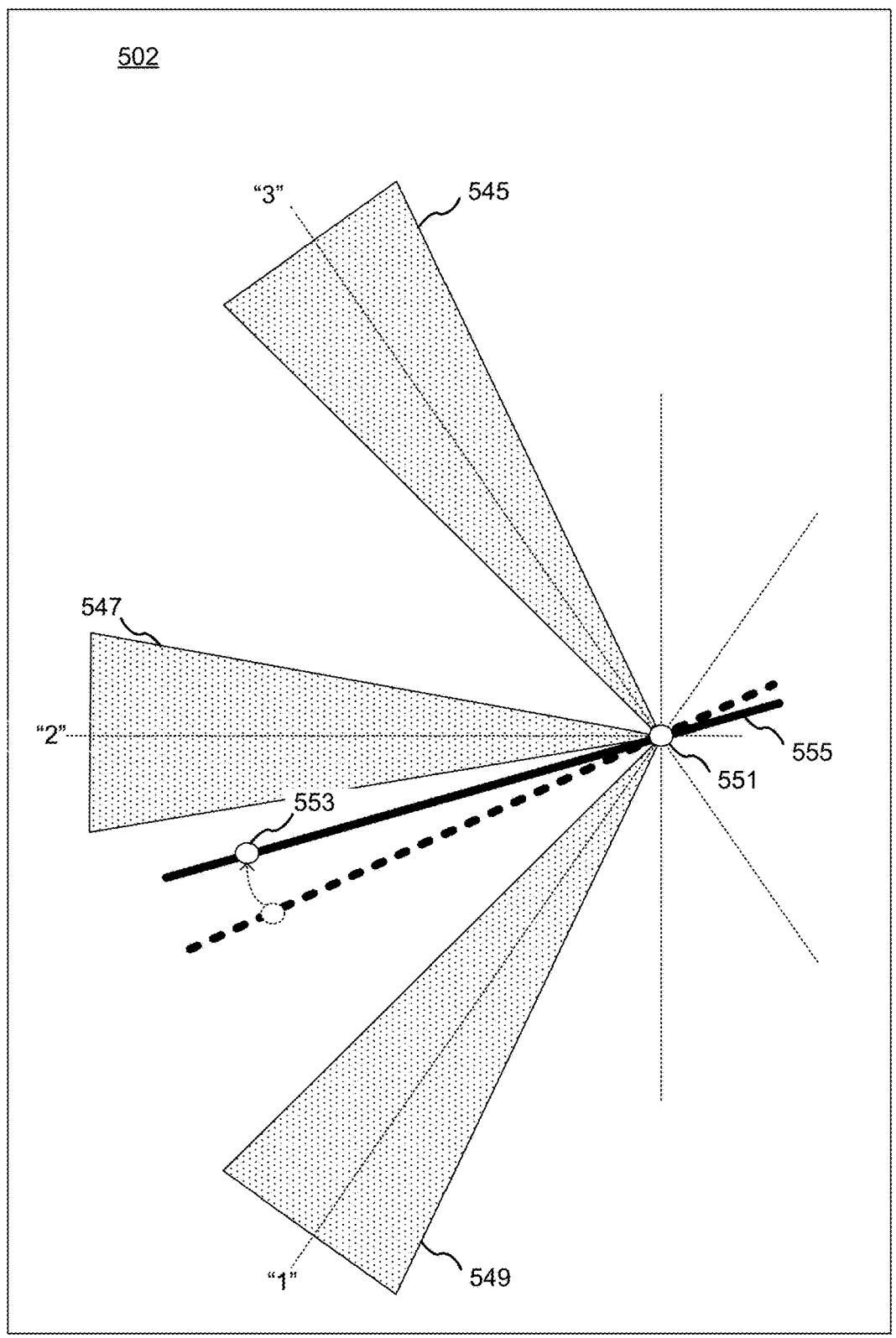

FIGS. 5W-5AA illustrate a process for un-snapping the ruler from the snap angle within the snap zone of the snap angle, in accordance with some embodiments.

As shown in FIG. 5W, during an initial portion of the rotational gesture, the moving contact (e.g., contact 553) moves towards the snap zone (e.g., snap zone 547) of snap angle "2". Before entering snap zone 547 of snap angle "2", the on-screen ruler (e.g., as represented by ruler axis 555) moves with moving contact 553 and rotates around the anchor location (e.g., the anchor location defined by stationary contact 551). Although not shown in FIG. 5W, while outside of snap zone 547 of snap angle "2", moving contact 553 can move back and forth (e.g., clockwise and counterclockwise) around the anchor location (e.g., anchor location defined by stationary contact 551), and the on-screen ruler will rotate back and forth freely with moving contact 553.

Figure 5X:
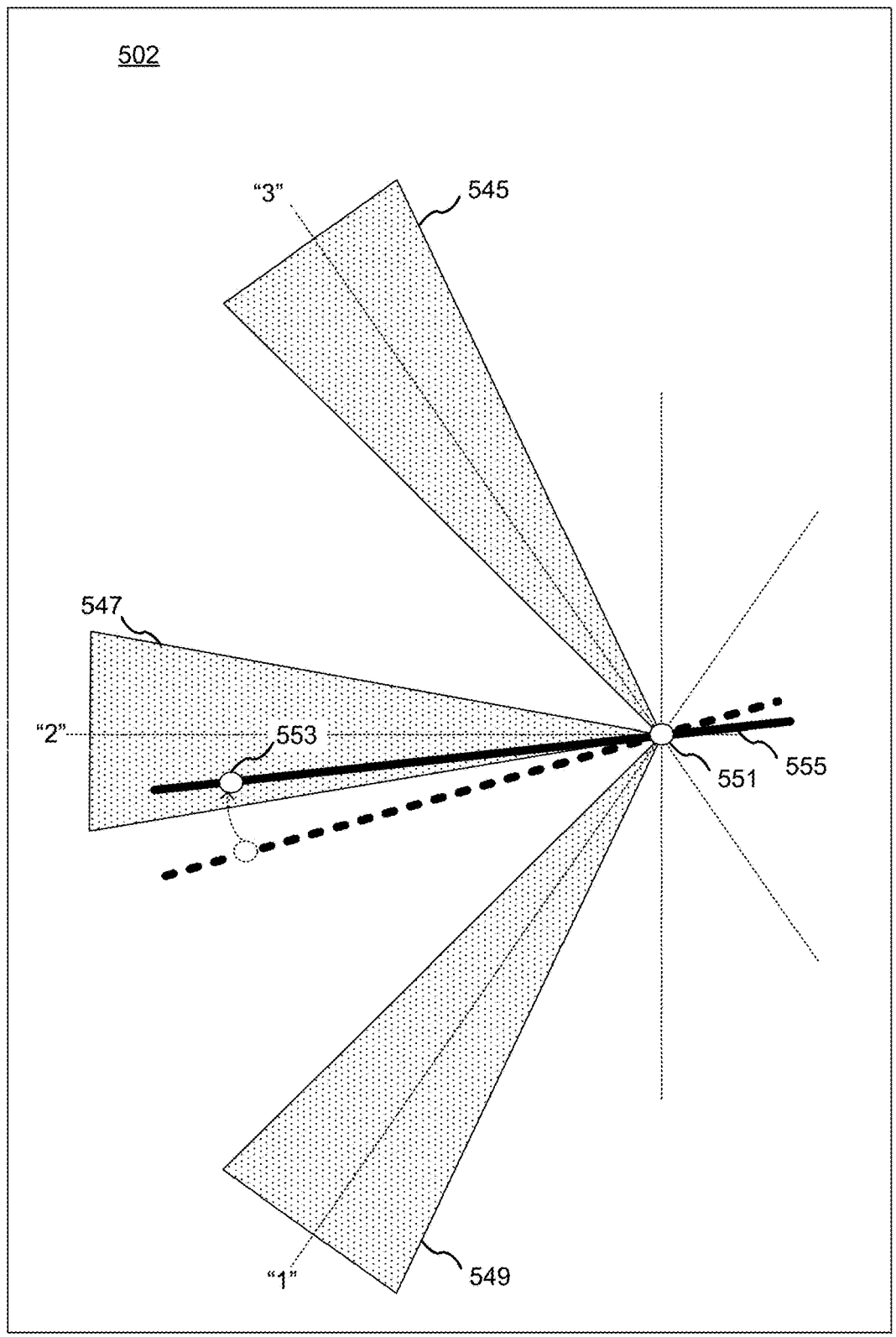
Figure 5Y:
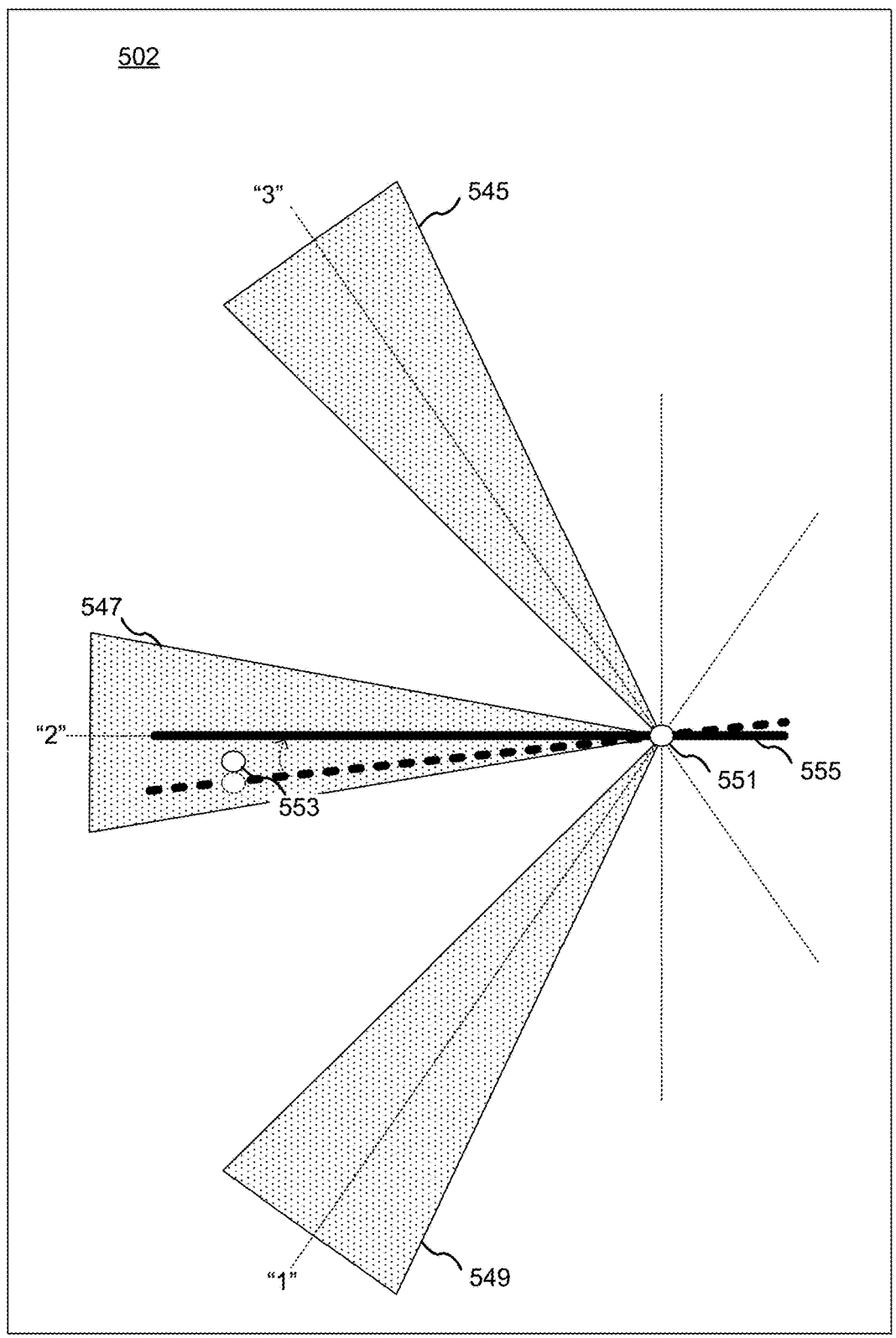

As shown in FIG. 5X, the moving contact (e.g., contact 553) has dragged the on-screen ruler into snap zone 547 of snap angle "2". As soon as the on-screen ruler (e.g., as represented by ruler axis 555) has crossed into snap zone 547 of snap angle "2" (e.g., the entire ruler axis 555 is within snap zone 547), the angle snap mode is activated. As shown in FIG. 5Y, when the angle snap mode is activated, the on-screen ruler (e.g., as represented by ruler axis 555) jumps away from moving contact 553 and snaps to the snap angle "2" by automatically rotating further by a small adjusted amount. In some embodiments, even if moving contact 553 continues to move forward (e.g., in the clockwise direction) within angle snap zone 547 around the anchor location, the on-screen ruler remains stationary and aligned with the snap angle "2".

Figure 5Z:
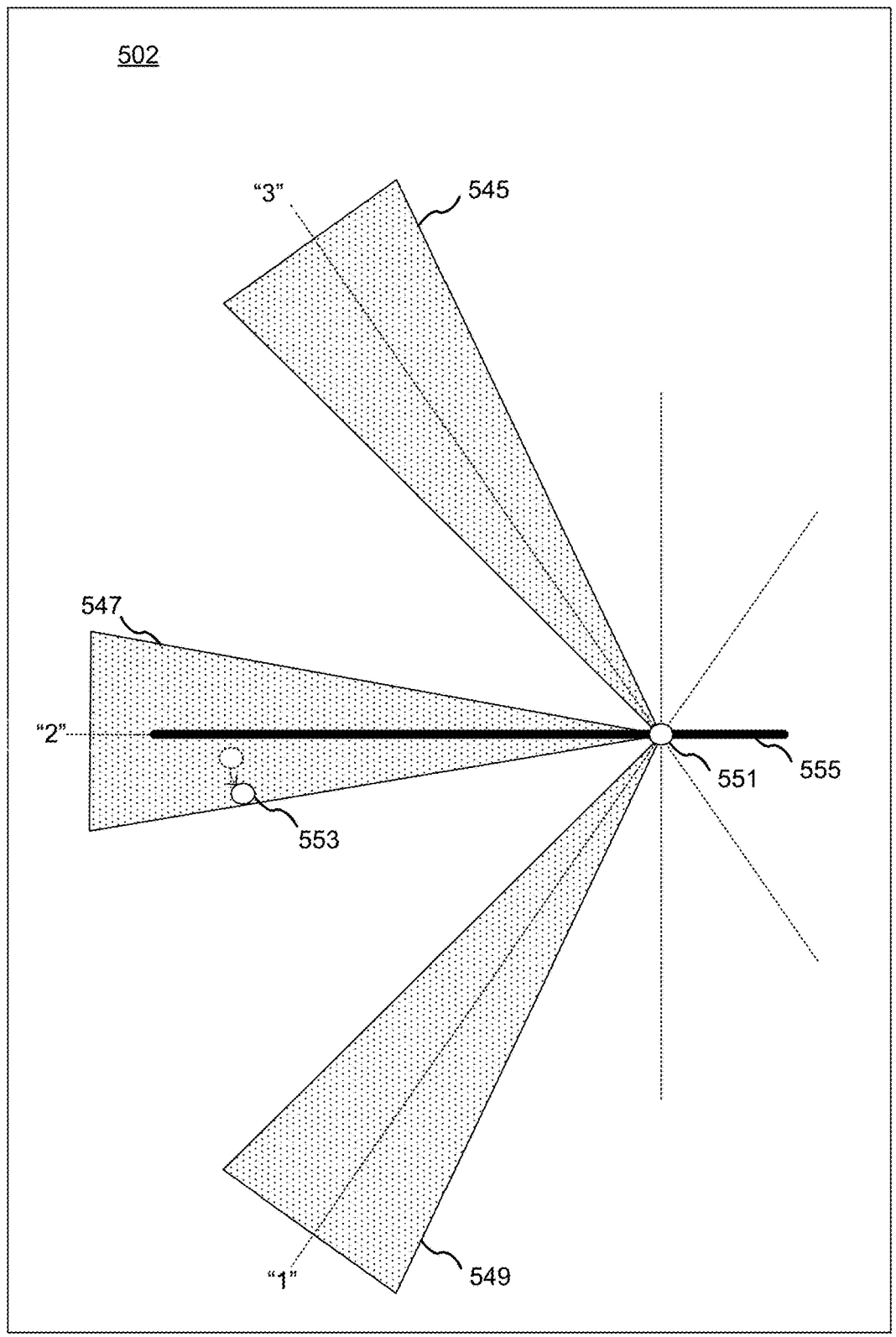
Figure 5A:
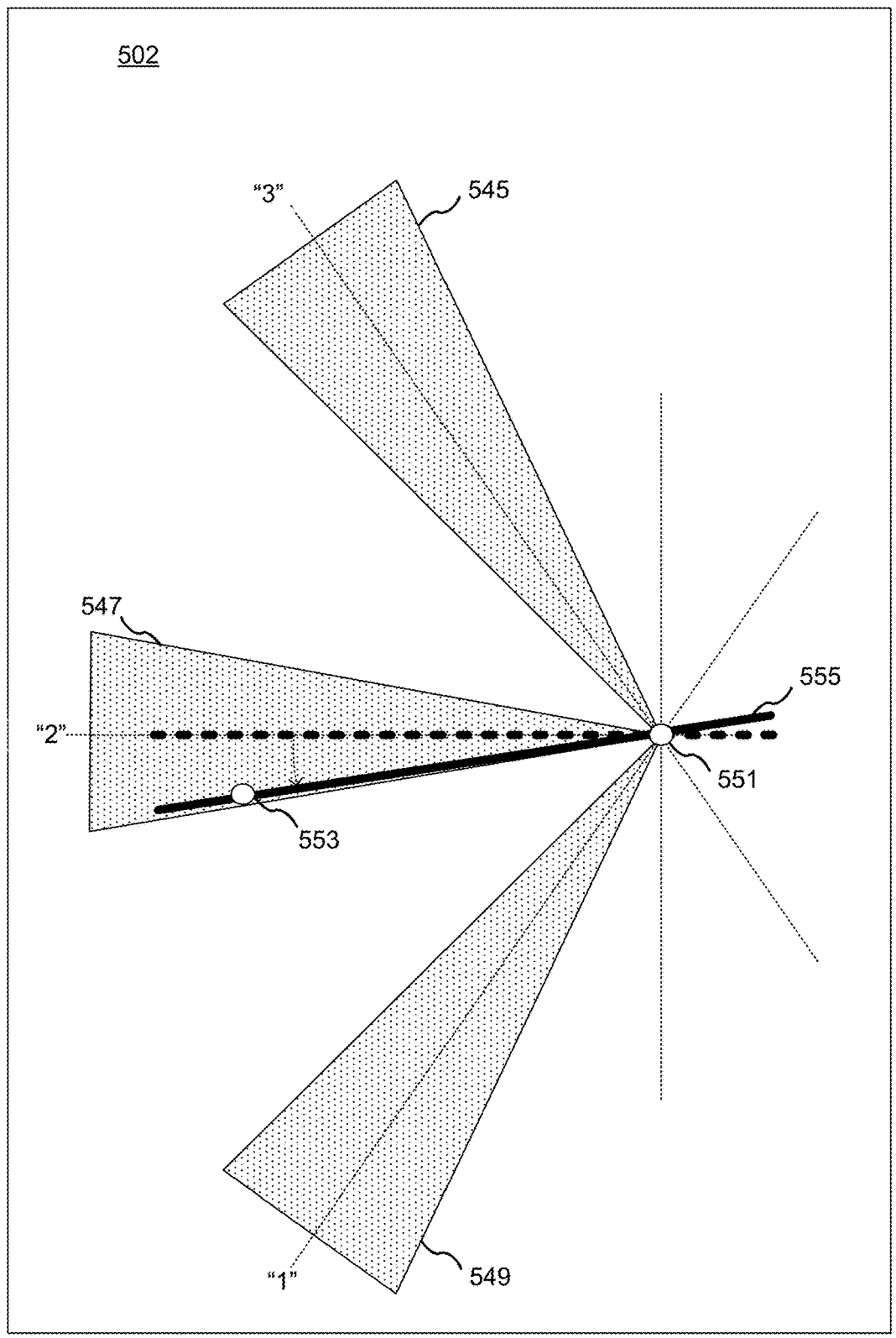
Figure 5A:
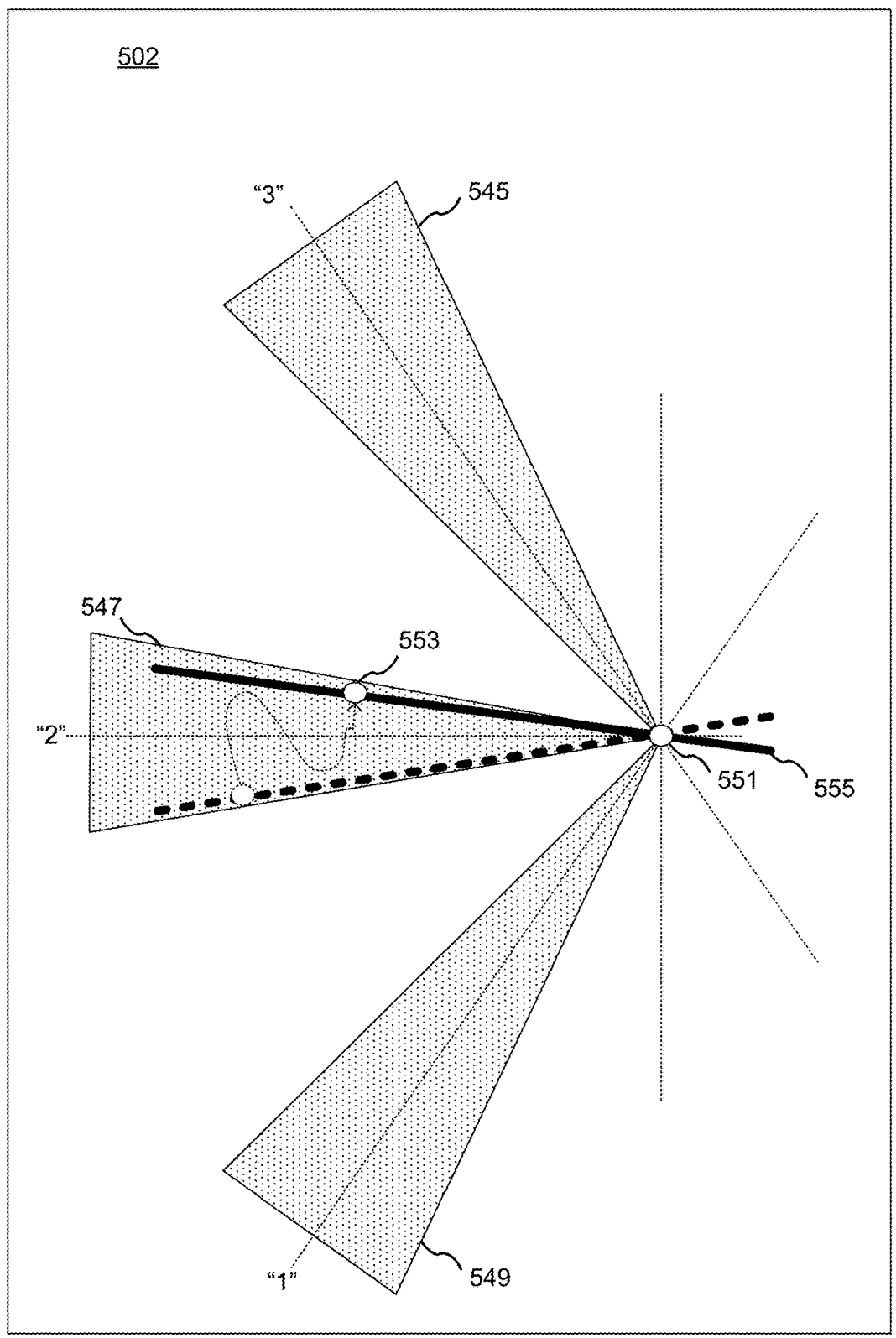
Figure 5A:
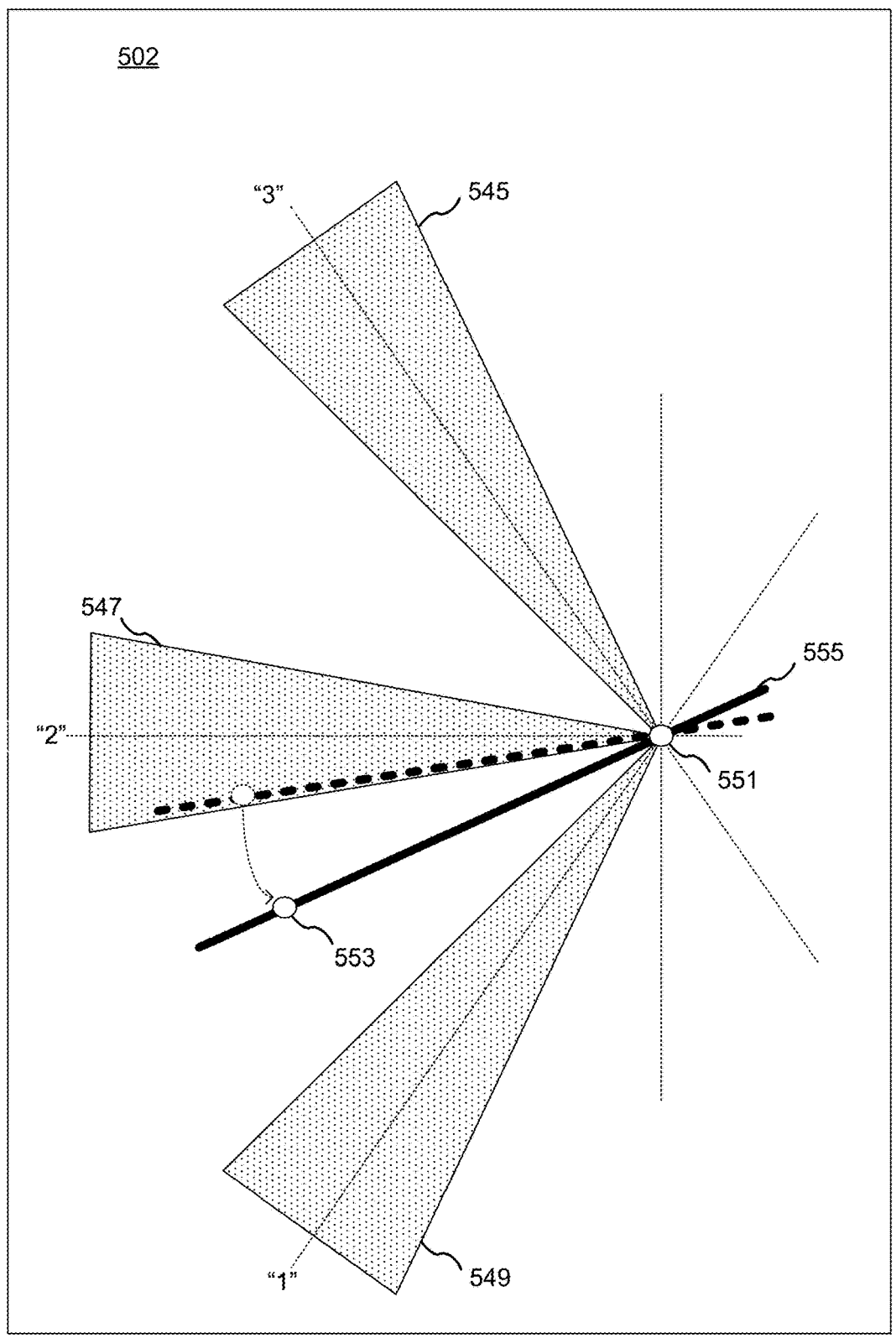
Figure 5A:
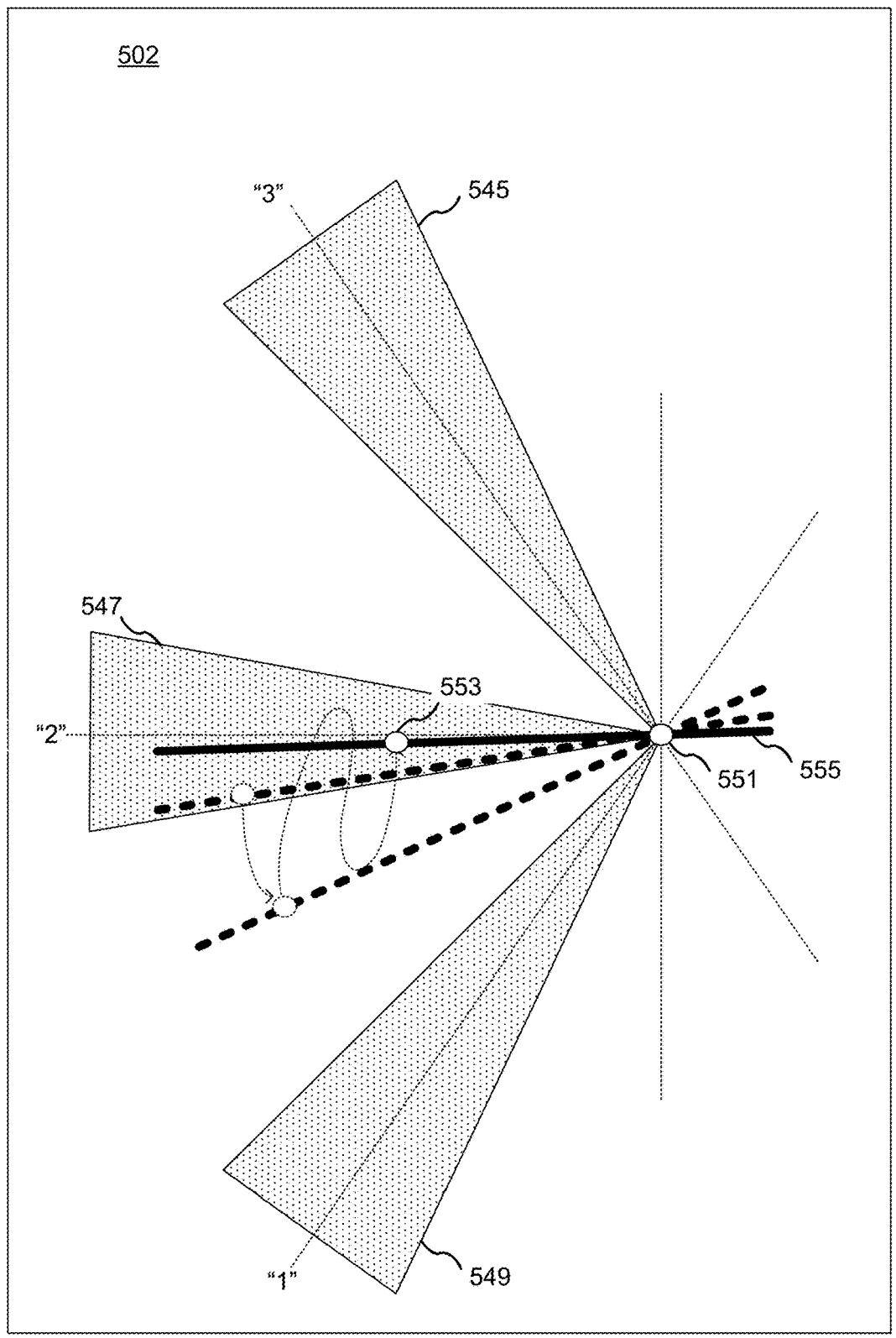
Figure 5A:
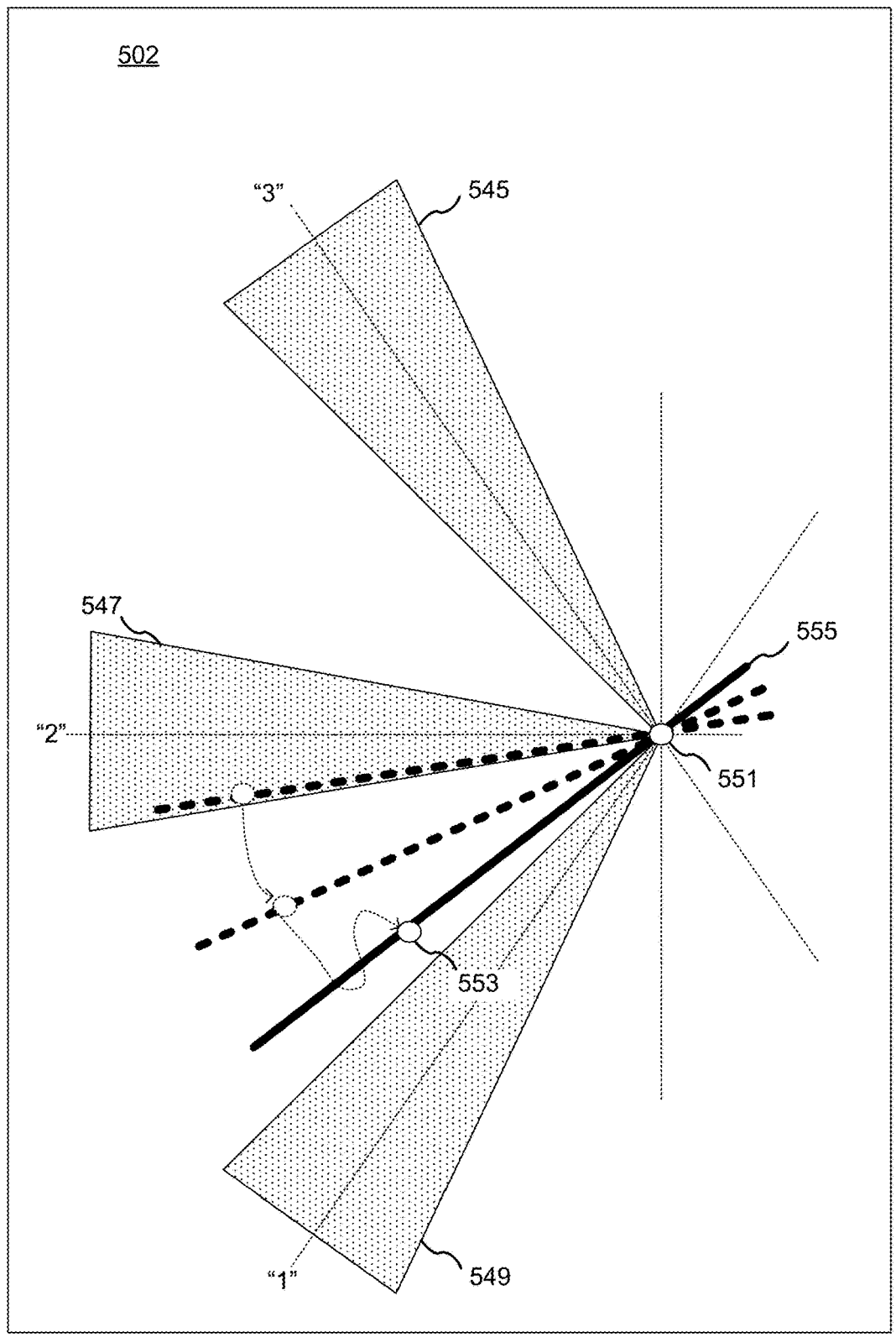
Figure 5A:
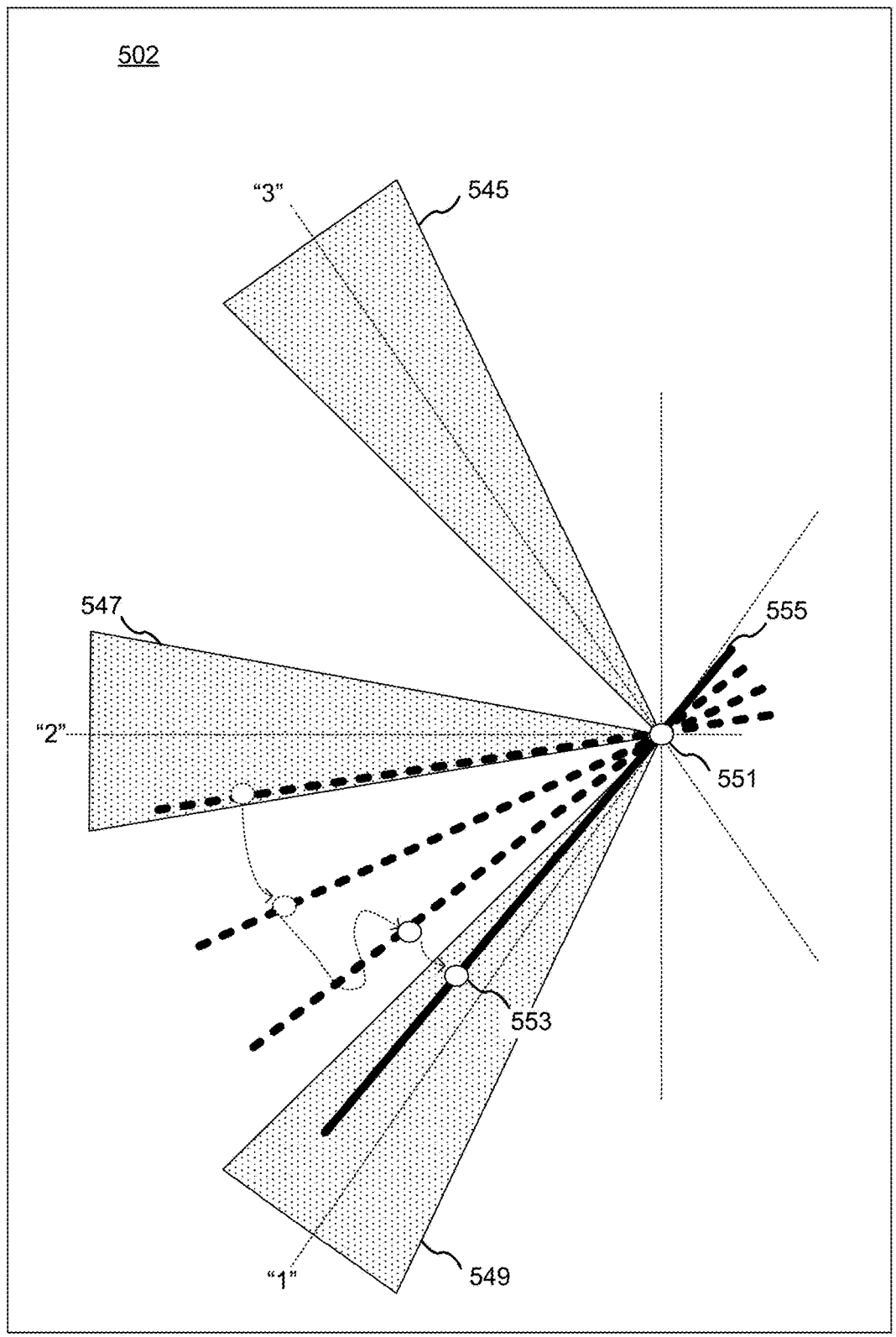
Figure 5A:
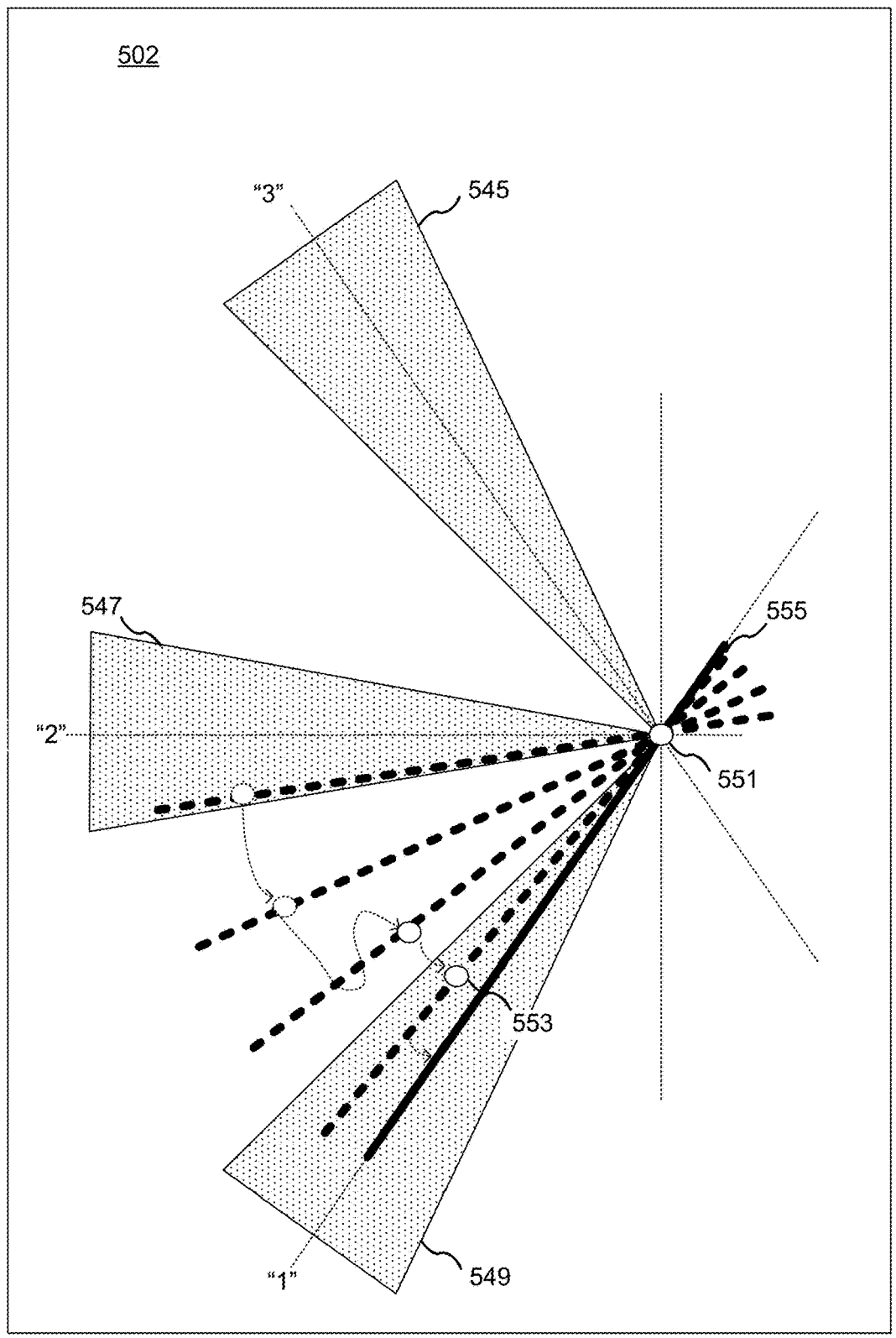
Figure 5A:
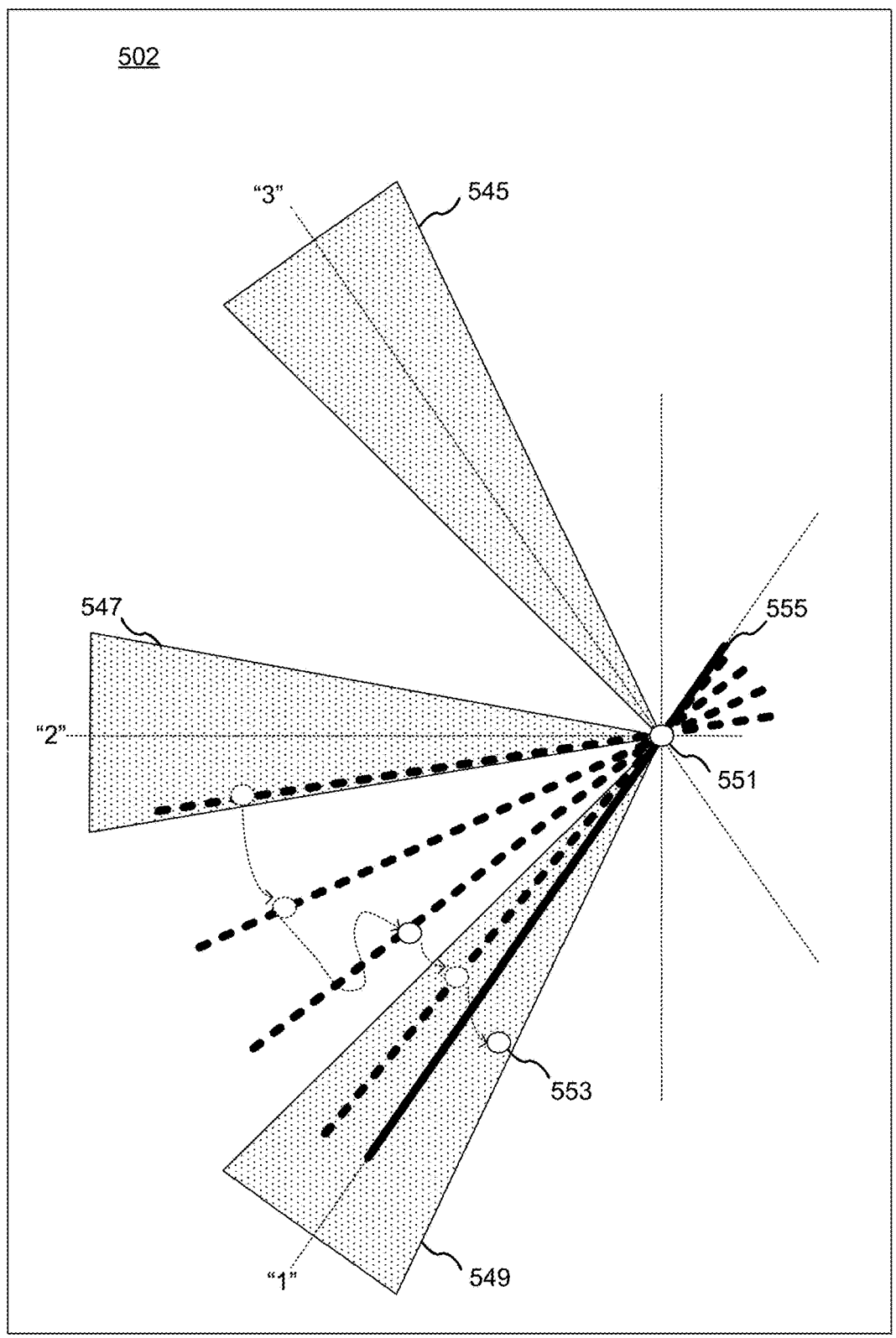
Figure 5A:
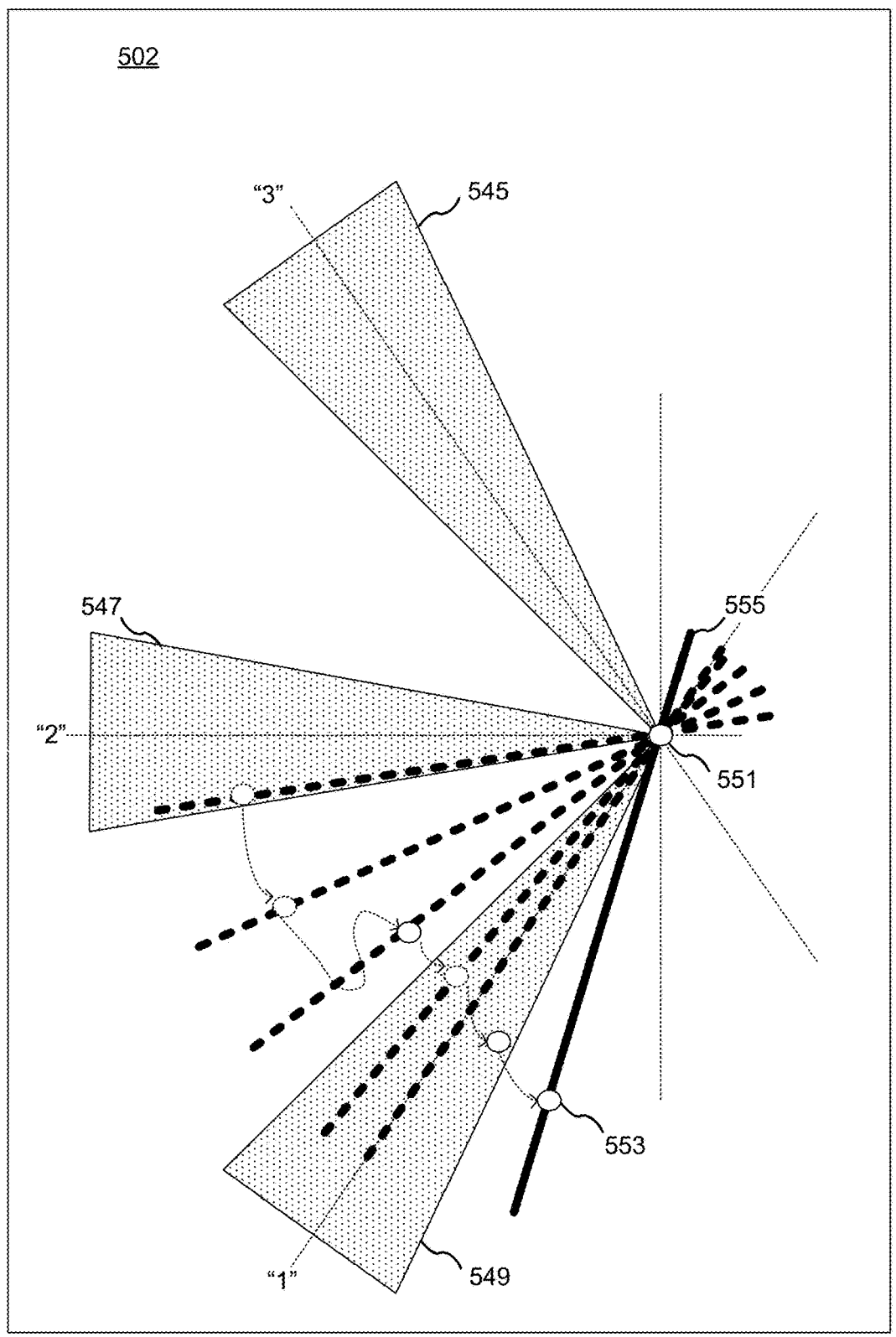
Figure 5A:
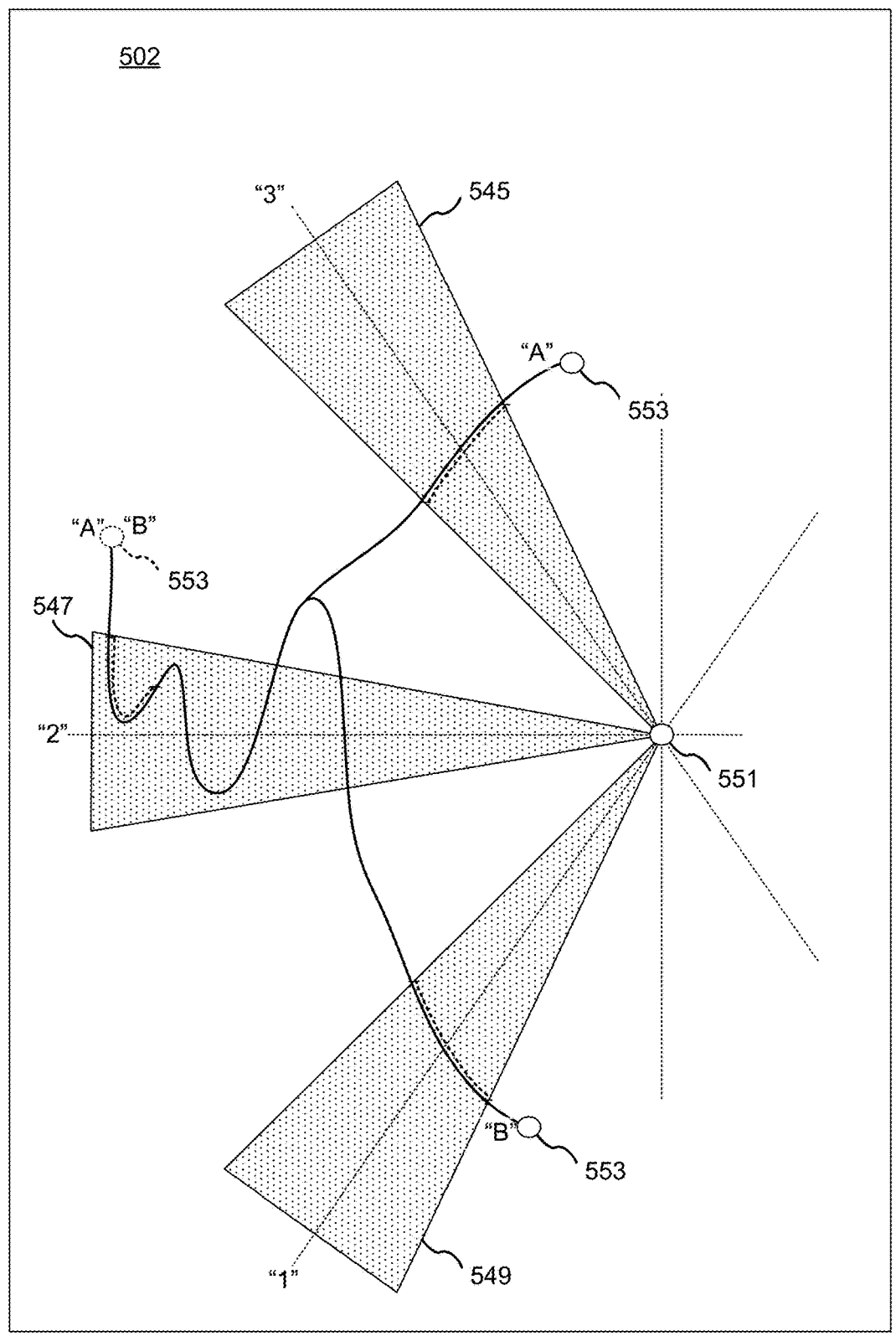
Figure 5A:
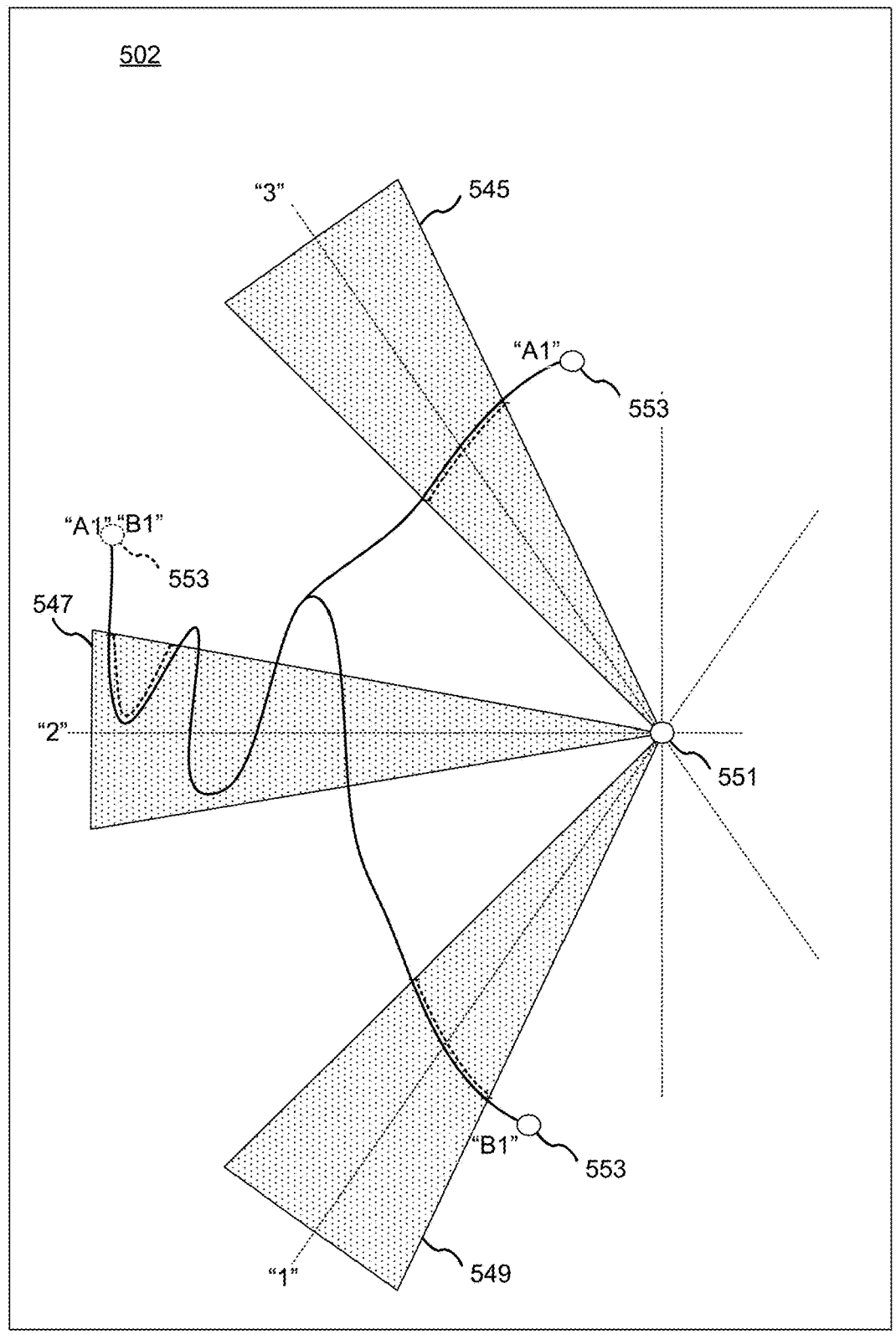
Figure 5A:
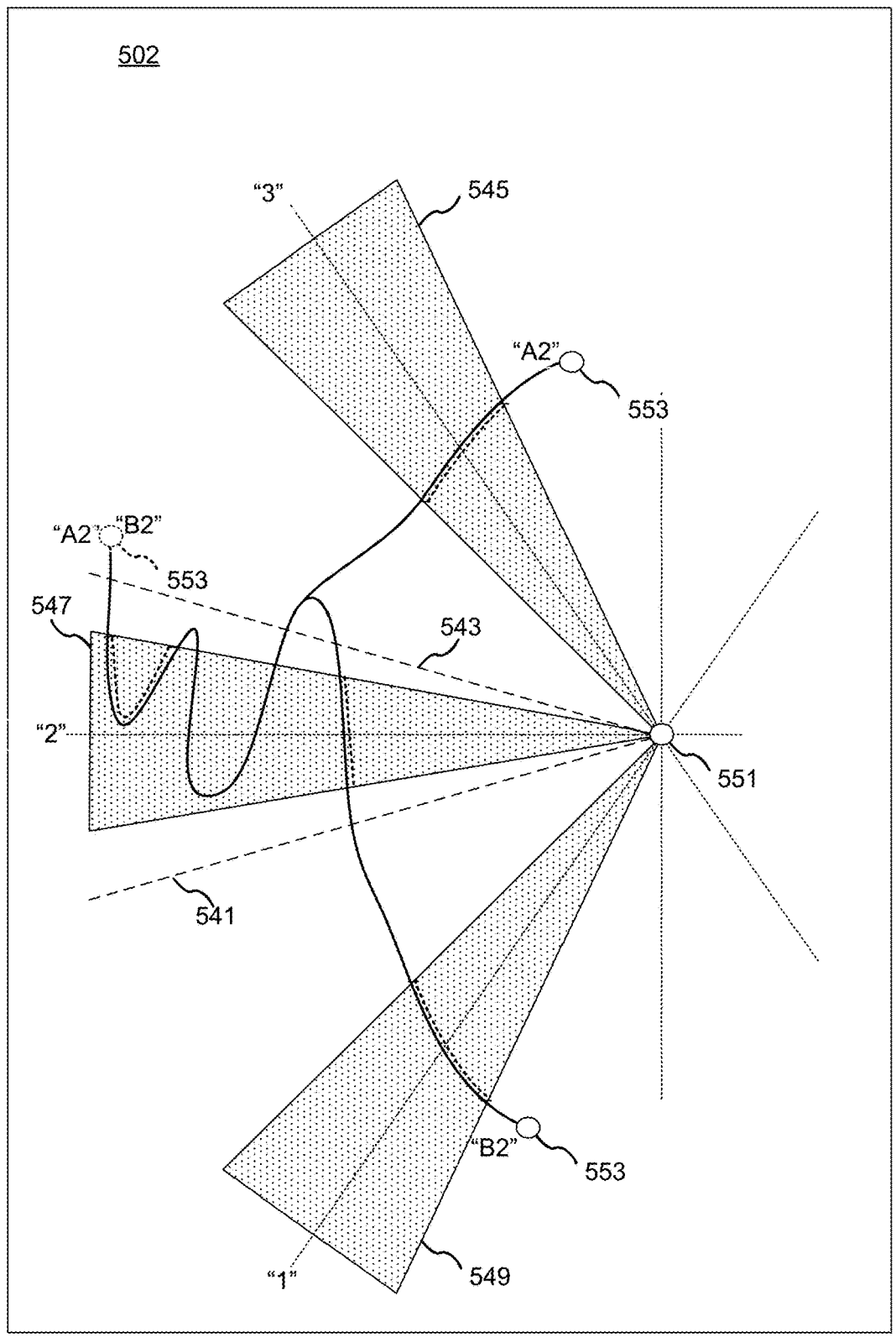
Figure 6D:
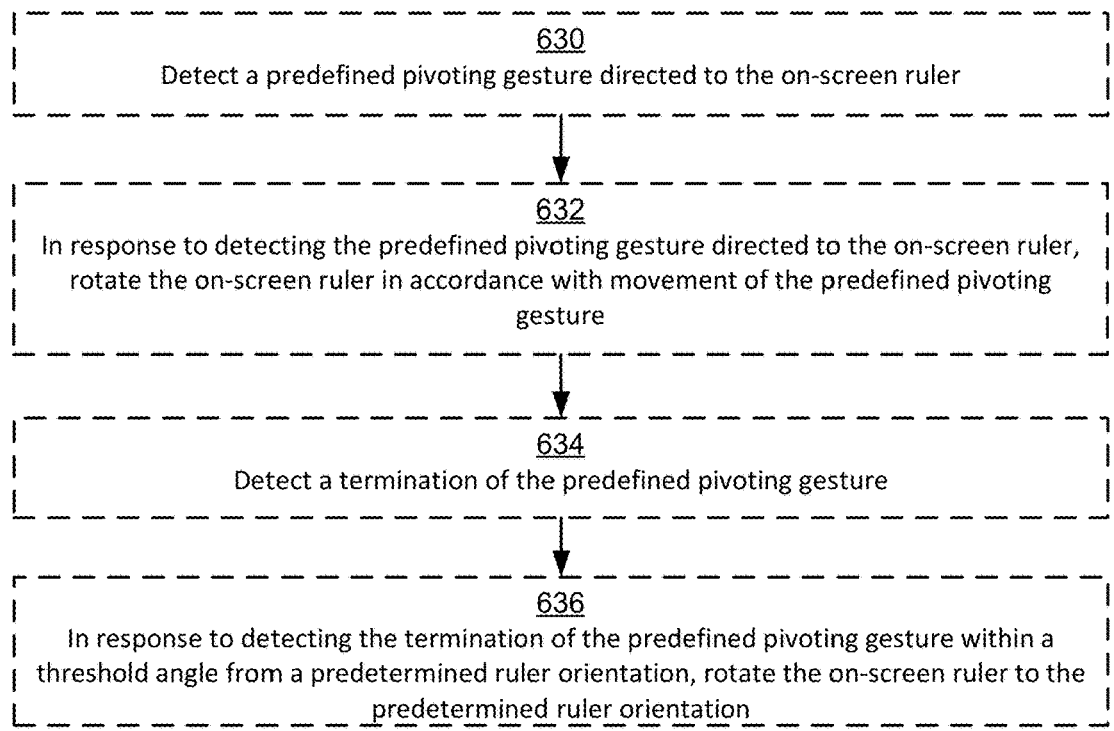
Figure 6E:
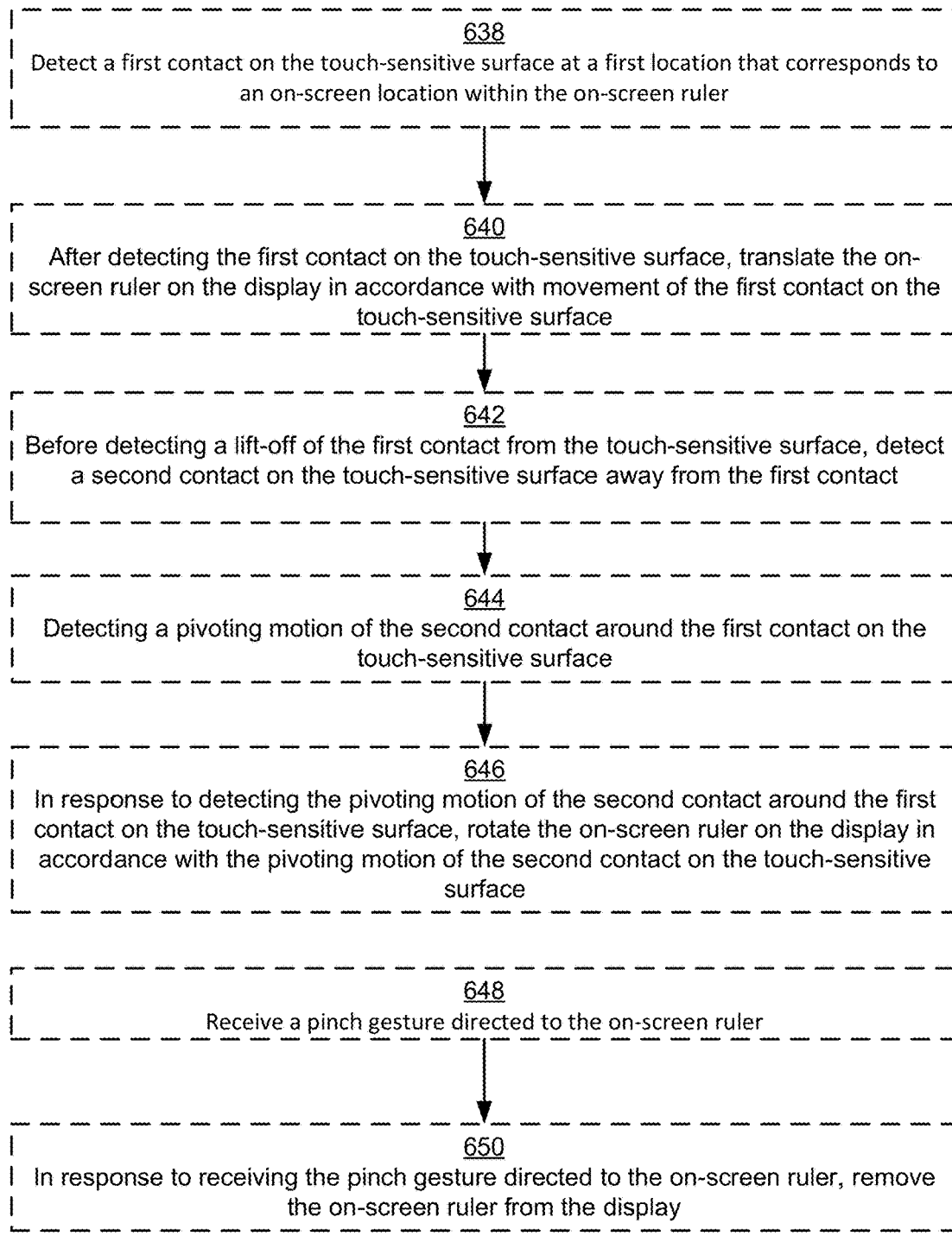

FIG. 5Z illustrates that, after the on-screen ruler has snapped to the snap angle "2", moving contact 553 brakes and turns back to move in the opposite direction (e.g., in the counterclockwise direction) around the anchor location. As soon as the reverse movement meets predetermined unsnapping criteria (e.g., the reverse movement reaches a threshold distance (e.g., 10 pixels) or threshold angular amount (e.g., 1 degree)), the angle snap mode is suspended, and free-rotation mode is activated. In some embodiments, moving contact 553 needs not exit snap zone 547 to satisfy the predetermined unsnapping criteria. For example, the unsnapping criteria may be satisfied when moving contact is still within snap zone 547 of snap angle "2", as shown in FIG. 5Z. In some embodiments, the predetermined unsnapping criteria include a criterion that is satisfied when the moving contact exits snap zone 547 of snap angle "2".

As shown in FIG. 5AA, as soon as the predetermined unsnapping criteria is satisfied by the movement of moving contact 553, the on-screen ruler (e.g., as represented by ruler axis 555) moves away from snap angle "2", and snaps to moving contact 553 by automatically rotating around the anchor location by a suitable amount.

FIG. 5AB illustrates that, after the on-screen ruler has been unsnapped from snap angle "2", and while in the free-rotation mode, moving contact 553 can rotate the on-screen ruler freely (e.g., back and forth) around the anchor location within snap zone 547, and the on-screen ruler will remain aligned with moving contact 553 during the free-rotational movement of moving contact 553 around the anchor location within snap zone 547.

FIG. 5AC illustrates that, after the on-screen ruler has been unsnapped from snap angle "2", and while in the free-rotation mode, moving contact 553 can rotate the on-screen ruler freely around the anchor location to exit snap zone 547 and enter the adjacent free-rotation zone, and the on-screen ruler will remain aligned with moving contact 553 during the free-rotational movement of moving contact 553 around the anchor location from snap zone 547 into the adjacent free-rotation zone.

FIG. 5AD illustrate that, after the on-screen ruler has been unsnapped from snap angle "2", and while in the free-rotation mode, moving contact 553 can rotate the on-screen ruler freely (e.g., back and forth) around the anchor location within and outside snap zone 547 (e.g., exiting snap zone 547 to enter the adjacent free-rotation zone, and returning to snap zone 547 one or more times), and the on-screen ruler will remain aligned with moving contact during the free-rotational movement of moving contact 553 around the anchor location back and forth into and out of snap zone 547. In some embodiments (not shown in FIG. 5AD), a second threshold is placed between adjacent snap zones (e.g., a threshold angle between snap zone 547 and snap zone 549) for re-enabling the angle snap mode. In other words, if moving contact 553 moves beyond the second threshold angle set between snap zone 547 and 549, angle snapping is re-enabled, and when moving contact 553 comes back into snap zone 547 again, the ruler will snap to snap angle "1" again. In some embodiments, the second threshold is placed in the middle of the two adjacent snap zones (e.g., between snap angle "1" and snap angle "2"). In some embodiments, each snap angle has its own pair of second thresholds for re-enabling angle snapping. The pair of second thresholds are positioned outside of the snap zone of the snap angle (with one of the pair of second thresholds on each side of the snap zone). More details regarding the second threshold are provided with respect to FIG. 5AL below.

FIG. 5AE illustrates that, after the on-screen ruler has been unsnapped from snap angle "2", and while in the free-rotation mode, moving contact 553 can rotate the on-screen ruler freely around the anchor location to exit snap zone 547 and enter the adjacent free-rotation zone, and the on-screen ruler will remain aligned with moving contact during the free-rotational movement of moving contact 553 around the anchor location in the adjacent free-rotation zone.

FIGS. 5AF-5AG illustrate that, after the on-screen ruler has been unsnapped from snap angle "2", and while in the free-rotation mode, moving contact 553 can rotate the on-screen ruler freely around the anchor location to pass the adjacent free-rotation zone and enter the snap zone of an adjacent snap angle (e.g., snap zone 549 of snap angle "1"). As shown in FIG. 5AF, moving contact 553 has dragged the on-screen ruler into snap zone 549 of snap angle "1". As soon as the on-screen ruler (e.g., as represented by ruler axis 555) has crossed into snap zone 549 of snap angle "1" (e.g., the entire ruler axis 555 is within snap zone 549), the angle snap mode is re-activated. As shown in FIG. 5AG, when the angle snap mode is re-activated, the on-screen ruler jumps away from moving contact 553 and snaps to the snap angle "1" by automatically rotating further by a small amount. In some embodiments, even if moving contact 553 continues to move forward (e.g., in the counterclockwise direction) within angle snap zone 549 around the anchor location, the on-screen ruler remains stationary and aligned with the snap angle "1". As shown in FIGS. 5AH-5AI, even though moving contact 553 has moved pass the snap angle "1", on-screen ruler remains snapped to snap angle "1" and does not follow moving contact 553 until moving contact has moved out of snap zone 549 of snap angle "1".

FIG. 5AJ illustrate two exemplary paths (e.g., paths "A" and "B") of moving contact 553 relative to the snap angles and associated snap zones in sketch area 502, in accordance with some embodiments. In the embodiments illustrated in FIG. 5AJ, the unsnapping criteria include a criterion that is satisfied when the reverse movement of the moving contact (e.g., contact 553) reaches a threshold amount (e.g., a threshold angular amount, or a threshold number pixels). In addition, in this example, the threshold amount is not sufficient to cause the moving contact to exit the current snap zone (e.g., snap zone 547). There are two example scenarios in which the threshold amount is not sufficient to cause the moving contact to exit the current snap zone (e.g., snap zone 547). In the first scenario, in some embodiments, the threshold angle for suspending the angle snap mode is within the snap zone of the snap angle. In the second scenario, in some embodiments, the threshold angle is a fixed angular amount, and the reverse movement happens to occur after the moving contact has already moved forward into the snap zone for more than that fixed angular amount.

Furthermore, in the embodiments illustrated in FIG. 5AJ, once the angle snap mode is suspended in response to the reverse movement of the moving contact, the angle snap mode remains suspended until the moving contact enters the snap zone of an adjacent snap angle. And it is at this point that the effect of the reverse movement for suspending the angle snap mode is cleared for subsequent rotation of the ruler. In other words, the threshold angle for re-enabling the angle snap mode is at the boundary of the adjacent snap zone. For example, while the angle snap mode is suspended, the moving contact can move toward and enter the snap zone of an adjacent snap angle (e.g., moving contact 553 enters snap zone 549 or 545) to re-enable the angle snap mode. Once the angle snap mode is re-enabled, if the moving contact then returns to snap zone 547, the angle snap mode is re-activated for snap angle "1" as if it was activated for the first time (e.g., the effect of the reverse movement for suspending the angle snap mode had been cleared).

In FIG. 5AJ, along the example paths A and B, only segments of the paths with dotted lines are taken during the angle snap mode and the rest of the paths are taken during the free-rotation mode. Therefore, it is clear that it is possible to rotate the on-screen ruler to any desired angle in or outside of the snap zone of a respective snap angle. It is to be noted that, in the embodiments illustrated in FIG. 5AJ, because moving contact 553 in path B never reached snap zone 545 before it re-entered snap zone 547, the angle snap mode was never re-enabled (i.e., the effect of the initial reverse movement of contact 553 for suspending the angle snap mode was not cleared) when contact 553 re-entered and moved within snap zone 547 toward snap zone 549.

FIG. 5AK illustrate two exemplary paths (e.g., paths "A1" and "B1") of moving contact 553 relative to the snap angles and associated snap zones in sketch area 502, in accordance with some embodiments. In the embodiments illustrated in FIG. 5AK, the unsnapping criteria include a criterion that is satisfied when the reverse movement of the moving contact (e.g., contact 553) reaches a threshold amount (e.g., a threshold angular amount, or a threshold number pixels) that is sufficient to cause the moving contact to exit the current snap zone (e.g., snap zone 547). In some embodiments, the threshold angle for suspending the angle snap mode is at the boundary of the current snap zone, e.g., as shown in FIG. 5AK.

Furthermore, similar to the embodiments illustrated in FIG. 5AJ, once the angle snap mode is suspended in response to the reverse movement of the moving contact, the angle snap mode remains suspended until the moving contact has entered the snap zone of an adjacent snap angle. In FIG. 5AK, along the example paths A1 and B1, only segments of the paths with dotted lines are taken during the angle snap mode and the rest of the paths are taken during the free-rotation mode.

FIG. 5AL illustrate two exemplary paths (e.g., paths "A2" and "B2") of moving contact 553 relative to the snap angles and associated snap zones in sketch area 502, in accordance with some embodiments. In the embodiments illustrated in FIG. 5AL, the unsnapping criteria include a criterion that is satisfied when the reverse movement of the moving contact (e.g., contact 553) reaches a threshold amount (e.g., a threshold angular amount, or a threshold number pixels) that is sufficient to cause the moving contact to exit the current snap zone (e.g., snap zone 547). In some embodiments, the threshold angle (e.g., a first threshold angle) for suspending the angle snap mode is at the boundary of the current snap zone (e.g., snap zone 547), as shown in FIG. 5AL.

Different from the embodiments shown in FIGS. 5AJ and 5AK, in the embodiments illustrated in FIG. 5AL, once the angle snap mode is suspended in response to the reverse movement of the moving contact past the first threshold angle (e.g., the first threshold angle at the boundary of the current snap zone), the angle snap mode remains suspended until the moving contact moved beyond a second threshold angle (e.g., threshold angle 543) outside of the current snap zone (e.g., snap zone 547). In some embodiments, each snap zone (e.g., snap zone 547) has a pair of second threshold angles (e.g., second threshold angle 543, and second threshold angle 541) for re-enabling the angle snap mode, with one on each side of the current snap zone (e.g., snap zone 547).

In FIG. 5AL, along the example paths A2 and B2, only segments of the paths with dotted lines are taken during the angle snap mode and the rest of the paths are taken during the free-rotation mode. It is to be noted that, in the embodiments illustrated in FIG. 5AL, because moving contact 553 in path B had reached past the second threshold angle 543, the angle snap mode is re-enabled (i.e., the effect of the initial reverse movement of contact 553 for suspending the angle snap mode is cleared), and when contact 553 returns from beyond second threshold angle 543 and re-enters snap zone 547, the angle snap mode is active again. The angle snap mode is turned off when the moving contact exits snap zone 547 and moves toward snap zone 549.

It should be noted that the longitudinal components (e.g., the component along ruler axis 555, toward or away from stationary contact 551 or the anchor location) of the movement or paths of moving contact 553 as shown in FIGS. 5C-5AL are exaggerated for better illustration of the directional changes in the lateral components of such movement or paths. In some embodiments, in actual operation, the longitudinal components of the movement or paths of moving contact 553 are negligible or smaller than a threshold amount (e.g., 10 pixels) to avoid inadvertent translation of the on-screen ruler during the rotation of the on-screen ruler. In some embodiments, translation of the ruler is disabled during rotation of the ruler, and thus, the threshold on the longitudinal components of the movement or paths of moving contact 553 needs not be set. In some embodiments, the anchor location of the ruler rotation is selected based on the rotational movements of both contacts of a rotational gesture around a common pivot point between the two moving contacts. In some embodiments, movements of both contacts may include a rotational component and a translational component during the rotational gesture, and the anchor location may be non-stationary during the rotation of the ruler.

FIGS. 6A-6I are flow diagrams illustrating a method 600 of providing a drawing aid (e.g., an on-screen ruler) in accordance with some embodiments. The method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is physically separate from the touch-sensitive surface. Some operations in method 600 are, optionally, combined and/or the order of some operations is, optionally, changed.

In some embodiments, the device displays (602) an on-screen ruler in a sketch area in response to a predefined input. The on-screen ruler has a first edge and an interior portion delineated by the first edge. In some embodiments, the predefined input is a predefined touch gesture (e.g., a wide two-finger tap) on a touch screen display or a touch pad to call up the on-screen ruler at an on-screen location corresponding to the location of the contacts of the touch gesture. This is illustrated in FIG. 5A. In some embodiments, the predefined input is a selection input (e.g., a tap) on a ruler-tool icon (e.g., ruler 516 in FIG. 5A) displayed on the touch screen. The selection input may be provided by a finger or a stylus contact on the touch screen display or a touch pad. In some embodiments, the predefined input is selection of a menu item for calling up the on-screen ruler. The selection input may be provided by a finger or a stylus contact on the touch screen display or a touch pad, or by a mouse click or the press of a predetermined hardware button. In some embodiments, the predefined input is a two-finger contact that defines the initial location and orientation of the ruler (e.g., as illustrated by contacts 522a and 522b in FIG. 5A).

In some embodiments, the first edge of the on-screen ruler has a predefined shape (604) other than a straight line. For example, the first edge can be a predefined curve or a kinked line made up by multiple consecutive straight lines. In some embodiments, the on-screen ruler as a whole has a standard shape, such as star, circle, rectangle, oval, etc.

In response to detecting a first touch input directed to the first edge of the on-screen ruler, the device renders (606) a line in the sketch area in accordance with the first edge of the on-screen ruler (e.g., rendering the line in accordance with the first edge of the on-screen ruler using a currently selected drawing tool, such as pen, pencil, brush, etc.). In some embodiments, the first touch input includes movement of a contact by a finger or stylus on the touch-sensitive surface, where the movement of the contact on the touch-sensitive surface corresponds to a movement within a threshold distance of the first edge of the ruler on the display. In some embodiments, the movement within the threshold distance of the first edge of the ruler on the display may cross over the first edge of the ruler from the interior portion of the ruler to the exterior of the ruler, and vice versa. This is illustrated in FIG. 5F, for example.

In some embodiments, the device determines (608) that the first touch input is a line drawing gesture in accordance with at least a determination that an initial position of a contact of the first touch input on the touch-sensitive surface corresponds to an on-screen location that is within a threshold distance from the first edge of the on-screen ruler. The threshold distance can be measured from either side of the first edge. This is illustrated in FIG. 5F, for example.

In some embodiments, rendering the line in the sketch area in accordance with the first edge of the on-screen ruler includes (610) tracing the first edge with a predetermined line color in the sketch area while a corresponding on-screen location of a contact of the first touch input moves within a threshold distance from the first edge of the on-screen ruler (e.g., roughly along the first edge of the on-screen ruler). This is illustrated in FIG. 5F, for example.

In response to detecting a second touch input directed to the first edge of the on-screen ruler, the device adds (612) fill content in a first portion of the sketch area that corresponds to regions touched by the second touch input on the touch-sensitive surface and that is delineated by the first edge of the on-screen ruler, such that the first portion of the sketch area is confined by the first edge or the line. In some embodiments, when the line has a non-negligible thickness or a light color, the fill content is confined by the line and does not bleed into the line. In some embodiments, the fill content is confined by the first edge of the ruler, regardless of whether there is a line drawn in accordance with the first edge of the ruler. This is illustrated in FIGS. 5G-5I, for example. In some embodiments, the second touch input includes movement of a contact by a finger or stylus on the touch-sensitive surface, where the movement of the contact on the touch-sensitive surface corresponds to a back-and-forth movement that starts from at least a threshold distance away from the first edge of the ruler on the display. This is illustrated in FIGS. 5G-5I, e.g., by contacts 552, 562, and 572. In some embodiments, the back-and-forth movement may cross over the first edge of the ruler from the interior portion of the ruler to the exterior of the ruler, and vice versa. In some embodiments, the portions of the back-and-forth movement that cross over the first edge of the on-screen ruler into the interior portion of the ruler do not further cross over the second edge of the ruler. This is illustrated in FIGS. 5G-5I, e.g., by on-screen paths 558, 564, and 574.

In some embodiments, the device determines (614) that the second touch input is a fill gesture in accordance with at least a determination that an initial position of a contact of the second touch input on the touch-sensitive surface corresponds to an on-screen location that is beyond a threshold distance from the first edge in a region of the sketch area un-obscured by the on-screen ruler.

In some embodiments, the device determines (616) that the second touch input is a fill gesture in accordance with at least a determination that a movement direction of a contact of the second touch input on the touch-sensitive surface corresponds to an on-screen movement direction that is beyond a threshold angle from the first edge in a region of the sketch area un-obscured by the on-screen ruler.

In some embodiments, detecting the second touch input includes (618) detecting back-and-forth swiping motion of a contact on the touch-sensitive surface, and adding the fill content in the first portion of the sketch area that corresponds to regions touched by the second touch input on the touch-sensitive surface and that is delineated by the first edge of the on-screen ruler includes: defining a region of the sketch area that corresponds to regions spanned by the back-and-forth swiping motion of the contact on the touch-sensitive surface; maintaining a boundary of the region of the sketch area that is defined by the back-and-forth swiping motion of the contact on the touch-sensitive surface based on the first edge of the on-screen ruler; and adding the fill content into the region of the sketch area in accordance with the boundary. This is illustrated in FIGS. 5H-5I, for example.

In some embodiments, at least one portion of the region of the sketch area that corresponds to the regions spanned by the back-and-forth swiping motion of the contact on the touch-sensitive surface crosses (620) the first edge of the on-screen ruler, and maintaining the boundary of the region of the sketch area includes at least one of stretching or cropping the region of the sketch area such that the boundary of the region of the sketch area is aligned with the first edge. This is illustrated in FIGS. 5H-5I, for example.

In some embodiments, the device detects (622) a third touch input directed to the first edge of the on-screen ruler. The device determines (624) whether an initial touch position of a contact of the third touch input on the touch-sensitive surface corresponds to an on-screen location that is within a predetermined central region of the on-screen ruler a threshold distance away from the first edge. In accordance with a determination that the initial touch position of the contact of the third touch input on the touch-sensitive surface corresponds to an on-screen location that is within the predetermined central region of the on-screen ruler, the device moves (626) the on-screen ruler to a different location on the display in accordance with movement of the contact of the third touch input on the touch-sensitive surface while keeping the sketch area stationary on the display. This is illustrated in FIG. 5D, for example.

In some embodiments, moving the on-screen ruler to a different location on the display in accordance with the movement of the contact of the third touch input on the touch-sensitive surface includes (628) maintaining an orientation of the on-screen ruler on the display during movement of the on-screen ruler on the display. This is illustrated in FIG. 5D, for example.

In some embodiments, the device detects (630) a predefined pivoting gesture directed to the on-screen ruler. For example, in some embodiments, the predetermined pivoting gesture includes a stationary first contact and a moving second contact located roughly a fixed distance away from the stationary contact. The contact may be provided by a finger or a stylus on the touch-sensitive surface. In some embodiments, the predetermined pivoting gesture directed to the on-screen ruler includes two contacts on the touch-sensitive surface that correspond to two on-screen location on the on-screen ruler, where one of the two contacts is a stationary contact on the touch-sensitive surface, and the other contact is a moving contact on the touch-sensitive surface, and where movement of the second contact on the touch-sensitive surface roughly maintains a distance between the first contact and the second contact (e.g., the second contact moves on an arc centered around the first contact) on the touch-sensitive surface). In response to detecting the predefined pivoting gesture directed to the on-screen ruler, the device rotates (632) the on-screen ruler in accordance with movement of the predefined pivoting gesture. In some embodiments, rotating the on-screen ruler in accordance with movement of the predefined pivoting gesture includes keeping one end of the ruler fixed in location in accordance with the stationary contact, while rotating the other end of the ruler around the first end in accordance with the movement of the second contact on the touch-sensitive surface. This is illustrated in FIG. 5E, for example.

In some embodiments, the device detects (634) a termination of the predefined pivoting gesture. In response to detecting the termination of the predefined pivoting gesture within a threshold angle from a predetermined ruler orientation, the device rotates (636) the on-screen ruler to the predetermined ruler orientation. In some embodiments, predetermined ruler orientations include predetermined snap angles, 0, 5, 10, 15, 20, 25, . . . 355, 360 degrees. In some embodiments, the threshold angle is 2.5 degrees. For example, if, at the termination of the predefined pivoting gesture, the on-screen ruler has a current orientation that is 46 degrees from the horizontal direction on the display, and the nearest predetermined ruler orientation is 45 degrees from the horizontal direction on the display, the ruler will snap from 46 degrees to 45 degrees from the horizontal direction automatically.

In some embodiments, the device detects (638) a first contact on the touch-sensitive surface at a first location that corresponds to an on-screen location within the on-screen ruler. After detecting the first contact on the touch-sensitive surface, the device translates (640) the on-screen ruler on the display in accordance with movement of the first contact on the touch-sensitive surface. Before detecting a lift-off of the first contact from the touch-sensitive surface, the device detects (642) a second contact on the touch-sensitive surface away from the first contact. The device detects (644) a pivoting motion of the second contact around the first contact on the touch-sensitive surface. In response to detecting the pivoting motion of the second contact around the first contact on the touch-sensitive surface, the device rotates (646) the on-screen ruler on the display in accordance with the pivoting motion of the second contact on the touch-sensitive surface.

In some embodiments, the device receives (648) a pinch gesture directed to the on-screen ruler. In some embodiments, the pinch gesture includes two contacts moving toward each other on the touch-sensitive surface. For example, in some embodiments, a pinch gesture directed to the on-screen ruler includes two contacts that move toward each other on the touch-sensitive surface, where movement direction of the two contact on the touch-sensitive surface corresponds to on-screen movement on and along the on-screen ruler on the display. In response to receiving the pinch gesture directed to the on-screen ruler, the device removes (650) the on-screen ruler from the display. In some embodiments, the on-screen ruler automatically fades out from the display if no interaction with respect to the ruler has been detected for a predetermined period of time. In some embodiments, depending on the way that the on-screen ruler is called up (e.g., by selecting the ruler-tool icon or by a predetermined ruler call-up gesture), the ruler has different fade out periods or different sets of closing methods. For example, in some embodiments, if a ruler was called up by a gesture, it can automatically fade out after a period of time or be closed by a pinch gesture; and if the ruler was called by selection of the ruler-tool icon, it will not fade out and can only be closed by a pinch gesture.

In some embodiments, the device receives (652) a content moving gesture while the on-screen ruler is displayed (e.g., in some embodiments, the content moving gesture is a sustained moving contact on the touch-sensitive surface with an initial contact location that corresponds to an on-screen location on the canvas that un-obscured by the ruler). In response to receiving the content moving gesture, the device moves (654) content within the sketch area while keeping the on-screen ruler stationary relative to the sketch area. In some embodiments, the content moving gesture can be a contact that grabs parts of canvas in the sketch area un-obscured by the ruler and drags the canvas around underneath the on-screen ruler. This is illustrated in FIG. 5L, for example.

In some embodiments, the device receives (656) a content zooming gesture while the on-screen ruler is displayed (e.g., in some embodiments, the content zooming gesture is two contacts moving away from each other on the touch-sensitive surface, where the movement of the contacts on the touch-sensitive surface corresponds to movement in an area of the canvas that is un-obscured by the ruler on the display). In response to receiving the content zooming gesture, the device zooms (658) content within the sketch area while zooming at least a portion of the on-screen ruler according to a current zoom level of the content. In some embodiments, the tick marks shown on the ruler become more spaced out with increased zoom level of the content. In some embodiments, the size of the ruler remains unchanged on the display, while the tick mark spacing and the content are zoomed. This is illustrated in FIGS. 5J-5K, for example.

In some embodiments, the on-screen ruler is at least partially transparent (660) such that the content is visible from behind the on-screen ruler both before and after being zoomed. In some embodiments, the content zooming gesture is a reverse pinch gesture (e.g., for zooming in) or pinch gesture (e.g., for zoom out), and the gesture may or may not touch the on-screen ruler. This is illustrated in FIGS. 5J-5K, for example.

In some embodiments, the device detects (662) movement of a contact on the touch-sensitive surface that corresponds to a movement along the on-screen ruler on the display. For example, the device detects movement of the contact position of a swipe gesture corresponds to on-screen movement within the body of the ruler. In response to the movement of the contact on the touch-sensitive surface, the device displays (664) tick marks on the first edge to indicate a length scale of the on-screen ruler.

In some embodiments, displaying the tick marks on the first edge includes (666) determining a start location and an end location of the tick marks on the first edge in accordance with an initial position and a final position of the contact on the touch-sensitive surface.

In some embodiments, displaying the tick marks on the first edge includes (668) detecting a braking movement of the contact before a lift-off of the contact on the touch-sensitive surface. In response to detecting the braking movement of the contact, the device snaps (670) the end location of the tick marks to a predetermined snap location on the on-screen ruler corresponding to the final position of the contact on the touch-sensitive surface. For example, the braking movement can be a reverse movement of the contact or a slowing down of the contact in the original movement direction.

In some embodiments, the device determines (672) an on-screen pitch of the tick marks based on a screen resolution or size of the display.

In some embodiments, the device detects (674) movement of a contact on the touch-sensitive surface that corresponds to a movement along the on-screen ruler on the display. In some embodiments, movement of the contact position of a swipe gesture corresponds to on-screen movement within the body of the ruler or along the first edge. In response to the movement of the contact on the touch-sensitive surface, the device displays (676) a numerical value (e.g., the total number of tick marks) in proximity to the first edge to indicate a length scale of the movement of the contact. This is illustrated in FIG. 5F, for example. In some embodiments, tick marks are always displayed on the ruler. In some embodiments, when the movement of the contact has occurred while the drawing tool (e.g., a pen) is selected, a line is drawn along the first edge, and the numerical value dynamically shows the current length of the line in terms of number of tick marks passed. In some embodiments, when the movement of the contact has occurred while no drawing-tool is selected (e.g., an eraser tool is selected), no line is drawn along the first edge, and the numerical value simply shows the current length that has been traveled by the contact in terms of number of tick marks passed.

In some embodiments, the device displays (678) a length of a content object when the on-screen ruler is moved within a threshold distance from the content object.

In some embodiments, the device displays (680) tick marks on the first edge of the on-screen ruler to indicate a length scale of the on-screen ruler. The device detects (682) a predetermined moving gesture for moving the on-screen ruler. In some embodiments, the predetermined moving gesture is a drag input that has a start contact location on the touch-sensitive surface that corresponds to an on-screen location in the central portion of the ruler. The device moves (684) the on-screen ruler in accordance with movement of the predetermined moving gesture. In response to detecting that a predetermined tick mark of the on-screen ruler is within a threshold distance away from an existing content object in the sketch area at a termination of the predetermined moving gesture, the device continues to move (686) the on-screen ruler to a new position such that the predetermined tick mark snaps to the existing content object. In some embodiments, the predetermined tick mark can be the first tick mark on the ruler, or any of the main tick marks on the ruler.

In some embodiments, the device displays (688) tick marks on the first edge of the on-screen ruler to indicate a length scale of the on-screen ruler. The device detects (690) the first touch input directed to the first edge of the on-screen ruler. The first touch input includes an initial movement along the first edge and a braking movement before termination of the first touch input. Rendering the line in the sketch area in accordance with the first edge of the on-screen ruler includes rendering the line in accordance with the initial movement of the first touch input along the first edge of the on-screen ruler, and, in response to detecting the braking movement, snapping a final point of the line to a tick mark nearest an on-screen position corresponding to an end position of the first touch input. This is illustrated in FIG. 5N, for example.

In some embodiments, the device detects (692) a pivoting gesture directed to the on-screen ruler. The pivoting gesture includes an initial rotation and a braking movement before termination of the pivoting gesture. In response to the pivoting gesture, the device rotates (694) the on-screen ruler in accordance with the initial rotation of the pivoting gesture; and in response to detecting the braking movement, snaps a final orientation of the on-screen ruler to a predetermined snap angle nearest an on-screen position corresponding to an end position of the pivoting gesture. This is illustrated in FIG. 5O, for example.

In some embodiments, the device displays (696) an angle indicator on the on-screen ruler (e.g., at the center of the on-screen ruler) to indicate a current orientation of the on-screen ruler. In some embodiments, displaying the angle indicator further includes dynamically updating the angle indicator to show in real-time the current orientation of the on-screen ruler as the ruler is being rotated on the display. This is illustrated in FIG. 5E (e.g., angle indicator 532), for example.

It should be understood that the particular order in which the operations in FIGS. 6A-6I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 600 described above with respect to FIGS. 6A-6I. For example, the contacts, gestures, and user interface objects described above with reference to method 600 optionally have one or more of the characteristics of the contacts, gestures, and user interface objects described herein with reference to other methods described herein (e.g., methods 700, 800, and 900). For brevity, these details are not repeated here.

FIG. 7 is a flow diagram illustrating a method 700 of providing a drawing aid in accordance with some embodiments. The method 700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is physically separate from the touch-sensitive surface. Some operations in method 700 are, optionally, combined and/or the order of some operations is, optionally, changed.

In some embodiments, a device displays (702) an on-screen ruler in a sketch area in response to a predefined input, the on-screen ruler having a first edge and an interior portion delineated by the first edge. The device detects (704) a respective touch input directed to the first edge of the on-screen ruler. In some embodiments, the respective touch input directed to the first edge of the on-screen ruler is a second touch input (706) directed to the first edge of the on-screen ruler. In response to detecting the respective touch input directed to the first edge of the on-screen ruler, the device adds (708) fill content in a first portion of the sketch area that corresponds to regions touched by the first touch input on the touch-sensitive surface and that is delineated by the first edge of the on-screen ruler, such that the first portion of the sketch area is confined by the first edge or the line.

In some embodiments, the device detects (710) a first touch input directed to the first edge of the on-screen ruler. The device renders (712) a line in the sketch area in accordance with the first edge of the on-screen ruler.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, and 900) are also applicable in an analogous manner to method 700 described above with respect to FIG. 7. For example, the contacts, gestures, and user interface objects described above with reference to method 700 optionally have one or more of the characteristics of the contacts, gestures, and user interface objects described herein with reference to other methods described herein (e.g., methods 600, 800, and 900). For brevity, these details are not repeated here.

FIGS. 8A-8C are flow diagrams illustrating a method 800 of providing a virtual drawing aid (e.g., a free-form line) in accordance with some embodiments. The method 800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is physically separate from the touch-sensitive surface. Some operations in method 800 are, optionally, combined and/or the order of some operations is, optionally, changed.

In some embodiments, a device receives (802) a line-drawing input. In some embodiments, the line-drawing input includes selection of a line drawing tool, and defining beginning and end points of the line using a mouse or a contact on the touch-sensitive surface. In some embodiments, the line drawing input includes a free-hand drawing of a line using a mouse or contact on the touch-sensitive surface. In some embodiments, the line-drawing input is a copy and paste of an existing line into the sketch area. In some embodiments, the line-drawing input is a selection of a predefined line-shape and placing a copy of the selected line-shape at a location in the sketch area.

The device renders (804) a line in a sketch area in accordance with the line-drawing input. In some embodiments, the line is a straight line, a curve, a wavy line, a line with enclosed sections (e.g., loops), a kinked line, etc. In some embodiments, the line may be of any selected color, texture, transparency, thickness, etc.

While displaying the sketch area including the line, the device receives (806) a fill gesture directed to the line in the sketch area. In some embodiments, the fill gesture includes movement of a contact on the touch-sensitive surface that satisfies one or more predetermined criteria. For example, in some embodiments, it is required that when the fill gesture is required, the line and a fill option are simultaneously selected. In some embodiments, the line that is mostly recently drawn is automatically selected, without the explicit selection input from the user. In some embodiments, the device infers the selection of the fill option based on a comparison the characteristics of the gesture that has been received and the predetermined gesture characteristics for fill gestures. In some embodiments, the fill gesture includes movement of one or more contacts on the touch-sensitive surface. In some embodiments, the fill gesture includes movement of one or more contacts on the touch-sensitive surface, where the movement corresponds to back-and-forth motion of the one or more contacts along directions at least a threshold angle (e.g., 30 degrees) from the orientation of the ruler. In some embodiments, the fill gesture includes movement of consecutive contacts along roughly the same directions (as opposed to simultaneous contacts moving back-and-forth together) at least a threshold angle from the orientation of the ruler.

In some embodiments, receiving the fill gesture directed to the line in the sketch area includes (808) receiving a touch gesture comprising back-and-forth swiping motion of a contact on the touch-sensitive surface and determining that the touch gesture is a fill gesture directed to the line in the sketch area in accordance with a determination that an initial position of the contact on the touch-sensitive surface corresponds to an on-screen location that is beyond a threshold distance from the line and a sequence of every other turning position following the initial position of the contact during the back-and-forth swiping motion corresponds to a sequence of on-screen locations that are within a threshold distance from the line. This is illustrated in FIGS. 5Q-5T, for example. In some embodiments, if the touch gesture is not determined to be a fill gesture, the touch gesture is interpreted as a line drawing gesture, which causes a wavy line to be drawn in the sketch area in accordance with the movement of the contact. This is illustrated in FIG. 5P, for example. In some embodiments, a fill gesture is a gesture received while a "fill" control is in an activated state.

In some embodiments, receiving the fill-gesture directed to the line in the sketch area includes (810) detecting selection of the line immediately before or after selection of a content fill mode, receiving a touch gesture comprising back-and-forth swiping motion of a contact on the touch-sensitive surface, and determining that the touch gesture is a the fill gesture directed to the line in the sketch area in accordance with a determination that the touch gesture is received while the line and the content fill mode are concurrently selected. In some embodiments, if the touch gesture is not determined to be a fill gesture, the touch gesture is interpreted as a line drawing gesture, which causes a wavy line to be drawn in the sketch area in accordance with the movement of the contact.

In response to receiving the fill gesture, the device adds (812) fill content in a first portion of the sketch area that corresponds to regions touched by the fill-gesture on the touch-sensitive surface and that is delineated and partially enclosed by the line in the sketch area.

In some embodiments, adding the fill content in the first portion of the sketch area that corresponds to regions touched by the fill gesture on the touch-sensitive surface and that is delineated and partially enclosed by the line in the sketch area includes (814) adding the fill content in a first region in the first portion of the sketch area in accordance with a first fill factor and adding the fill content in a second region in the first portion of the sketch area in accordance with a second fill factor. The first region is closer to the line than the second region and the first fill factor is greater than the second fill factor. In some embodiments, the second fill factor is determined (816) in accordance with one or more characteristics of the fill gesture. For example, the second fill factor can be based on how fast the back-and-forth swiping motion of the fill gesture is, and/or how closely packed the strokes of the back-and-forth swiping motion are. In some embodiments, the boundary of the second region can be based on the strokes of the back-and-forth swiping motion. In some embodiments that transition between the first region and the second region is gradual.

In some embodiments, adding the fill content in the first portion of the sketch area that corresponds to regions touched by the fill gesture on the touch-sensitive surface and that is delineated and partially enclosed by the line in the sketch area includes (818) defining a region of the sketch area on the display that corresponds to regions spanned by the back-and-forth swiping motion of the contact on the touch-sensitive surface, maintaining a boundary of the region of the sketch area that is defined by the back-and-forth swiping motion of the contact based on the line in the sketch area; and adding the fill content into the region of the sketch area in accordance with the boundary. In some embodiments, at least one portion of the region of the sketch area on the display that corresponds to the regions spanned by the back-and-forth swiping motion of the contact on the touch-sensitive surface crosses (820) the line, and maintaining the boundary of the region includes at least one of stretching or cropping the region of the sketch area such that the boundary of the region of the sketch area is aligned with the line. This is illustrated in FIGS. 5Q-5T, for example.

In some embodiments, a beginning and an end of the line are non-overlapping (822) and the line defines at least one fully enclosed region. In some embodiments, the first portion of the sketch area includes (824) the at least one fully enclosed region. For example, when the outer boundary of the line is used to define the boundary of the fill region, the fill content will be added to the open area under the line and inside of the loops defined by the line. This is illustrated in FIG. 5T, for example. In some embodiments, the first portion of the sketch area does not include (826) the at least one fully enclosed region. For example, when the inner boundary of the line is used to define the boundary of the fill region, the fill content will not be added to the inside of the loops defined by the line. This is illustrated in FIG. 5S, for example.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 900) are also applicable in an analogous manner to method 800 described above with respect to FIGS. 8A-8C. For example, the contacts, gestures, and user interface objects described above with reference to method 800 optionally have one or more of the characteristics of the contacts, gestures, and user interface objects described herein with reference to other methods described herein (e.g., methods 600, 700, and 900). For brevity, these details are not repeated here.

FIGS. 9A-9C are flow diagrams illustrating a method 900 of providing a virtual drawing aid (e.g., rotating the virtual drawing aid) in accordance with some embodiments. The method 900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is physically separate from the touch-sensitive surface. Some operations in method 900 are, optionally, combined and/or the order of some operations is, optionally, changed.

In some embodiments, the device displays (902) an on-screen ruler on the display. The device detects (904) a first portion of a rotational gesture directed to the on-screen ruler (e.g., a first portion of a two-finger pivoting gesture directed to the on-screen ruler), where detecting the first portion of the rotational gesture includes detecting first movement of a first contact (e.g., moving contact 553 in FIG. 5V) in a first direction (e.g., clockwise direction) around a pivot location on the touch-sensitive surface. In some embodiments, the pivot location is the location of a stationary second contact (e.g., stationary contact 551 in FIG. 5V) or a predefined location (e.g., the location on the touch-sensitive surface that corresponds to a fixed point (e.g., a distal point or a center point) on the on-screen ruler (e.g., as represented by ruler axis 555 in FIG. 5V).). In some embodiments. both contacts of a rotational gesture can move (e.g., move in opposite directions around a common pivot point) during the rotational gesture, and the pivot location for each contact is at a point between the two moving contacts. In some embodiments, when both contacts of a rotational gesture move during the rotational gesture and the movements of the two contacts share a common translational component, the pivot location also moves during the rotational gesture (e.g., the movement of the pivot location is equal to the shared translational component of the movements of the two moving contacts).

In some embodiments, on a device having a touch screen display, a rotational gesture directed to the on-screen ruler includes two contacts (e.g., contacts 553 and 551 in FIG. 5V) separated by at least a threshold distance on the on-screen ruler (e.g., as represented by ruler axis 555 in FIG. 5V), with one of the contacts moving on an arc around the other contact that is kept stationary. In some embodiments, on a device having a touch screen display, a rotational gesture directed to the on-screen ruler includes two contacts separated by at least a threshold distance on the on-screen ruler, with two contacts moving in opposite directions around a common pivot location that is kept stationary. In some embodiments, on a device having a touch screen display, a rotational gesture directed to the on-screen ruler includes two contacts separated by at least a threshold distance on the on-screen ruler, with two contacts moving in opposite directions around a common pivot location that is also moving. The pivot location can be used as the anchor location for the rotation of the on-screen ruler. In some embodiments, on a device having a touch-sensitive surface separate from the display, a rotational gesture directed to the on-screen ruler includes two contacts separated by at least a threshold distance on the touch-sensitive surface, where the location of one contact corresponds to an on-screen location on the on-screen ruler, and the location of the other contact corresponds to a fixed anchor location for the on-screen ruler (e.g., the anchor location is optionally at a distal end of the ruler, or at the center of the ruler, etc.). In some embodiments, on a device having a touch sensitive surface separate from the display, a rotational gesture directed to the on-screen ruler includes two contacts separated by at least a threshold distance on the touch-sensitive surface, with two contacts moving in opposite directions around a common pivot location that is kept stationary. In some embodiments, on a device having a touch-sensitive surface separate from the display, a rotational gesture directed to the on-screen ruler includes two contacts separated by at least a threshold distance on the touch-sensitive surface, with two contacts moving in opposite directions around a common pivot location that is also moving. In some embodiments, the on-screen location corresponding to the common pivot location is used as the anchor location for the rotation of the on-screen ruler. In some embodiments, on a device having a touch-sensitive surface separate from the display, the on-screen location that corresponds to a contact location on the touch-sensitive surface is represented by a corresponding focus selector (e.g., a cursor, or another predefined marker or representation).

In response to detecting the first portion of the rotational gesture directed to the on-screen ruler: the device rotates (906) the on-screen ruler by a first angular amount about an anchor point (e.g., a point on the on-screen ruler that corresponds to the pivot location on the touch-sensitive surface (e.g., the stationary second contact, or the fixed anchor point (e.g., an end or center point) on the on-screen ruler, or a moving pivot location of the rotational gesture) on the display in accordance with the first movement of the first contact (e.g., contact 553) around the pivot location on the touch-sensitive surface. This is illustrated in FIGS. 5W and 5X, for example. In some embodiments, when the device is in a free-rotation mode (e.g., angle snapping is inactive, and the ruler is rotated freely with the movement of the moving first contact of the rotation gesture), and rotation of the ruler is synchronized with the rotational movement of the moving first contact. In some embodiments, the drawing canvas is divided into a plurality of alternate angle snap zones (e.g., angle snap zones 549, 547, and 545 in FIG. 5V) and free-rotation zones (e.g., zones between adjacent snap zones). Each angle snap zone includes a respective snap angle (e.g., 0 degree, 10 degree, 20 degree, . . . , or 350 degree, etc.) and a respective angular range (e.g., +/−2 degrees) around the respective snap angle. When the on-screen ruler enters into the snap zone of a respective snap angle in accordance with the movement of the moving first contact of the rotational gesture, the device exits the free-rotation mode and enters the angle snap mode, and the default behavior in the angle snap mode is that the ruler would voluntarily rotate to snap (e.g., jump away from on-screen location that corresponds to the location of the contact) to the respective snap angle, and be separated from the on-screen location that corresponds to the location of the moving first contact. If the first contact continued its movement in the same direction (e.g., the clockwise direction) after the ruler had snapped to the respective snap angle, when the on-screen location that corresponds to the moving first contact finally traversed through the snap zone of the respective snap angle and entered the adjacent free-rotation zone, the device exits the angle snap mode, and re-enters the free-rotation mode. Upon re-entering the free-rotation mode, the on-screen ruler would voluntarily rotate to snap (e.g., jump away from the respective snap angle) to the on-screen location that corresponds to the location of the moving first contact and continue to move in synchronization with the moving first contact within the adjacent free-rotation zone.

In response to detecting the first portion of the rotational gesture directed to the on-screen ruler: in accordance with a determination that the on-screen ruler has entered a first snap zone (e.g., snap zone 547 in FIG. 5V) associated with a first snap angle (e.g., +/−2 degrees of the first snap angle) upon rotation by the first angular amount (e.g., as shown in FIGS. 5W and 5X), rotating the on-screen ruler by a first adjusted amount (e.g., in the clockwise direction) to bring the on-screen ruler into alignment with the first snap angle. This is illustrated in FIGS. 5X-5Y, for example.

After the rotating the on-screen ruler by the first adjusted amount, the device detects (908) a second portion of the rotational gesture directed to the on-screen ruler, wherein detecting the second portion of the rotational gesture includes detecting second movement of the first contact in a second direction (e.g., counter-clockwise direction) around the pivot location on the touch-sensitive surface, wherein the second movement in the second direction satisfies unsnapping criteria (e.g., in some embodiments, the unsnapping criteria include a criterion that is met when the second movement in the second direction is a reversal of at least part of the first movement of the first contact in the first direction (e.g., the second movement is a reversal by at least 1 degree or 5 pixels in substantially the reverse direction of the first movement)). This is illustrated in FIG. 5Z, for example. In some embodiments, the unsnapping criteria include a criterion that is met when the second movement in the second direction is sufficient to move the first contact outside of the first snap zone of the first snap angle. In some embodiments, the unsnapping criteria include a criterion that is met when the second movement in the second direction is sufficient to move the first contact pass a respective threshold angle outside of the first snap zone of the first snap angle. For example, in some embodiments, the respective threshold angle outside of the first snap zone of the first snap angle is at the boundary of an adjacent snap zone for a snap angle adjacent to the first snap angle, or at an angle somewhere in between the first snap zone and the adjacent snap zone.

In response to detecting the second portion of the rotational gesture directed to the on-screen ruler, the device rotates (910) the on-screen ruler by a second adjusted amount to bring the on-screen ruler into alignment with a respective on-screen location that corresponds to a current location of the first contact on the touch-sensitive surface (e.g., rotating the on-screen ruler by a second adjusted amount in the counter-clockwise direction to bring the ruler back to the on-screen location corresponding to the location of the first contact). This is illustrated in FIGS. 5Z-5AA, for example. In some embodiments, the second adjusted amount is equal to a reversal of the first adjusted amount plus a second amount that corresponds to the second movement in the second direction. In some embodiments, if termination of the rotational gesture (e.g., lift-off of the first contact or the second contact, or both) is detected at this point, the current orientation of the on-screen ruler will remains as the final orientation of the on-screen ruler. In other words, the ruler is unsnapped from the respective snap angle.

In some embodiments, after rotating the on-screen ruler by the second adjusted amount, the device detects (912) a third portion of the rotational gesture directed to the on-screen ruler, where detecting the third portion of the rotational gesture includes detecting third movement of the first contact around the pivot location on the touch-sensitive surface (e.g., the third movement optionally include segments of movement in either or both the first and second directions). In response to detecting the third portion of the rotational gesture directed to the on-screen ruler, the device rotates the on-screen ruler around the anchor point (e.g., the rotation optionally includes rotations in either or both directions (e.g., either or both of the clockwise and counter-clockwise directions)) on the display in accordance with the third movement of the first contact around the pivot location on the touch-sensitive surface. This is illustrated in FIG. 5AC, for example. If termination of the rotational gesture (e.g., lift-off of the first contact or the second contact, or both) is detected at this point, the current orientation of the on-screen ruler will remains as the final orientation of the on-screen ruler. In other words, the ruler remains in the unsnapped state during the third movement of the first contact (until the ruler enters a new snap zone).

In some embodiments, the on-screen ruler remains (914) within the first snap zone associated with the first snap angle (e.g., +/−2 degrees of the first snap angle) during the rotation in accordance with a first portion of the third movement of the first contact, and remains aligned with a respective on-screen location that corresponds to a current location of the first contact on the touch-sensitive surface throughout the first portion of the third movement of the first contact. For example, after the angle snapping toward the first snap angle is turned off in response to the second movement of the first contact (e.g., the reverse rotation by a threshold amount after first entering the snap zone of the first snap angle), the ruler is rotated freely with the rotational movement of the first contact within the snap zone, without snapping to the first snap angle. This is illustrated in FIG. 5AB, for example. If termination of the rotational gesture (e.g., lift-off of the first contact or the second contact, or both) is detected at this point, the current orientation of the on-screen ruler will remains as the final orientation of the on-screen ruler.

In some embodiments, the on-screen ruler exits (916) and re-enters the first snap zone associated with the first snap angle at least once during the rotation in accordance with a second portion of the third movement of the first contact, and remains aligned with a respective on-screen location that corresponds to a current location of the first contact on the touch-sensitive surface throughout the second portion of the third movement of the first contact. For example, after the angle snapping toward the first snap angle is turned off in response to the second movement of the first contact (e.g., the reverse rotation by a threshold amount after first entering the snap zone of the first snap angle), the ruler is rotated freely with the rotational movement of the first contact within the snap zone and the two free-rotation zones on either side of the snap zone, without snapping to the first snap angle. This is illustrated in FIG. 5AD, for example. If termination of the rotational gesture (e.g., lift-off of the first contact or the second contact, or both) is detected at this point, the current orientation of the on-screen ruler will remains as the final orientation of the on-screen ruler.

In some embodiments, the on-screen ruler exits (918) the first snap zone associated with the first snap angle during the rotation in accordance with a third portion of the third movement of the first contact, and remains aligned with a respective on-screen location that corresponds to a current location of the first contact on the touch-sensitive surface throughout the third portion of the third movement of the first contact. For example, after the angle snapping toward the first snap angle is turned off in response to the second movement (e.g., the reverse rotation by a threshold amount after first entering the snap zone of the first snap angle) of the first contact, the ruler is rotated freely with the rotational movement of the first contact and exits the snap zone and enters one of the two free rotation zones around the snap zone. This is illustrated in FIG. 5AE, for example. If termination of the rotational gesture (e.g., lift-off of the first contact or the second contact, or both) is detected at this point, the current orientation of the on-screen ruler will remains as the final orientation of the on-screen ruler.

In some embodiments, the on-screen ruler exits (920) the first snap zone associated with the first snap angle and enters a second snap zone (e.g., snap zone 549 in FIG. 5V) associated with a second snap angle (e.g., the second snap angle is adjacent to the first snap angle in the first or the second direction (e.g., clockwise or counter-clockwise), and the snap zone of the second snap angle is separated from the snap zone of the first snap angle by a free-rotation zone (e.g., a zone in which rotation is free and not snapped to any particular angle)) in accordance with a fourth portion of the third movement of the first contact. In accordance with a determination that the on-screen ruler has entered the second snap zone (e.g., snap zone 549) associated with the second snap angle (e.g., +/−2 degrees of the second snap angle) in accordance with the fourth portion of the third movement of the first contact, rotating the on-screen ruler by a third adjusted amount to bring the on-screen ruler into alignment with the second snap angle (e.g., either clockwise or counter-clockwise to bring the ruler to the second snap angle). This is illustrated in FIG. 5AF-5AG, for example.

In some embodiments, while the on-screen ruler is (922) within the second snap zone (e.g., snap zone 549 in FIG. 5V) associated with the second snap angle, detecting a fourth portion of the rotational gesture directed to the on-screen ruler, where detecting the fourth portion of the rotational gesture includes detecting fourth movement of the first contact around the pivot location on the touch-sensitive surface and detecting that the fourth movement of the first contact does not satisfy the unsnapping criteria (e.g., the fourth movement of the first contact is not sufficient to constitute a threshold amount of reversal of the fourth portion of the third movement of the first contact in the first direction (e.g., the fourth portion of the third movement is the movement that brought the on-screen ruler into the second snap zone of the second snap angle)). In response to detecting the fourth portion of the rotational gesture directed to the on-screen ruler, the device maintains alignment between the on-screen ruler and the second snap angle (e.g., irrespective of the fourth movement of first contact on the touch-sensitive surface). This is illustrated in FIG. 5AH, for example. In some embodiments, the movement in the first direction is a movement in the clockwise direction. In some embodiments, when the first direction is the clockwise direction, the second direction is the counter-clock direction. In some embodiments, the first direction is the counter-clockwise direction, while the second direction is the clockwise direction.

In some embodiments, the unsnapping criteria include (924) a criterion that is met when movement of a respective contact around a respective pivot location of a given rotational gesture directed to the on-screen ruler is reversed by at least a threshold amount (e.g., by at least a threshold angular amount, or by at least a threshold number of pixels (e.g., the threshold number of pixels is dependent on the distance between the two contacts of the rotational gesture and the threshold angular amount)) once the on-screen ruler has entered a respective snap zone associated with a given snap angle in accordance with the movement of the respective contact. In some embodiments, the threshold angular amount is a static amount. In some embodiments, the threshold angular amount is an amount that is sufficient to bring the first contact back out of the first snap zone. In some embodiments, threshold amount is an amount that is sufficient to bring the first contact back out to a threshold angle outside of the first snap zone of the first snap angle. In some embodiments, the threshold amount is an amount that is sufficient to bring the first contact back to the boundary of a snap zone adjacent to the first snap zone.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 800) are also applicable in an analogous manner to method 900 described above with respect to FIGS. 9A-9C. For example, the contacts, gestures, and user interface objects described above with reference to method 900 optionally have one or more of the characteristics of the contacts, gestures, and user interface objects described herein with reference to other methods described herein (e.g., methods 600, 700, and 800). For brevity, these details are not repeated here.

In accordance with some embodiments, FIG. 10 shows a functional block diagram of an electronic device 1000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 configured to display an on-screen ruler, a touch-sensitive surface unit 1004, and a processing unit 1006 coupled with the display unit 1002 and the touch-sensitive surface unit 1004. The on-screen ruler is displayed in a sketch area in response to a predefined input. The on-screen ruler has a first edge and an interior portion delineated by the first edge.

In some embodiments, the processing unit 1006 includes a rendering unit 1008, an adding unit 1010, a determining unit 1012, a tracing unit 1014, a defining unit 1016, a maintaining unit 1018, a detecting unit 1020, a moving unit 1022, a rotating unit 1024, a translating unit 1026, a receiving unit 1028, a removing unit 1030, a zooming unit 1032, and a snapping unit 1034.

The processing unit 1006 is configured to, in response to detecting a first touch input directed to the first edge of the on-screen ruler, render (e.g., with the rendering unit 1008) a line in the sketch area in accordance with the first edge of the on-screen ruler. In response to detecting a second touch input directed to the first edge of the on-screen ruler, the processing unit is configured to add (e.g., with the adding unit 1010) fill content in a first portion of the sketch area that corresponds to regions touched by the second touch input on the touch-sensitive surface and that is delineated by the first edge of the on-screen ruler, such that the first portion of the sketch area is confined by the first edge or the line.

In some embodiments, the processing unit 1006 is configured to determine (e.g., with the determining unit 1012) that the first touch input is a line drawing gesture in accordance with at least a determination that an initial position of a contact of the first touch input on the touch-sensitive surface unit corresponds to an on-screen location that is within a threshold distance from the first edge of the on-screen ruler.

In some embodiments, the processing unit 1006 is configured to determine (e.g., with the determining unit 1012) that the second touch input is a fill gesture in accordance with at least a determination that an initial position of a contact of the second touch input on the touch-sensitive surface unit corresponds to an on-screen location that is beyond a threshold distance from the first edge in a region of the sketch area un-obscured by the on-screen ruler.

In some embodiments, the processing unit 1006 is configured to determine (e.g., with the determining unit 1012) that the second touch input is a fill gesture in accordance with at least a determination that a movement direction of a contact of the second touch input on the touch-sensitive surface unit corresponds to an on-screen movement direction that is beyond a threshold angle from the first edge in a region of the sketch area un-obscured by the on-screen ruler.

In some embodiments, rendering the line in the sketch area in accordance with the first edge of the on-screen ruler further comprises: tracing (e.g., with the tracing unit 1014) the first edge with a predetermined line color in the sketch area while a corresponding on-screen location of a contact of the first touch input moves within a threshold distance from the first edge of the on-screen ruler.

In some embodiments, detecting the second touch input includes detecting (e.g., with the detecting unit 1012) back-and-forth swiping motion of a contact on the touch-sensitive surface unit, and adding the fill content in the first portion of the sketch area that corresponds to regions touched by the second touch input on the touch-sensitive surface unit and that is delineated by the first edge of the on-screen ruler includes: defining (e.g., with the defining unit 1016) a region of the sketch area that corresponds to regions spanned by the back-and-forth swiping motion of the contact on the touch-sensitive surface unit, maintaining (e.g., with the maintaining unit 1018) a boundary of the region of the sketch area that is defined by the back-and-forth swiping motion of the contact on the touch-sensitive surface unit based on the first edge of the on-screen ruler, and adding (e.g., with the adding unit 1010) the fill content into the region of the sketch area in accordance with the boundary.

In some embodiments, at least one portion of the region of the sketch area that corresponds to the regions spanned by the back-and-forth swiping motion of the contact on the touch-sensitive surface unit crosses the first edge of the on-screen ruler, and maintaining the boundary of the region of the sketch area includes at least one of stretching or cropping the region of the sketch area such that the boundary of the region of the sketch area is aligned with the first edge.

In some embodiments, the processing unit 1006 is configured to detect (e.g., with the detecting unit 1020) a third touch input directed to the first edge of the on-screen ruler, determine (e.g., with the determining unit 1012) whether an initial touch position of a contact of the third touch input on the touch-sensitive surface unit corresponds to an on-screen location that is within a predetermined central region of the on-screen ruler a threshold distance away from the first edge, and, in accordance with a determination that the initial touch position of the contact of the third touch input on the touch-sensitive surface unit corresponds to an on-screen location that is within the predetermined central region of the on-screen ruler, move (e.g., with the moving unit 1022) the on-screen ruler to a different location on the display in accordance with movement of the contact of the third touch input on the touch-sensitive surface unit while keeping the sketch area stationary on the display.

In some embodiments, moving the on-screen ruler to a different location on the display in accordance with the movement of the contact of the third touch input on the touch-sensitive surface unit further comprises maintaining (e.g., with the maintaining unit 1018) an orientation of the on-screen ruler on the display during movement of the on-screen ruler on the display.

In some embodiments, the processing unit 1006 is configured to detect (e.g., with the detecting unit 1012) a predefined pivoting gesture directed to the on-screen ruler and, in response to detecting the predefined pivoting gesture directed to the on-screen ruler, rotate (e.g., with the rotating unit 1024) the on-screen ruler in accordance with movement of the predefined pivoting gesture.

In some embodiments, the processing unit 1006 is configured to detect (e.g., with the detecting unit 1012) a termination of the predefined pivoting gesture, and, in response to detecting the termination of the predefined pivoting gesture within a threshold angle from a predetermined ruler orientation, rotate (e.g., with the rotating unit 1024) the on-screen ruler to the predetermined ruler orientation.

In some embodiments, the processing unit 1006 is configured to detect (e.g., with the detecting unit 1012) a first contact on the touch-sensitive surface unit at a first location that corresponds to an on-screen location within the on-screen ruler. After detecting the first contact on the touch-sensitive surface unit, the processing unit 1006 is configured to translate (e.g., with the translating unit 1026) the on-screen ruler on the display in accordance with movement of the first contact on the touch-sensitive surface unit. Before detecting a lift-off of the first contact from the touch-sensitive surface unit, the processing unit 1006 is configured to detect (e.g., with the detecting unit 1012) a second contact on the touch-sensitive surface unit away from the first contact. The processing unit is configured to detect (e.g., with the detecting unit 1012) a pivoting motion of the second contact around the first contact on the touch-sensitive surface unit. In response to detecting the pivoting motion of the second contact around the first contact on the touch-sensitive surface unit, the processing unit 1006 is configured to rotate (e.g., with the rotating unit 1024) the on-screen ruler on the display in accordance with the pivoting motion of the second contact on the touch-sensitive surface unit.

In some embodiments, the processing unit 1006 is configured to receive (e.g., with the receiving unit 1028) a pinch gesture directed to the on-screen ruler. In response to receiving the pinch gesture directed to the on-screen ruler, the processing unit 1006 is configured to remove (e.g., with the removing unit 1030) the on-screen ruler from the display.

In some embodiments, the processing unit 1006 is configured to receive (e.g., with the receiving unit 1028) a content moving gesture while the on-screen ruler is displayed. In response to receiving the content moving gesture, the processing unit 1006 is configured to move (e.g., with the moving unit 1022) content within the sketch area while keeping the on-screen ruler stationary relative to the sketch area.

In some embodiments, the processing unit 1006 is configured to receive (e.g., with the receiving unit 1028) a content zooming gesture while the on-screen ruler is displayed. In response to receiving the content zooming gesture, the processing unit 1006 is configured to zoom (e.g., with the zooming unit 1032) content within the sketch area while zooming at least a portion of the on-screen ruler according to a current zoom level of the content.

In some embodiments, the on-screen ruler is at least partially transparent such that the content is visible from behind the on-screen ruler both before and after being zoomed.

In some embodiments, the first edge of the on-screen ruler has a predefined shape other than a straight line.

In some embodiments, the processing unit 1006 is configured to detect (e.g., with the detecting unit 1020) movement of a contact on the touch-sensitive surface unit that corresponds to a movement along the on-screen ruler on the display. In response to the movement of the contact on the touch-sensitive surface unit, the processing unit 1006 is configured to enable display of tick marks on the first edge to indicate a length scale of the on-screen ruler.

In some embodiments, displaying the tick marks on the first edge further includes determining (e.g., with the determining unit 1012) a start location and an end location of the tick marks on the first edge in accordance with an initial position and a final position of the contact on the touch-sensitive surface unit.

In some embodiments, displaying the tick marks on the first edge further comprises detecting (e.g., with the detecting unit 1020) a braking movement of the contact before a lift-off of the contact on the touch-sensitive surface unit and, in response to detecting the braking movement of the contact, snapping (e.g., with the snapping unit 1034) the end location of the tick marks to a predetermined snap location on the on-screen ruler corresponding to the final position of the contact on the touch-sensitive surface unit.

In some embodiments, the processing unit 1006 is configured to detect (e.g., with the detecting unit 1020) movement of a contact on the touch-sensitive surface unit that corresponds to a movement along the on-screen ruler on the display. In response to the movement of the contact on the touch-sensitive surface unit, the processing unit 1006 is configured to enable display of a numerical value in proximity to the first edge to indicate a length scale of the movement of the contact.

In some embodiments, the processing unit 1006 is configured to determine (e.g., with the determining unit 1012) an on-screen pitch of the tick marks based on a screen resolution or size of the display.

In some embodiments, the processing unit 1006 is configured to enable display of a length of a content object when the on-screen ruler is moved within a threshold distance from the content object.

In some embodiments, the processing unit 1006 is configured to enable display of tick marks on the first edge of the on-screen ruler to indicate a length scale of the on-screen ruler, detect (e.g., with the detecting unit 1020) a predetermined moving gesture for moving the on-screen ruler, and move (e.g., with the moving unit 1022) the on-screen ruler in accordance with movement of the predetermined moving gesture. In response to detecting that a predetermined tick mark of the on-screen ruler is within a threshold distance away from an existing content object in the sketch area at a termination of the predetermined moving gesture, the processing unit 1006 is configured to continue to move (e.g., with the moving unit 1022) the on-screen ruler to a new position such that the predetermined tick mark snaps to the existing content object.

In some embodiments, the processing unit 1006 is configured to enable display of tick marks on the first edge of the on-screen ruler to indicate a length scale of the on-screen ruler and detect (e.g., with the detecting unit 1020) the first touch input directed to the first edge of the on-screen ruler. The first touch input includes an initial movement along the first edge and a braking movement before termination of the first touch input. Rendering the line in the sketch area in accordance the first edge of the on-screen ruler further comprises rendering (e.g., with the rendering unit 1008) the line in accordance with the initial movement of the first touch input along the first edge of the on-screen ruler, and, in response to detecting the braking movement, snapping (e.g., with the snapping unit 1034) a final point of the line to a tick mark nearest an on-screen position corresponding to an end position of the first touch input.

In some embodiments, the processing unit 1006 is configured to detect (e.g., with the detecting unit 1020) a pivoting gesture directed to the on-screen ruler. The pivoting gesture includes an initial rotation and a braking movement before termination of the pivoting gesture. In response to the pivoting gesture, the processing unit 1006 is configured to rotate (e.g., with the rotating unit 1024) the on-screen ruler in accordance with the initial rotation of the pivoting gesture. In response to detecting the braking movement, the processing unit 1006 is configured to snap (e.g., with the snapping unit 1034) a final orientation of the on-screen ruler to a predetermined snap angle nearest an on-screen position corresponding to an end position of the pivoting gesture.

In some embodiments, the processing unit 1006 is configured to enable display of an angle indicator on the on-screen ruler to indicate a current orientation of the on-screen ruler.

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured, a touch-sensitive surface unit 1104 configured to receive a line-drawing input, and a processing unit 1106 coupled with the display unit 1102 and the touch-sensitive surface unit 1104.

In some embodiments, the processing unit 1106 includes a rendering unit 1108, a receiving unit 1110, an adding unit 1112, and a determining unit 1114.

The processing unit 1106 is configured to, render (e.g., with the rendering unit 1108) a line in a sketch area in accordance with the line-drawing input. While displaying the sketch area including the line, the processing unit 1106 is configured to receive (e.g., with the receiving unit 1110) a fill gesture directed to the line in the sketch area. In response to receiving the fill gesture, the processing unit 1106 is configured to add (e.g., with the adding unit 1112) fill content in a first portion of the sketch area that corresponds to regions touched by the fill gesture on the touch-sensitive surface unit and that is delineated and partially enclosed by the line in the sketch area.

In some embodiments, receiving the fill-gesture directed to the line in the sketch area further includes: receiving (e.g., with the receiving unit 1110) a touch gesture comprising back-and-forth swiping motion of a contact on the touch-sensitive surface unit, and determining (e.g., with the determining unit 1114) that the touch gesture is a fill gesture directed to the line in the sketch area in accordance with a determination that an initial position of the contact on the touch-sensitive surface unit corresponds to an on-screen location that is beyond a threshold distance from the line and a sequence of every other turning position following the initial position of the contact during the back-and-forth swiping motion corresponds a sequence of on-screen locations that are within a threshold distance from the line.

In some embodiments, receiving the fill-gesture directed to the line in the sketch area includes detecting selection of the line immediately before or after selection of a content fill mode, receiving a touch gesture comprising back-and-forth swiping motion of a contact on the touch-sensitive surface unit, and determining that the touch gesture is a the fill gesture directed to the line in the sketch area in accordance with a determination that the touch gesture is received while the line and the content fill mode are concurrently selected.

In some embodiments, adding the fill content in the first portion of the sketch area that corresponds to regions touched by the fill gesture on the touch-sensitive surface unit and that is delineated and partially enclosed by the line in the sketch area includes defining a region of the sketch area on the display unit that corresponds to regions spanned by the back-and-forth swiping motion of the contact on the touch-sensitive surface unit, maintaining a boundary of the region of the sketch area that is defined by the back-and-forth swiping motion of the contact based on the line in the sketch area, and adding the fill content into the region of the sketch area in accordance with the boundary.

In some embodiments, at least one portion of the region of the sketch area on the display unit that corresponds to the regions spanned by the back-and-forth swiping motion of the contact on the touch-sensitive surface unit crosses the line, and maintaining the boundary of the region includes at least one of stretching or cropping the region of the sketch area such that the boundary of the region of the sketch area is aligned with the line.

In some embodiments, a beginning and an end of the line are non-overlapping and the line defines at least one fully enclosed region.

In some embodiments, the first portion of the sketch area includes the at least one fully enclosed region.

In some embodiments, the first portion of the sketch area does not include the at least one fully enclosed region.

In some embodiments, adding the fill content in the first portion of the sketch area that corresponds to regions touched by the fill-gesture on the touch-sensitive surface unit and that is delineated and partially enclosed by the line in the sketch area includes adding the fill content in a first region in the first portion of the sketch area in accordance with a first fill factor; and adding the fill content in a second region in the first portion of the sketch area in accordance with a second fill factor, wherein the first region is closer to the line than the second region and the first fill factor is greater than the second fill factor.

In some embodiments, the second fill factor is determined in accordance with one or more characteristics of the fill gesture.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6I, 7, and 8A-8C, and 9A-9C are, optionally, implemented by components depicted in FIGS. 1A-1B. For example, display operation 602, rendering operation 606, and fill operation 612 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a device having one or more processors, memory, and a touch-sensitive display:
displaying, on the touch-sensitive display, a drawing aid in a sketch area, the drawing aid comprising a ruler;
while displaying the drawing aid in the sketch area, receiving one or more drawing inputs;
in response to receiving the one or more drawing inputs, displaying marks based on the drawing inputs, wherein the marks are constrained based on the drawing aid;
while displaying the drawing aid in the sketch area, detecting a touch gesture at a location corresponding to a location of the drawing aid;
in response to detecting the touch gesture:
in accordance with a determination that the touch gesture is a pinch gesture comprising two contacts detected at distinct locations on the touch-sensitive display and moving toward each other along the ruler, ceasing to display the drawing aid in the sketch area; and
in accordance with a determination that the touch gesture is a rotational gesture comprising at least two contacts detected at distinct locations on the touch-sensitive display, rotating the drawing aid relative to the sketch area in accordance with movement of at least one contact of the at least two contacts in the touch gesture while maintaining display of the drawing aid in the sketch area and displaying an angle indicator in an interior portion of the ruler to indicate a current orientation of the ruler relative to a horizontal direction of the touch-sensitive display, wherein rotating the drawing aid starts at an initial orientation of the ruler that is not horizontal;
wherein detecting the touch gesture includes detecting at least a first contact over a first portion of the drawing aid and a second contact over a second portion of the drawing aid; and
in response to detecting the touch gesture:
in accordance with a determination that the touch gesture is a rotational gesture performed by the first contact and the second contact, rotating the drawing aid relative to the sketch area in accordance with movement of at least one contact in the touch gesture while maintaining display of the drawing aid in the sketch area and displaying a numeric angle indicator in an interior portion of the ruler between the first portion of the drawing aid under the first contact and the second portion of the drawing aid under the second contact to numerically indicate the current orientation of the ruler.

2. The method of claim 1, further comprising:
in accordance with a determination the rotational gesture has ceased, ceasing to display the angle indicator in the interior portion of the ruler.

3. The method of claim 1, wherein:
the touch gesture includes two or more contacts on the touch-sensitive display;

the rotational gesture is a rotational gesture in which a pivoting contact of the two or more contacts pivots around a first contact of the two or more contacts; and
the method includes rotating the drawing aid around the first contact in accordance with movement of the pivoting contact while maintaining display of the drawing aid in the sketch area.

4. The method of claim 1, including:
prior to displaying the drawing aid in the sketch area, detecting a second touch gesture that includes detecting touch-down of at least two contacts on the touch-sensitive display at a location in the sketch area; and
in response to detecting the second touch gesture, including detecting the touch-down of the at least two contacts on the touch-sensitive display at a location in the sketch area, displaying the drawing aid at the location in the sketch area where the touch-down of the at least two contacts is detected.

5. The method of claim 1, including:
in response to detecting the touch gesture, in accordance with a determination that the touch gesture includes a zooming gesture, enlarging the marks in the sketch area relative to the drawing aid in accordance with the movement of the at least one contact in the touch gesture while maintaining display of the drawing aid in the sketch area.

6. The method of claim 1, wherein rotating the drawing aid in the sketch area includes rotating the drawing aid relative to the marks displayed in the sketch area.

7. The method of claim 1, wherein rotating the drawing aid relative to the sketch area is accompanied by translation of the drawing aid.

8. An electronic device, comprising:
a touch-sensitive display;
one or more processors;
memory; and
one or more programs, wherein the one or more programs are stored in the memory and configured to be executed by the one or more processors, the one or more programs including instructions for:
displaying, on the touch-sensitive display, a drawing aid in a sketch area, the drawing aid comprising a ruler;
while displaying the drawing aid in the sketch area, receiving one or more drawing inputs;
in response to receiving the one or more drawing inputs, displaying marks based on the drawing inputs, wherein the marks are constrained based on the drawing aid;
while displaying the drawing aid in the sketch area, detecting a touch gesture at a location corresponding to a location of the drawing aid;
in response to detecting the touch gesture:
in accordance with a determination that the touch gesture is a pinch gesture comprising two contacts detected at distinct locations on the touch-sensitive display and moving toward each other along the ruler, ceasing to display the drawing aid in the sketch area; and
in accordance with a determination that the touch gesture is a rotational gesture comprising at least two contacts detected at distinct locations on the touch-sensitive display, rotating the drawing aid relative to the sketch area in accordance with movement of at least one contact of the at least two contacts in the touch gesture while maintaining display of the drawing aid in the sketch area and displaying an angle indicator in an interior portion of the ruler to indicate a current orientation of the ruler relative to a horizontal direction of the touch-sensitive display, wherein rotating the drawing aid starts at an initial orientation of the ruler that is not horizontal;

wherein the instructions for detecting the touch gesture include instructions for detecting at least a first contact over a first portion of the drawing aid and a second contact over a second portion of the drawing aid; and the one or more programs further include instructions for:
in response to detecting the touch gesture:
in accordance with a determination that the touch gesture is a rotational gesture performed by the first contact and the second contact, rotating the drawing aid relative to the sketch area in accordance with movement of at least one contact in the touch gesture while maintaining display of the drawing aid in the sketch area and displaying a numeric angle indicator in an interior portion of the ruler between the first portion of the drawing aid under the first contact and the second portion of the drawing aid under the second contact to numerically indicate the current orientation of the ruler.

9. The electronic device of claim 8, wherein the one or more programs further include instructions for:
in accordance with a determination the rotational gesture has ceased, ceasing to display the angle indicator in the interior portion of the ruler.

10. The electronic device of claim 8, wherein:
the touch gesture includes two or more contacts on the touch-sensitive display;
the rotational gesture is a rotational gesture in which a pivoting contact of the two or more contacts pivots around a first contact of the two or more contacts; and
the one or more programs further include instructions for rotating the drawing aid around the first contact in accordance with movement of the pivoting contact while maintaining display of the drawing aid in the sketch area.

11. The electronic device of claim 8, wherein the one or more programs further include instructions for:
prior to displaying the drawing aid in the sketch area, detecting a second touch gesture that includes detecting touch-down of at least two contacts on the touch-sensitive display at a location in the sketch area; and
in response to detecting the second touch gesture, including detecting the touch-down of the at least two contacts on the touch-sensitive display at a location in the sketch area, displaying the drawing aid at the location in the sketch area where the touch-down of the at least two contacts is detected.

12. The electronic device of claim 8, wherein the one or more programs further include instructions for:
in response to detecting the touch gesture, in accordance with a determination that the touch gesture includes a zooming gesture, enlarging the marks in the sketch area relative to the drawing aid in accordance with the movement of the at least one contact in the touch gesture while maintaining display of the drawing aid in the sketch area.

13. The electronic device of claim 8, wherein rotating the drawing aid in the sketch area includes rotating the drawing aid relative to the marks displayed in the sketch area.

14. The electronic device of claim 8, wherein rotating the drawing aid relative to the sketch area is accompanied by translation of the drawing aid.

15. A non-transitory computer readable storage medium storing one or more programs, the one or more programs comprising instructions, which when executed by an electronic device with a touch-sensitive display, cause the electronic device to:
display on the touch-sensitive display, a drawing aid in a sketch area, the drawing aid comprising a ruler;
while displaying the drawing aid in the sketch area, receive one or more drawing inputs;
in response to receiving the one or more drawing inputs, display marks based on the drawing inputs, wherein the marks are constrained based on the drawing aid;
while displaying the drawing aid in the sketch area, detect a touch gesture at a location corresponding to a location of the drawing aid;
in response to detecting the touch gesture:
in accordance with a determination that the touch gesture is a pinch gesture comprising two contacts detected at distinct locations on the touch-sensitive display and moving toward each other along the ruler, cease to display the drawing aid in the sketch area; and
in accordance with a determination that the touch gesture is a rotational gesture comprising at least two contacts detected at distinct locations on the touch-sensitive display, rotate the drawing aid relative to the sketch area in accordance with movement of at least one contact of the at least two contacts in the touch gesture while maintaining display of the drawing aid in the sketch area and displaying an angle indicator in an interior portion of the ruler to indicate a current orientation of the ruler relative to a horizontal direction of the touch-sensitive display, wherein rotating the drawing aid starts at an initial orientation of the ruler that is not horizontal;
wherein detecting the touch gesture includes detecting at least a first contact over a first portion of the drawing aid and a second contact over a second portion of the drawing aid; and
the one or more programs further include instructions that, when executed by the electronic device, cause the electronic device to:
in response to detecting the touch gesture:
in accordance with a determination that the touch gesture is a rotational gesture performed by the first contact and the second contact, rotate the drawing aid relative to the sketch area in accordance with movement of at least one contact in the touch gesture while maintaining display of the drawing aid in the sketch area and display a numeric angle indicator in an interior portion of the ruler between the first portion of the drawing aid under the first contact and the second portion of the drawing aid under the second contact to numerically indicate the current orientation of the ruler.

16. The non-transitory computer readable storage medium of claim 15, wherein the one or more programs further include instructions that, when executed by the electronic device, cause the electronic device to:
in accordance with a determination the rotational gesture has ceased, cease to display the angle indicator in the interior portion of the ruler.

17. The non-transitory computer readable storage medium of claim 15, wherein:
- the touch gesture includes two or more contacts on the touch-sensitive display;
- the rotational gesture is a rotational gesture in which a pivoting contact of the two or more contacts pivots around a first contact of the two or more contacts; and
- the one or more programs include instructions that, when executed by the electronic device, cause the electronic device to rotate the drawing aid around the first contact in accordance with movement of the pivoting contact while maintaining display of the drawing aid in the sketch area.

18. The non-transitory computer readable storage medium of claim 15, wherein the one or more programs further include instructions, which when executed by the electronic device, cause the electronic device to:
- prior to displaying the drawing aid in the sketch area, detect a second touch gesture that includes detecting touch-down of at least two contacts on the touch-sensitive display at a location in the sketch area; and
- in response to detecting the second touch gesture, display the drawing aid at the location in the sketch area where the touch-down of the at least two contacts is detected.

19. The non-transitory computer readable storage medium of claim 15, wherein the one or more programs further include instructions, which when executed by the electronic device, cause the electronic device to:
- in response to detecting the touch gesture, in accordance with a determination that the touch gesture includes a zooming gesture, enlarge the marks in the sketch area relative to the drawing aid in accordance with the movement of the at least one contact in the touch gesture while maintaining display of the drawing aid in the sketch area.

20. The non-transitory computer readable storage medium of claim 15, wherein rotating the drawing aid in the sketch area includes rotating the drawing aid relative to the marks displayed in the sketch area.

21. The non-transitory computer readable storage medium of claim 15, wherein rotating the drawing aid relative to the sketch area is accompanied by translation of the drawing aid.

22. The method of claim 1, further including:
- after detecting the touch gesture, in accordance with a determination that a second touch gesture is not detected within a predetermined period of time, automatically ceasing to display the drawing aid in the sketch area.

23. The method of claim 1, further including:
- in accordance with a determination that the rotational gesture has ceased, setting an angle of the drawing aid to a nearest snap angle among a set of preset snap angles and ceasing to display the angle indicator in the interior portion of the ruler.

* * * * *